US007149266B1

United States Patent
Imamura et al.

(10) Patent No.: US 7,149,266 B1
(45) Date of Patent: Dec. 12, 2006

(54) SIGNAL RECEIVER AND METHOD OF COMPENSATING FREQUENCY OFFSET

(75) Inventors: Kimihiko Imamura, Chiba (JP); Yoshiteru Matsushita, Chiba (JP); Hidekazu Tsuboi, Chiba (JP); Takashi Yoshimoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/980,752

(22) PCT Filed: May 15, 2000

(86) PCT No.: PCT/JP00/03117

§ 371 (c)(1),
(2), (4) Date: Apr. 5, 2002

(87) PCT Pub. No.: WO00/70802

PCT Pub. Date: Nov. 23, 2000

(30) Foreign Application Priority Data

May 18, 1999 (JP) .................................. 11/136639
Sep. 2, 1999 (JP) .................................. 11/248666

(51) Int. Cl.
*H04L 7/00* (2006.01)
*H04L 27/14* (2006.01)
*H03D 3/24* (2006.01)

(52) U.S. Cl. .................. 375/355; 375/316; 375/262; 375/150; 375/142; 375/324; 375/375; 375/357

(58) Field of Classification Search ............. 370/509, 370/480, 208, 503; 375/354, 365–366, 343–344, 375/355, 346, 349, 362; 455/63.1, 67.1, 455/67.13, 182.1, 192.1, 134, 216, 266.2
See application file for complete search history.

(56) References Cited

U.S. PATENT DOCUMENTS

| 4,527,278 A | | 7/1985 | Deconche et al. | |
|---|---|---|---|---|
| 6,125,124 A | * | 9/2000 | Junell et al. | 370/503 |
| 6,275,551 B1 | * | 8/2001 | Nomura et al. | 375/365 |
| 6,459,745 B1 | * | 10/2002 | Moose et al. | 375/355 |
| 6,498,822 B1 | * | 12/2002 | Tanaka | 375/354 |
| 6,549,589 B1 | * | 4/2003 | Tsuruoka | 375/343 |

FOREIGN PATENT DOCUMENTS

| EP | 0 896 457 A1 | 2/1999 |
|---|---|---|
| EP | 0 898 403 A1 | 2/1999 |

* cited by examiner

*Primary Examiner*—Kevin Kim
*Assistant Examiner*—Linda Wong
(74) *Attorney, Agent, or Firm*—David G. Conlin; David A. Tucker; Edwards Angell Palmer & Dodge LLP

(57) ABSTRACT

An OFDM receiver includes an offset compensator (14) compensating for a frequency offset in a received OFDM signal. The offset compensator (14) includes a memory (51) storing two reference signals corresponding to arbitrary portions in the start symbol of the OFDM signal. A cross correlation value between the received OFDM signal and each of the two reference signals is calculated by a cross correlator (52, 53). Each peak position is detected by a peak detector (54). A frequency offset estimate value of the received OFDM signal is estimated by a frequency offset estimation circuit (55) based on the cross correlation value at each detected peak position. A phase rotation circuit (37) compensates for the frequency offset of the received OFDM signal based on the estimated frequency offset estimate value.

23 Claims, 45 Drawing Sheets

PHASE ROTATION ANGLE ESTIMATE ERROR IN CROSS CORRELATION VALUE OUTPUT CAUSED BY NOISE

SIGNAL RECEIVER AND METHOD OF COMPENSATING FREQUENCY OFFSET

This application is the national phase under 35 U.S.C. § 371 of PCT International Application No. PCT/JP00/03117, which has an International filing date of May 15, 2000, which designated the United States of America and was not published in English.

TECHNICAL FIELD

The present invention relates to a signal receiver and a frequency offset compensation method. Particularly, the present invention relates to a signal receiver receiving signals transmitted through the multicarrier transmission method such as the orthogonal frequency division multiplexing (OFDM) method, and a method of compensating for a frequency offset of subcarriers used in such signal transmission.

BACKGROUND ART

As an example of a transmission scheme employed in the transmission of mass data such as in terrestrial digital television broadcasting and high speed radio LAN (Local Area Network), the OFDM method which is one type of the multicarrier transmission method is recently attracting attention. According to this OFDM method, data is transferred by arranging a train of symbols of the input data in parallel, and then assigning the data formed of symbols in parallel to a plurality of subcarriers which are orthogonal to each other.

More specifically, the signal transmitted by the OFDM method (referred to as OFDM signal hereinafter) is generated by assigning code data serial-parallel converted to a plurality of subcarriers having frequencies in orthogonal relationship with each other using a modulator, applying an inverse Fourier transform (convert frequency region into time region) on respective code data for conversion into digital modulation waves and then applying parallel-serial conversion on the obtained digital modulated waves. At the demodulator side, the original code data can be reproduced by applying a process opposite to the aforementioned process at the modulator side.

FIG. 43A represents the spectrum of a transmission signal and a reception signal in the modulation method of a single carrier wave (single carrier modulation). In contrast, FIG. 43B represents the spectrum of a transmission signal and a reception signal of the OFDM method.

As shown in FIG. 43A, the transmission signal through the single carrier modulation method is affected by the frequency selective fading caused by variation in the frequency characteristics of the transmission path, whereby the quality of the reception signal is significantly degraded. In contrast, the transmission signal by the OFDM method shown in FIG. 43B is impervious to the influence of frequency selective fading since the band width of each subcarrier is small with respect to variation in the frequency characteristics of the transmission path. Therefore, degradation in the quality of the reception signal can be reduced. Since data is transmitted using a plurality of subcarriers in the OFDM method, there is the advantage that the usage efficiency of frequency is good.

However, in the OFDM method, synchronization between the transmission frequency and the reception frequency will be lost when the Doppler phenomenon occurs in which the frequency band of the transmission signal is shifted or the tuner of the receiver is unstable, resulting in frequency deviation $\Delta f$ (referred to as frequency offset hereinafter) from the original subcarrier frequency, as shown in FIG. 44. This frequency offset will alter the phase of the reception signal to degrade the decoding ability of the receiver.

Occurrence of such frequency offset in reception signals in the OFDM method that uses a plurality of subcarriers will disrupt the frequency orthogonality between subcarriers. If the received OFDM signal is input to the Fourier transformer of the receiver in such a state, the signal component of a subcarrier adjacent to that subcarrier will appear as an intermodulation component in the output of the Fourier transformer to prevent the original code data from being reproduced properly. This induces the problem that the quality of reproduced data is degraded.

It is to be noted that, as the number of subcarriers in the OFDM method increases, respective subcarriers will be distributed more densely in respective determined bands. Therefore, even a small frequency offset will cause severe interference between adjacent subcarriers. Thus, compensation for a frequency offset is one of the most important issues to be considered in implementing a system.

Conventionally, various approaches have been proposed as to the technique of detecting and compensating for such frequency offset. For example, an approach is disclosed in "Synchronization Scheme of OFDM Systems for High Speed Wireless LAN", TECHNICAL REPORT OF IEICE, DSP97-165, SAT97-122, RCS97-210 (1998-01) by Takeshi Onizawa et al.

As an example of a conventional transmission and reception system of an OFDM signal, a system that employs a DQPSK (Differential Quadrature Phase Shift Keying) system as a modulation scheme and that carries out delay detection at the receiver side will be described hereinafter with reference to FIGS. 45–51.

First, a structure of a conventional OFDM signal transmitter will be described with reference to FIG. 45. In FIG. 45, the signal line represented by a bold line indicates a complex signal (a signal formed of an in-phase detection axis signal and an orthogonal detection axis signal) whereas the signal line represented by a thin line indicates a real number signal.

As shown in FIG. 45, the former half of the conventional OFDM transmitter includes a serial-parallel converter 1 applying serial-parallel conversion on input information signals, a code modulator 2 applying modulation such as DQPSK on information signals in parallel assigned to respective subcarriers, an inverse discrete Fourier transformer 3 applying an inverse discrete Fourier transform on signals output from code modulator 2, a parallel-serial converter 4 converting the signals output from inverse discrete Fourier transformer 3 into signals in series, and a guard section insert circuit 5 adding a guard section at the beginning of the output signal from parallel-serial converter 4 to generate a data symbol.

The latter half of the conventional OFDM transmitter includes a memory 6 storing the preamble and the start symbol of known symbols added to the beginning of a packet, a switcher 7 switching the preamble, start symbol and data symbol for output according to the switching clock supplied from a controller 1000 that will be described afterwards, a digital quadrature modulator 8 providing the real component and imaginary component of the output from switcher 7 as one signal component, a D/A converter 9 converting the output of digital quadrature modulator 8 into analog data, and a frequency converter 10 converting the frequency of the analog data from D/A converter 9 to transmit an OFDM signal. The OFDM transmitter further includes a controller 1000 formed of a CPU and the like to control the overall operation of the OFDM transmitter.

The signal format of the OFDM signal generated by the above-described OFDM transmitter is formed of known symbols including the preamble and (two) start symbols attached at the beginning of a packet, and a data symbol having inverse discrete Fourier transformed data added with a guard section.

More specifically, the data symbol is generated by copying the signal of a section length Tgi at the latter half of the output (valid symbol section) of inverse discrete Fourier transformer 3 and applying the same ahead (the guard section) of the valid symbol section. This application of a guard section allows robustness to a delayed wave that arrives lagging for a period of time within the guard section length Tgi.

The preamble forming the known symbol is a signal used in the gain adjustment of automatic gain control (AGC), symbol synchronization, and the like. The start symbol forming the known symbol serves to determine the initial phase in carrying out modulation by differential coding, and is a signal including all the subcarriers. The length of each start symbol is equal to the valid symbol section length Tw excluding the guard section from the data symbol.

In the case where N subcarriers with the frequency interval of df are used, the signal amplitude must be sampled N times during the start symbol length Tw(=1/df).

The structure of a conventional OFDM signal receiver will be described here with reference to FIG. 47. In FIG. 47, the signal line represented by a bold line indicates a complex signal whereas the signal line represented by a thin line indicates a real number signal.

Referring to FIG. 47, the former half of the conventional OFDM receiver includes a frequency converter 11 converting the frequency of a reception signal to a predetermined band, an A/D converter 12 converting the output of frequency converter 11 into digital data, a digital orthogonal detector 13 separating the output of A/D converter 12 into a real component and an imaginary component, a frequency offset compensator 14 compensating for a frequency offset and estimating a symbol timing (position), and a symbol clock generator 15 generating a symbol clock based on a symbol position estimate value from frequency offset compensator 14.

The latter half of the conventional OFDM receiver includes a guard section removal circuit 16 removing the guard section from the output of frequency offset compensator 14 according to a guard section removal clock supplied from a controller 2000 that will be described afterwards based on the symbol clock generated from symbol clock generator 15, a serial-parallel converter 17 applying serial-parallel conversion on the output from guard section removal circuit 16, a discrete Fourier transformer (FFT) 18 applying discrete Fourier transform on the output from serial-parallel converter 17, a code determination circuit 19 demodulating the output of discrete Fourier transformer 18, and a parallel-serial converter 20 applying parallel-serial conversion on the output of code determination circuit 19. The OFDM receiver further includes a controller 2000 formed of a CPU and the like that controls the overall operation of the OFDM receiver.

Referring to FIG. 48, digital orthogonal detector 13 of FIG. 47 includes a local oscillator 21 oscillating at a constant frequency, a π/2 phase shifter 22 shifting by π/2 the phase of the output signal from local oscillator 21, multipliers 23 and 24 multiplying the output of A/D converter 12 of FIG. 47 by respective outputs of local oscillator 21 and π/2 phase shifter 22, and filters 25 and 26 extracting desired complex signals from respective outputs of multipliers 23 and 24.

Referring to FIG. 49, frequency offset compensator 14 of FIG. 47 includes a delay unit 31 delaying the output signal from digital orthogonal detector 13 (FIG. 47) by a valid symbol section length Tw, a cross correlator 32 computing a cross correlation value between the output of delay unit 31 and the reception signal from digital orthogonal detector 13, and an autocorrelator 33 computing the autocorrelation value of the reception signal from digital orthogonal detector 13.

Frequency offset compensator 14 includes a peak detector 34 detecting the peak position of the cross correlation value independent of the reception signal level by dividing the output of cross correlator 32 by the output of autocorrelator 33, and a symbol synchronization position estimator 35 providing an estimate value of the symbol position from the output (cross correlation value peak position) of peak detector 34.

Frequency offset compensator 14 further includes a rotation angle estimator 36 estimating the rotation angle of the cross correlation value from the output of cross correlator 32 and the output of peak detector 34 (cross correlation value peak position) to output an estimate value of the frequency offset, and a phase rotation circuit 37 providing a signal compensated for a frequency offset by rotating the phase of the reception signal from digital orthogonal detector 13 based on the estimate value of the frequency offset from rotation angle estimator 36.

Referring to FIG. 50, correlators 32 and 33 of FIG. 49 include a delay line 41, a tap 42, and an adder 43 to calculate the correlation value by integrating the first input signal using the tap number obtained from the second input signal.

More specifically, cross correlator 32 receives a reception signal from digital orthogonal detector 13 (FIG. 47) as the first input signal and a delayed version of the reception signal from digital orthogonal detector 13, delayed by Tw at delay unit 31, as the second input signal. A cross correlation value can be obtained by integrating the first input signal over the number of taps M obtained from the second input signal.

Autocorrelator 33 receives in common the reception signal from digital orthogonal detector 13 (FIG. 47) as the first and second input signals. By integrating this reception signal over a number of taps M obtained from the reception signal, an autocorrelation value is obtained. Here, the number of taps M is equal to the number of points (the maximum number of subcarriers determined depending upon the structure of FFT 18) of discrete Fourier transformer (FFT) 18 (FIG. 47).

The operation of frequency offset compensator 14 will be described hereinafter with reference to FIG. 49.

Peak detector 34 of FIG. 49 provides the peak position of a cross correlation value by dividing the output of cross correlator 32 by the output of autocorrelator 33. Based on the detected result of peak detector 34, symbol synchronization position estimator 35 generates a symbol synchronization position estimate value.

Since each correlation value is calculated with a complex number, the rotation angle $\Delta\theta$ with respect to the real axis of the cross correlation value can be estimated from the peak position of the cross correlation value at rotation angle estimator 36, as shown in FIG. 51. Based on this rotation angle $\Delta\theta$, rotation angle estimator 36 can estimate frequency offset value $\Delta f$ using the following equation.

$$\Delta f = \Delta\theta/(2\pi Tw)$$

Based on frequency offset value Δf estimated by rotation angle estimator 36, phase rotation circuit 37 can compensate for a frequency offset by rotating the phase of the reception signal from digital orthogonal detector 13 (FIG. 47). Since rotation angle Δθ with respect to the real axis of the cross correlation value takes a value from −π to π, the frequency offset in the range of −1/(2Tw) to 1/(2Tw) can be compensated for.

Although the frequency offset is compensated for by rotating the phase of a reception signal using phase rotation circuit 37 in the above-described conventional frequency offset compensator 14, the frequency offset of the reception signal can be compensated for without using phase rotation circuit 37. More specifically, frequency offset value Δf obtained from rotation angle Δθ by rotation angle estimator 36 is applied to the control input not shown of local oscillator 21 in digital orthogonal detector 13 shown in FIG. 48. By controlling variably the oscillating frequency, the frequency offset of the reception signal can be compensated for.

However, the conventional frequency offset compensator employs the delay autocorrelation method using a delayed version of the reception signal as a reference signal. There was a problem that only a frequency offset in the range of −0.5 to +0.5 can be detected and compensated for as to the normalized frequency offset, normalized at the frequency interval of the subcarrier.

DISCLOSURE OF THE INVENTION

An object of the present invention is to provide a signal receiver and a frequency offset compensation method with an increased compensation range of frequency offset.

According to the present invention, a signal receiver receiving and demodulating a reception signal formed of a data symbol section where symbols are assigned in parallel to a plurality of subcarriers and modulated and a start symbol added ahead of the data symbol section includes: first memory means, cross correlation value calculation means, peak position detection means, frequency offset estimation means, and frequency offset compensation means. The first memory means stores N(N is an integer of 2 or more) types of reference signals, each corresponding to an arbitrary portion in the start symbol. The cross correlation value calculation means calculates a cross correlation value between the reception signal and each of the N types of reference signals. The peak position detection means detects a peak position of each of the N cross correlation values calculated by the cross correlation value calculation means. The frequency offset estimation means estimates a frequency offset estimate value of a subcarrier of the reception signal for output based on a cross correlation value at each of the N peak positions detected by the peak position detection means. The frequency offset compensation means compensates for a frequency offset of a subcarrier of the reception signal based on the frequency offset estimate value estimated by the frequency offset estimation means.

According to another aspect of the present invention, a signal receiver receiving and demodulating a reception signal formed of a data symbol section where symbols are assigned in parallel to a plurality of subcarriers and modulated and a start symbol added ahead of the data symbol section includes: first memory means, cross correlation value calculation means, peak position detection means, frequency offset estimation means, and frequency offset compensation means. The first memory means stores N(N is an integer of 3 or more) types of reference signals, each corresponding to an arbitrary portion in the start symbol. The cross correlation value calculation means calculates a cross correlation value between the reception signal and each of the N types of reference signals. The peak position detection means detects a peak position of each of the N cross correlation values calculated by the cross correlation value calculation means. The frequency offset estimation means estimates and averages a plurality of frequency offset estimate values of a subcarrier of the reception signal for output, based on a cross correlation value at each of the N peak positions detected by the peak position detection means. The frequency offset compensation means compensates for a frequency offset of a subcarrier of the reception signal based on the frequency offset estimate value estimated and averaged by the frequency offset estimation means.

According to a further aspect of the present invention, a signal receiver receiving and demodulating a reception signal formed of a data symbol section where symbols are assigned in parallel to a plurality of subcarriers and modulated and a start symbol added ahead of the data symbol section includes: first memory means, cross correlation value calculation means, peak position detection means, frequency offset estimation means, phase rotation means, second memory means, control means, and frequency offset compensation means. The first memory means stores N(N is an integer of 2 or more) types of reference signals, each corresponding to an arbitrary portion in the start symbol. The cross correlation value calculation means calculates a cross correlation value between an applied first signal and each of the N types of reference signals. The peak position detection means detects a peak position of each of the N cross correlation values calculated by the cross correlation value calculation means. The frequency offset estimation means estimates a frequency offset estimate value of a subcarrier of the first signal applied to the cross correlation value calculation means for output, based on a cross correlation value at each of the N peak positions detected by the peak position detection means, and accumulates the frequency offset estimate values. The phase rotation means rotates a phase of a subcarrier of an applied second signal based on the frequency offset estimate value estimated by the frequency offset estimation means. The second memory means stores the second signal whose phase is rotated by the phase rotation means. The control means executes once a first control operation of applying the reception signal to the cross correlation value calculation means as the first signal and to the phase rotation means as the second signal to accumulate frequency offset estimate values of a subcarrier of the reception signal, and rotating the phase of the subcarrier of the reception signal for storage in the second memory means, and repeats (N−1) times a second control operation of applying the signal stored in the second memory means to the cross correlation value calculation means as the first signal and to the phase rotation means as the second signal to accumulate frequency offset estimate values of a subcarrier of the signal stored in the second memory, and rotating the phase of the subcarrier of the signal stored in the second memory for storage in the second memory means. The frequency offset compensation means compensates for a frequency offset of the subcarrier of the reception signal based on an added value of N frequency offset estimate values accumulated by the first and second control operations.

According to still another aspect of the present invention, a signal receiver receiving and demodulating a reception signal formed of a data symbol section where symbols are assigned in parallel to a plurality of subcarriers and modulated and a start symbol added ahead of the data symbol section includes: first memory means, cross correlation value calculation means, peak position detection means, second memory means, frequency offset estimation means, adder means, phase rotation means, control means, and frequency offset compensation means. The first memory means stores N(N is an integer of 2 or more) types of reference signals, each corresponding to an arbitrary portion in the start symbol, and a plurality of reference data based on a phase rotation angle between cross correlation values corresponding to a plurality of sets of reference signals, each set formed of two or more types of the reference signals, under a state where a particular frequency offset is present. The cross correlation value calculation means calculates a cross correlation value between an applied first signal and respective reference signals of each set. The peak position detection means detects a peak position of each cross correlation value calculated by the cross correlation value calculation means. The second memory means extracts and stores a portion of the reception signal. The frequency offset estimation means estimates a frequency offset estimate value of the first signal applied to the cross correlation value calculation means for output, based on a cross correlation value at each peak position detected by the peak position detection means and reference data corresponding to the reference signals of each set. The adder means accumulates the frequency offset estimate values output from the frequency offset estimation means. The phase rotation means rotates a phase of the reception signal stored in the second memory means, based on the frequency offset estimate value estimated by the frequency offset estimation means. The control means executes a first control operation of applying the reception signal to the cross correlation value calculation means as the first signal to calculate a cross correlation value with respective reference signals of a set corresponding to the smallest reference data of the plurality of reference data, and estimating a frequency offset estimate value of the reception signal by the frequency offset estimation means based on the calculated cross correlation value and the smallest reference data, and repeats a second control operation of applying the reception signal whose phase is rotated based on the estimated frequency offset estimate value and stored in the second memory means to the cross correlation value calculation means as the first signal to calculates a cross correlation value with the set of reference signals corresponding to the smallest unused reference data from the plurality of reference data, and estimating a frequency offset estimate values of the signal stored in the second memory by the frequency offset estimation means, based on the calculated cross correlation value and the smallest unused reference data. The frequency offset compensation means compensates for a frequency offset of the subcarrier of the reception signal based on an added value of the frequency offset estimates accumulated by the adder means and calculated by the first and second control operations.

According to a still further aspect of the present invention, a signal receiver receiving and demodulating a reception signal formed of a data symbol section where symbols are assigned in parallel to a plurality of subcarriers and modulated and a start symbol added ahead of the data symbol section includes: C/N detection means, memory means, reference signal output means, cross correlation value calculation means, peak position calculation means, frequency offset estimation means, and frequency offset compensation means. The C/N detection means detects a C/N of the reception signal. The memory means stores a data table identifying an optimum reference signal corresponding to the C/N of the reception signal. The reference signal output means outputs N(N is an integer of 2 or more) types of optimum reference signals, each corresponding to an arbitrary portion of the start symbol, based on the data table according to the detected C/N. The cross correlation value calculation means calculates a cross correlation value between the reception signal and each of the N types of reference signals. The peak position detection means detects a peak position of each of the N cross correlation values calculated by the cross correlation value calculation means. The frequency offset estimation means estimates a frequency offset estimate value of a subcarrier of the reception signal for output, based on a cross correlation value at each of the N peak positions detected by the peak position detection means. The frequency offset compensation means compensates for a frequency offset of the subcarrier of the reception signal, based on a frequency offset estimate value estimated by the frequency offset estimation means.

According to yet a further aspect of the present invention, a method of compensating for a frequency offset of a subcarrier of a reception signal in a signal receiver receiving and demodulating the reception signal formed of a data symbol section where symbols are assigned in parallel to a plurality of subcarriers and modulated and a start symbol applied ahead of the data symbol section includes the steps of: calculating a cross correlation value between the reception signal and each of N(N is an integer of 2 or more) types of reference signals, each corresponding to an arbitrary portion in the start symbol, detecting a peak position of each of the N calculated cross correlation values, estimating a frequency offset estimate value of a subcarrier of the reception signal for output, based on a cross correlation value at each of the N detected peak positions, and compensating for a frequency offset of the subcarrier of the reception signal based on the estimated frequency offset estimate value.

According to yet another aspect of the present invention, a method of compensating for a frequency offset of a subcarrier of a reception signal in a signal receiver receiving and demodulating the reception signal formed of a data symbol section where symbols are assigned in parallel to a plurality of subcarriers and modulated and a start symbol applied ahead of the data symbol section includes the steps of: calculating a cross correlation value between the reception signal and each of N(N is an integer of 3 or more) types of reference signals, each corresponding to an arbitrary portion in the start symbol, detecting a peak position of the N calculated cross correlation values, estimating and averaging a plurality of frequency offset estimate values of the subcarrier of the reception signal for output, based on the cross correlation value at each of the N detected peak positions, and compensating for a frequency offset of the subcarrier of the reception signal, based on the estimated and averaged frequency offset estimate value.

According to yet a still further aspect of the present invention, a method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of the data symbol section includes a first control step and a second control step. The first control step includes the steps of calculating a cross correlation value between the reception signal and each of N(N is an integer of 2 or more) types of reference signals, each corresponding to an arbitrary portion in a start symbol, detecting the peak position of each of the N calculated cross correlation values, estimating a frequency offset estimate value of the subcarrier of the reception signal, based on a cross correlation value at each of the N detected peak positions for output, as well as accumulating the estimated frequency offset estimate values, rotating the phase of the subcarrier of the reception signal based on the estimated frequency offset estimate value, and storing the phase-rotated reception signal. The second control step includes the steps of calculating a cross correlation value between the stored phase-rotated reception signal and each of the N types of reference signals, detecting a peak position of each of the calculated cross correlation values, estimating a frequency offset estimate value of the subcarrier of the stored phase-rotated reception signal for output, based on the cross correlation value at each of the N detected peak positions, as well as accumulating the estimated frequency offset estimate value, rotating the phase of the subcarrier of the stored phase-rotated reception signal based on the estimated frequency offset estimate value, and storing the phase-rotated reception signal. The method includes the steps of repeating the second control step (N–1) times after the first control step, and compensating for a frequency offset by rotating the phase of the subcarrier of the reception signal based on an added value of the N frequency offset estimate values accumulated by the first and second control steps.

According to an additional aspect of the present invention, a method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of the data symbol section includes the steps of: storing N(N is an integer of 2 or more) types of reference signals, each corresponding to an arbitrary portion of the start symbol and a plurality of reference data based on phase rotation angles between cross correlation values corresponding to a plurality of sets of the reference signals, each set formed of at least two or more types of reference signals, under a state where a particular frequency offset is present, a first control step, and a second control step. The first control step includes the steps of calculating a cross correlation value between the reception signal and respective reference signals of a set corresponding to the smallest reference data from the plurality of reference data, detecting a peak position of each of the calculated cross correlation values, estimating a frequency offset estimate value of the subcarrier of the reception signal, based on the cross correlation value at each of the detected peak positions and the smallest reference data for output, as well as accumulating the estimated frequency offset estimate values, extracting and storing a portion of the reception signal, and rotating the phase of the stored reception signal based on the estimated frequency offset estimate value. The second control step includes the steps of calculating a cross correlation value between the stored reception signal whose phase is rotated based on the estimated frequency offset estimate value and respective reference signals of a set corresponding to the smallest unused reference data of the plurality of reference data, detecting a peak position of each of the calculated cross reference values, and estimating a frequency offset estimate value of the phase-rotated stored reception signal for output, based on the cross correlation value at each of the detected peak positions and the smallest unused reference data, as well as accumulating the estimated frequency offset estimate values. The method further includes the steps of repeating the second control step after the first control step, and compensating for a frequency offset by rotating the phase of the subcarrier of the reception signal based on an added value of the frequency offset estimate values accumulated by the first and second control steps.

According to still another aspect of the present invention, a method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of the data symbol section includes the steps of: detecting the C/N of the reception signal, storing a data table identifying an optimum reference signal corresponding to the C/N of the reception signal, providing N(N is an integer of 2 or more) types of optimum reference signals, each corresponding to an arbitrary portion in the start symbol, based on the data table, according to the detected C/N, calculating a cross correlation value between the reception signal and each of the N types of reference signals, detecting a peak position of each of the N calculated cross reference values, estimating a frequency offset estimate value of the subcarrier of the reception signal for output, based on the cross correlation value at each of the N detected peak positions, and compensating for a frequency offset of the subcarrier of the reception signal based on the estimated frequency offset estimate value.

BEST MODES FOR CARRYING OUT THE INVENTION

First Embodiment

Figure 1:
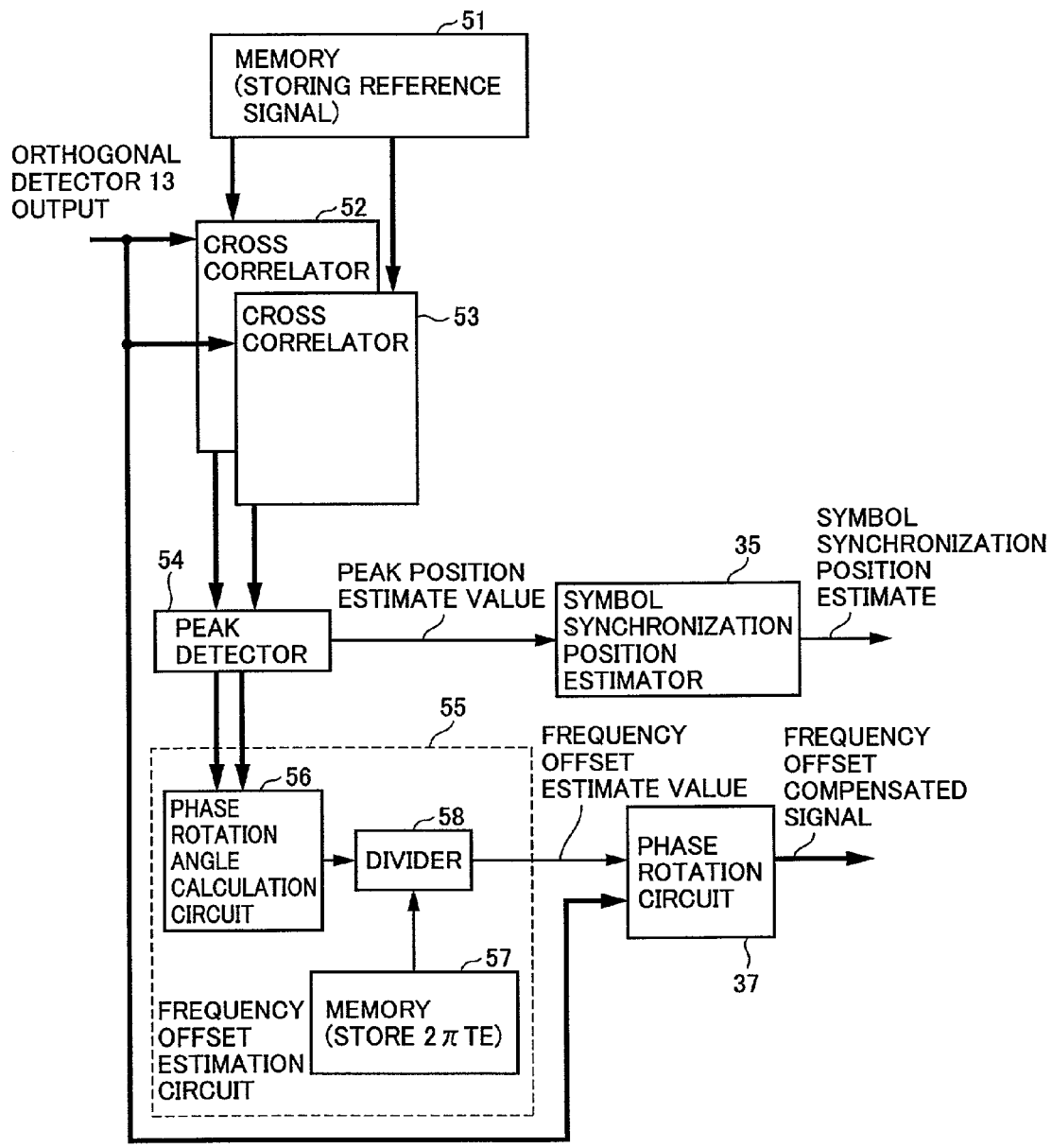
FIG. 1 is a block diagram showing a frequency offset compensator of an OFDM receiver according to a first embodiment of the present invention.

An OFDM receiver according to a first embodiment of the present invention will be described hereinafter with reference to FIGS. 1–6. Components common to the OFDM receiver of conventional art described with reference to FIG. 47 have the same reference character allotted, and description thereof will not be repeated.

The OFDM receiver of the first embodiment is an improved version of frequency offset compensator 14 of the conventional OFDM receiver described with reference to FIG. 47. Components other than frequency offset compensator 14 have a structure similar to those of the conventional OFDM receiver.

Figure 47:
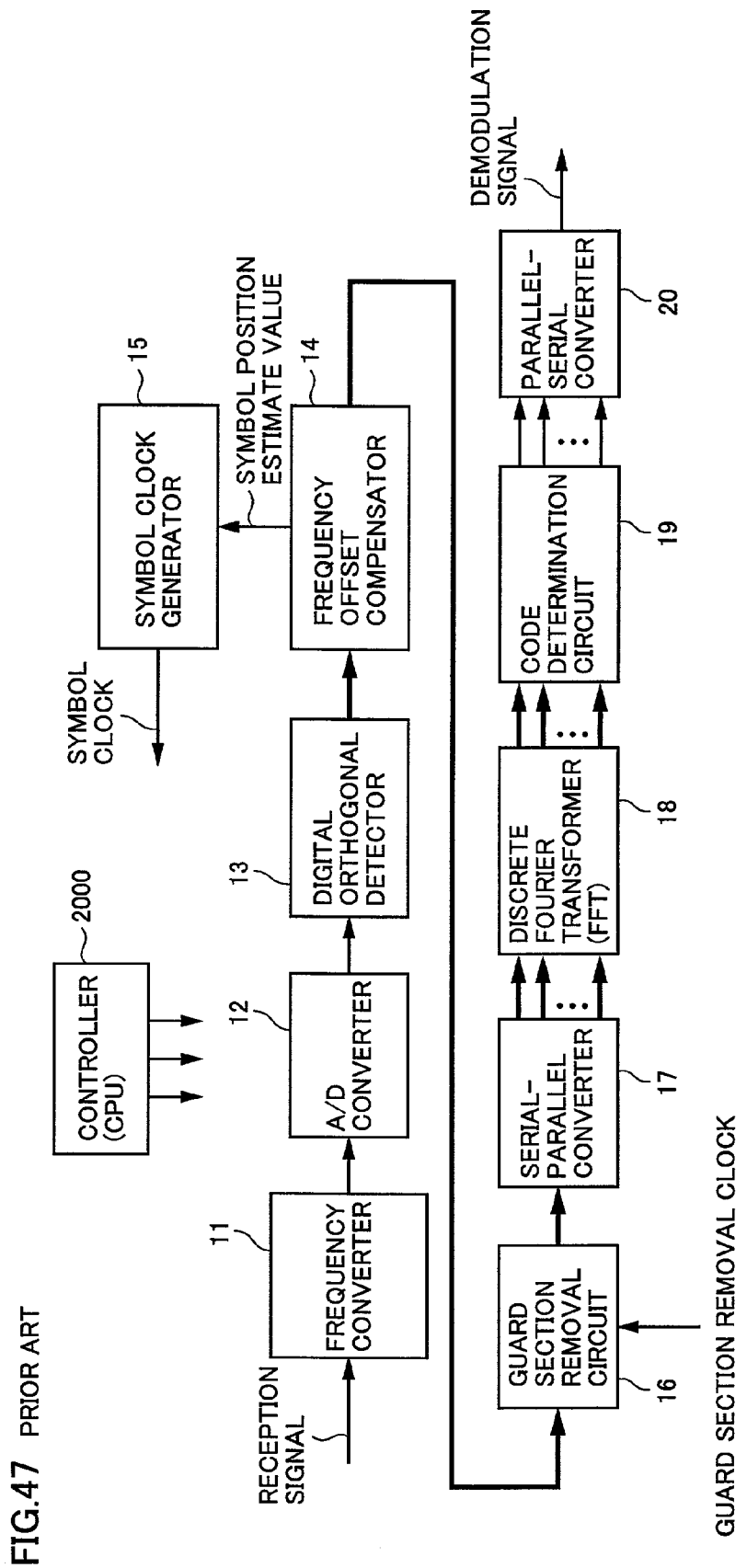
FIG. 47 is a block diagram showing an OFDM receiver of conventional art.

It is assumed that the OFDM receiver of the first embodiment as well as respective embodiments described afterwards has its overall operation controlled by controller 2000 shown in FIG. 47.

The structure of a frequency offset compensator in the OFDM receiver of the first embodiment will be described with reference to FIG. 1. In FIG. 1, the signal line in a bold line represents a complex signal whereas the signal line in a thin line represents a real number signal.

A memory 51 in FIG. 1 stores N(N=2 in the first embodiment) types of signals, each corresponding to an arbitrary portion in a start symbol, as reference signals. Cross correlators 52 and 53 calculate the cross correlation values between the output signal from digital orthogonal detector 13 (FIG. 47) and respective ones of the two reference signals stored in memory 51.

Peak detector 54 detects a peak position of each output of cross correlators 52 and 53. Frequency offset estimation circuit 55 calculates a phase rotation angle to estimate a frequency offset value of a received OFDM signal based on the cross correlation value at each peak position detected at peak detector 54.

Frequency offset estimation circuit 55 includes a phase rotation angle calculation circuit 56 calculating a phase rotation angle based on the cross correlation value of each peak position detected at peak detector 54, a memory 57 storing reference data (equivalent estimated time difference) $2\pi TE$ corresponding to the two reference signals stored in memory 51, and a divider 58 dividing the output of phase rotation angle calculation circuit 56 by reference data $2\pi TE$ stored in memory 57.

By calculating the phase rotation angle $\Delta\theta ref$ between cross correlation values calculated corresponding to the two reference signals stored in memory 51 in a state where a particular frequency offset $\Delta fref$ is present, reference data stored in memory 57 can be obtained. More specifically, reference data (equivalent time difference in reference signals) TE which is a value based on the waveform and position of the reference signal stored in memory 51 can be obtained using the following equation.

$TE = \Delta\theta ref / 2\pi \Delta fref$

Figure 2:
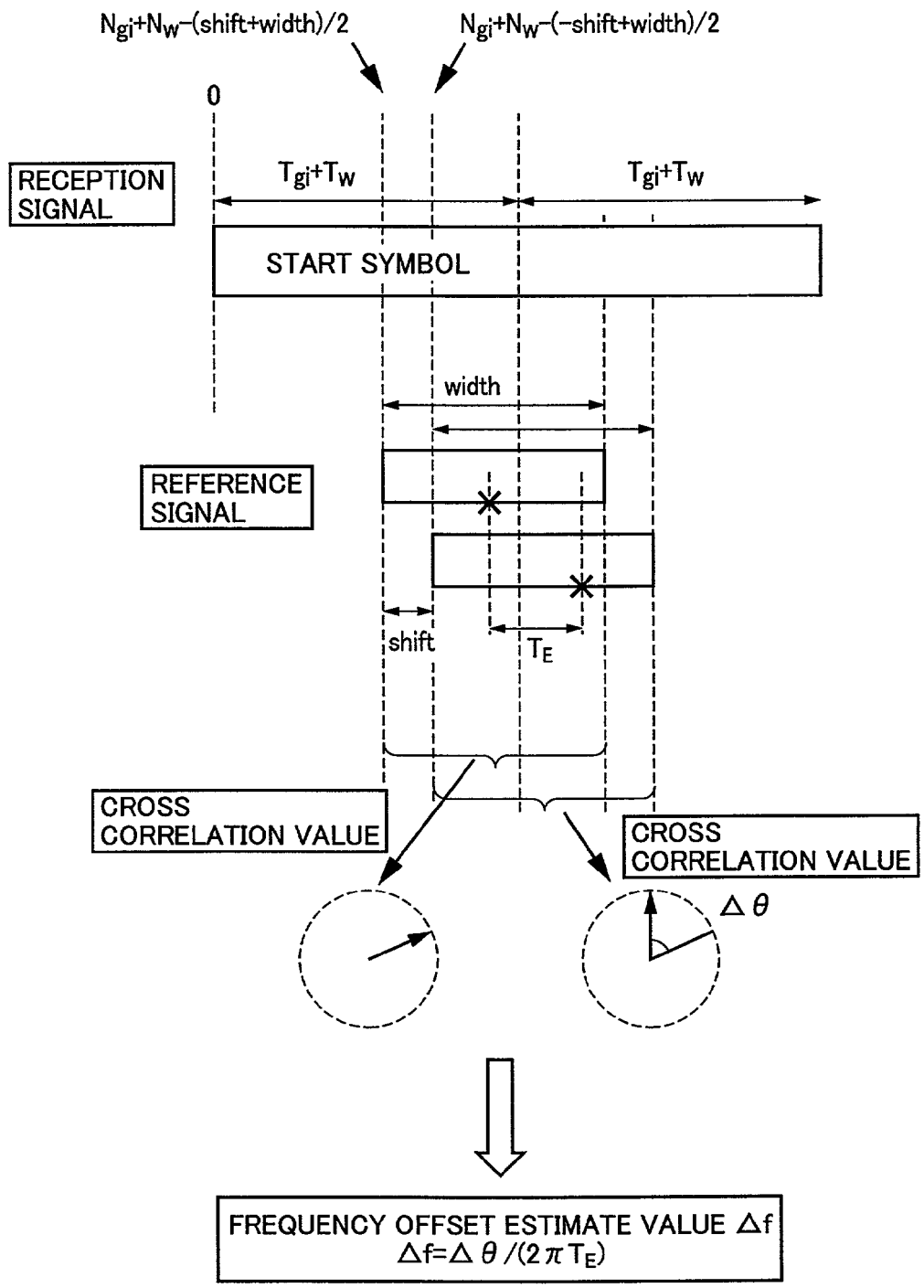
FIG. 2 is a diagram to describe the operation mechanism of the frequency offset compensator of the OFDM receiver according to the first embodiment of the present invention. x represents the equivalent estimated position to a phase rotation angle. Ngi represents the number of samples included in Tgi. Nw represents the number of samples included in Tw.

The operation of the frequency offset compensator of FIG. 1 will be described with reference to FIG. 2. It is assumed that the two reference signals corresponding to portions in two consecutive start symbols each have a width "width" and shifted in timing from each other by "shift", as shown in FIG. 2.

More specifically, when the number of samples included in time Tgi and time Tw are Ngi and Nw, respectively, the first reference signal is a signal corresponding to the start symbol of the section represented by Ngi+Nw−(shift+width)/2 to Ngi+Nw−(shift−width)/2 calculating from the head of the start symbol. The second reference signal is a signal corresponding to the start symbol of the section represented by Ngi+Nw−(−shift+width)/2 to Ngi+Nw−(−shift−width)/2 calculating from the head of the start symbol.

Cross correlators 52 and 53 calculate the cross correlation values between the reception signal from digital orthogonal detector 13 (FIG. 47) and respective ones of the above two reference signals. Phase rotation angle calculation circuit 56 obtains a phase rotation angle $\Delta\theta$ of a reception signal from the cross correlation value at each calculated peak position. By dividing this phase rotation angle $\Delta\theta$ by reference data $2\pi TE$ stored in memory 57, frequency offset estimate $\Delta f = \Delta\theta/(2\pi TE)$ can be estimated.

Based on this frequency offset estimate $\Delta f$, phase rotation circuit 37 can compensate for a frequency offset of the reception signal from digital orthogonal detector 13 (FIG. 47).

Figure 3:
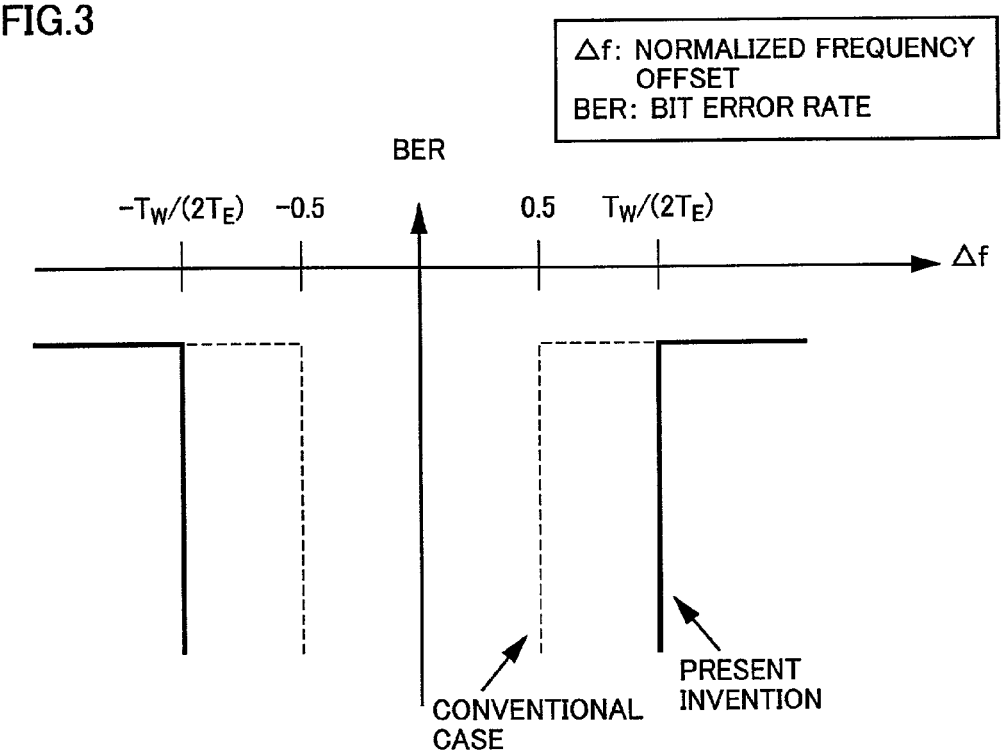
FIG. 3 is a diagram to describe the normalized frequency offset versus bit error rate characteristics of the frequency offset compensator of the OFDM receiver according to the first embodiment of the present invention.

In the case where two reference signals are used as described above, the estimation range of the normalized frequency offset can be set from $-Tw/(2TE)$ to $+Tw/(2TE)$, as shown in FIG. 3, differing from the frequency range of frequency offset value $\Delta f$.

More specifically, when TE<Tw, the compensation range of frequency offset can be enlarged in the OFDM receiver of the first embodiment in comparison to the aforementioned conventional case.

The example of FIG. 3 shows the normalized frequency offset (horizontal axis) versus bit error rate characteristics (BER: Bit Error Rate) (vertical axis) when the sampling clock synchronization and symbol timing synchronization are completely established, and the number of samples Nw (number of points of FFT 18 (FIG. 47)) included in the valid symbol section length Tw is 64 and the number of subcarriers N is 48.

Figure 4:
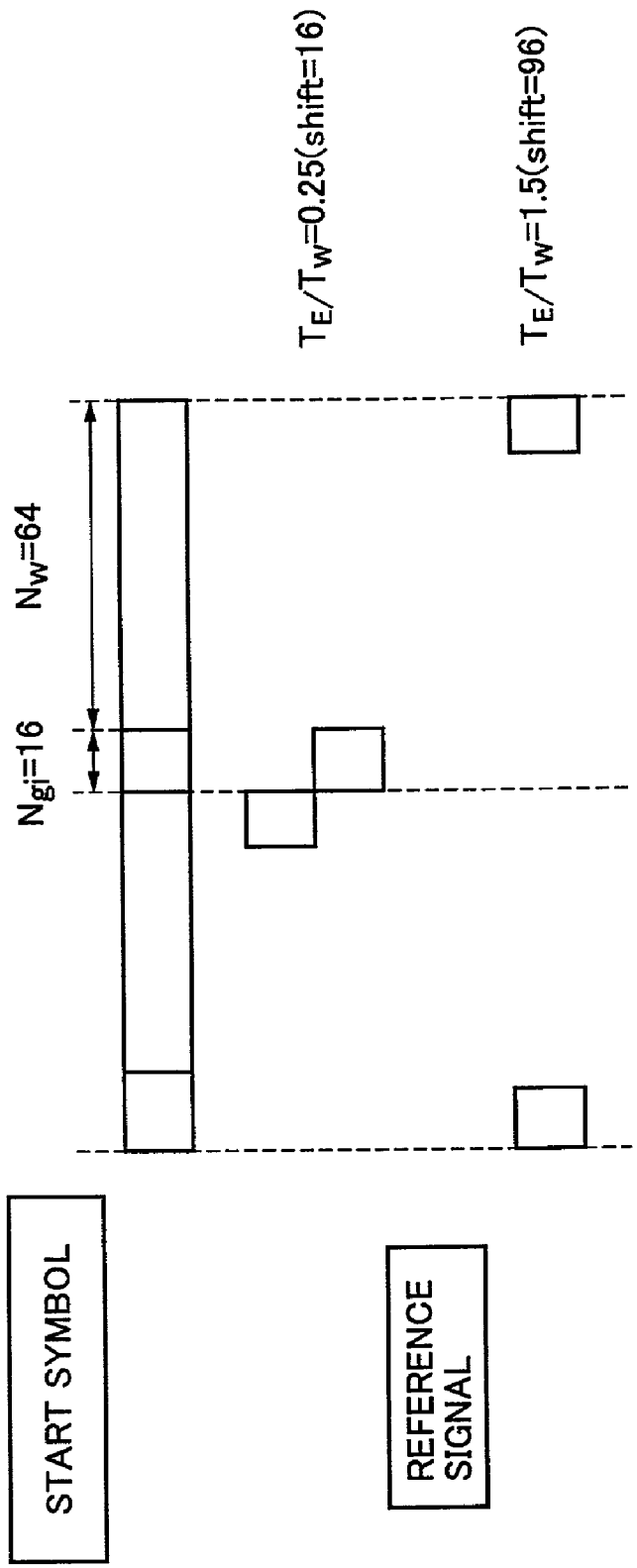
FIG. 4 is a diagram to describe the position of a reference signal for a start symbol of the frequency offset compensator of the OFDM receiver according to the first embodiment of the present invention.

FIG. 4 shows the positions of the two reference signals in the start symbol when the width (number of samples) "width" of the two reference signals is 16, and the TE/Tw is 0.25 and 1.5, respectively (reference signal shift (number of samples) "shift" is set to 16 and 96, respectively).

When there is an error $n\theta$ in the phase rotation angle, the frequency offset estimate value becomes $\Delta f + nf = (\Delta\theta + n\theta)/(2\pi TE)$, resulting in frequency offset estimate error nf. More specifically, when the value of TE is small, the influence by error $n\theta$ of the phase rotation angle (frequency offset estimate error nf with respect to frequency offset estimate value $\Delta f$) increases to cause error floor.

Figure 5:
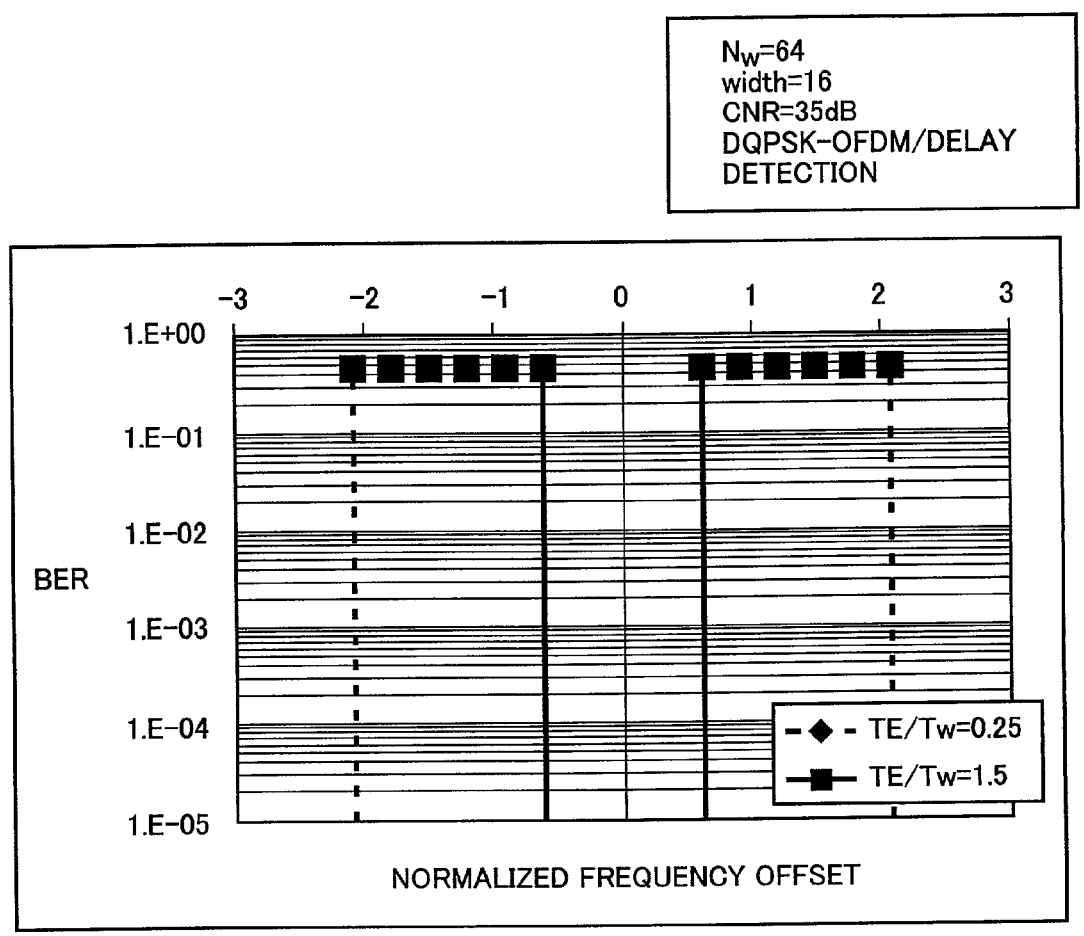
FIG. 5 is a diagram to describe the normalized frequency offset versus bit error rate characteristics when a reference signal with different reference data (equivalent estimated time difference) TE is used in a frequency offset compensator having a high CNR of the OFDM receiver according to the first embodiment of present invention.
Figure 7:
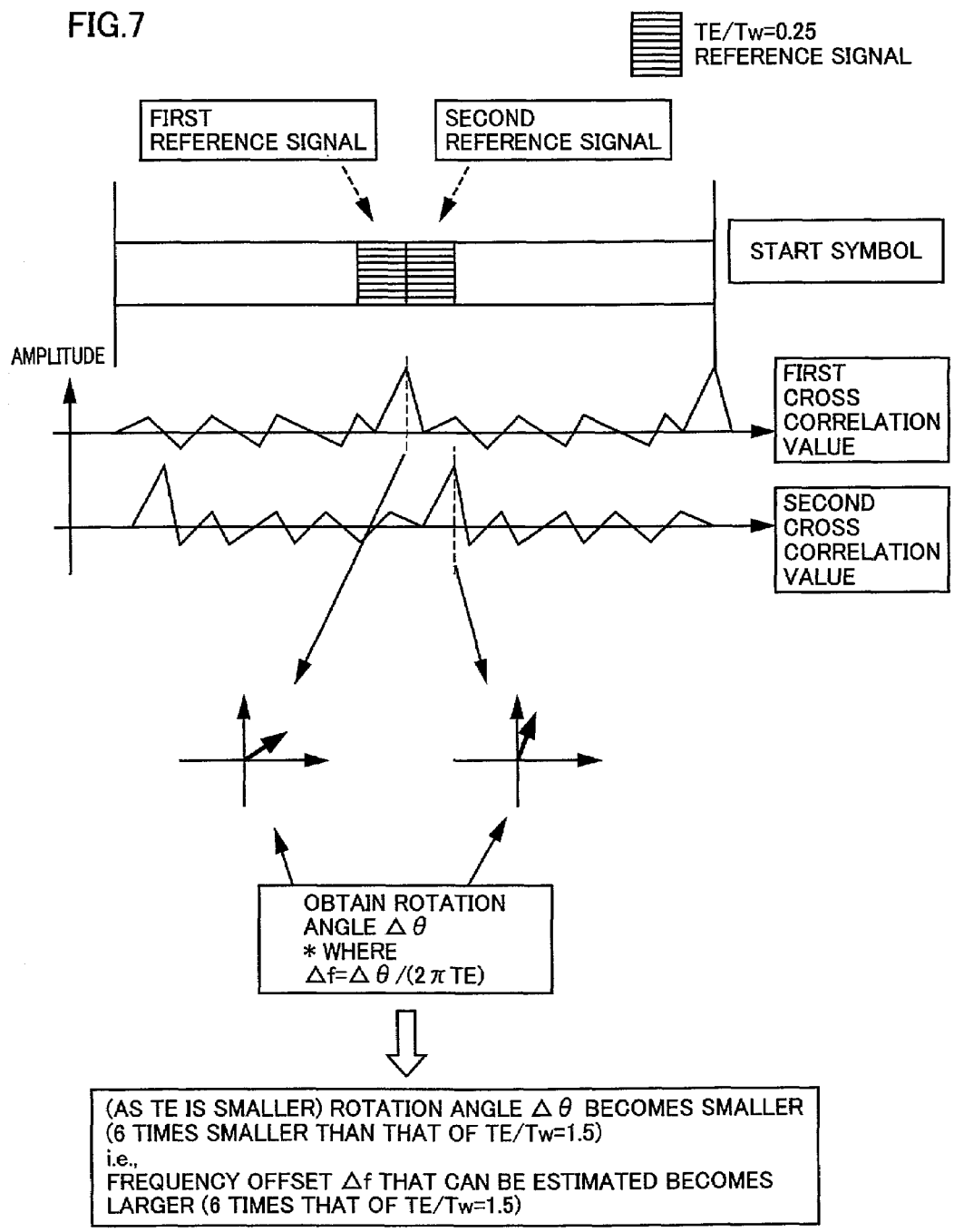
FIG. 7 is a diagram to describe increase in a frequency offset that can be estimated when noise is relatively small and TE/Tw is small in the frequency offset compensator of the OFDM receiver.
Figure 8:
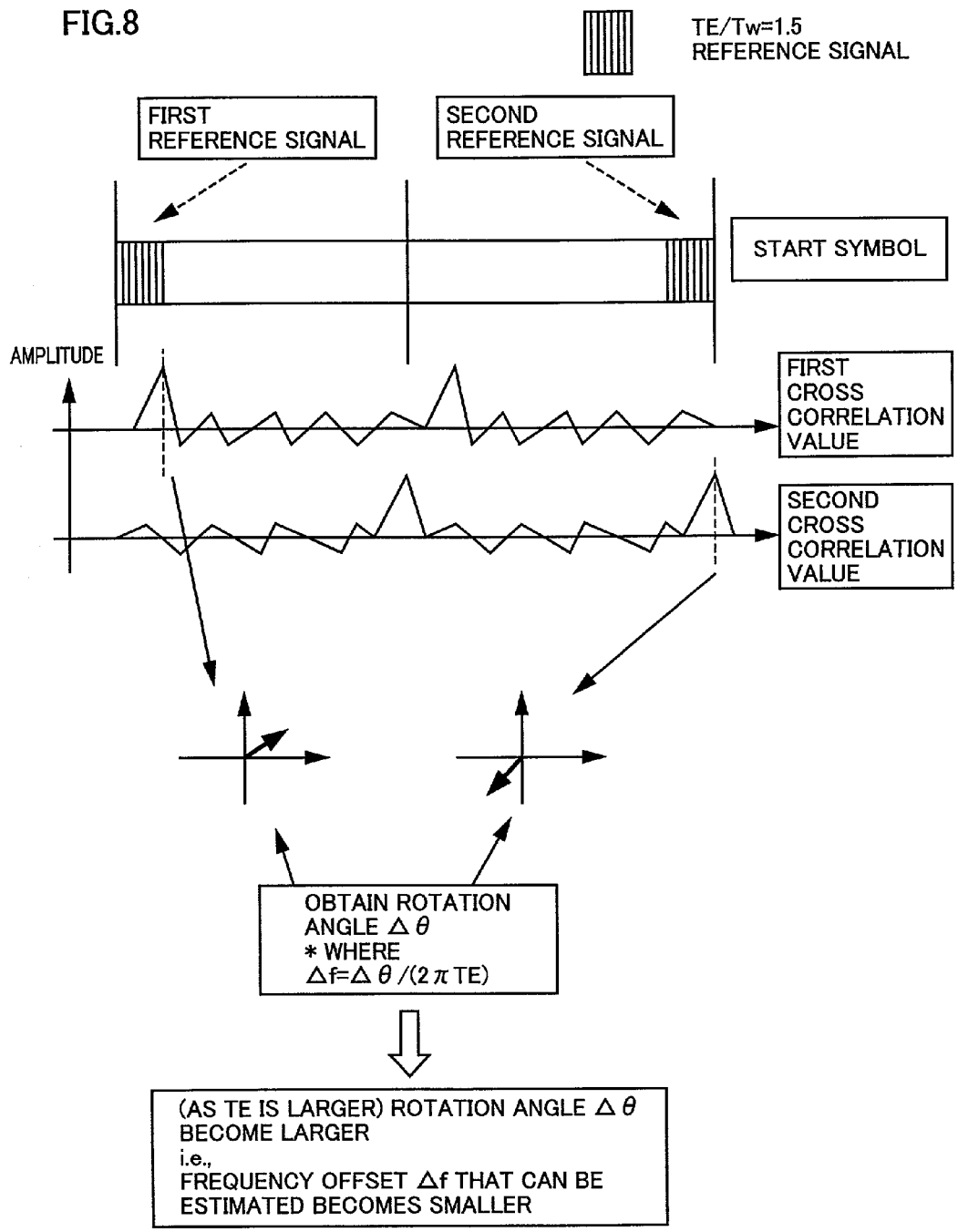
FIG. 8 is a diagram to describe reduction in a frequency offset that can be estimated when TE/Tw is large in the frequency offset compensator of the OFDM receiver.

For example, consider the case where the noise is small as shown in FIG. 5 (for example, CNR (carrier-to-noise)=35 db). In the case where a certain frequency offset $\Delta f$ is present, the rotation angle $\Delta\theta$ becomes smaller (⅙ times larger than when TE/Tw=1.5) in the case TE/Tw=0.25 as shown in FIG. 7 than when TE/Tw=1.5, as shown in FIG. 8, by the relationship of $$\Delta f = \Delta\theta/(2\pi TE) \text{ (where } -\pi < \Delta\theta < \pi\text{)}$$

It is to be noted that the range of $\Delta\theta$ is $-\pi < \Delta\theta < \pi$. Therefore, the range of the frequency offset that can be estimated is increased (six times that when TE/Tw=1.5) as rotation angle $\Delta\theta$ with respect to a certain frequency offset $\Delta f$ becomes smaller (that is, TE/Tw becomes smaller).

This means that the range of the frequency offset that can be estimated can be increased by reducing the value of reference data TE when the noise is small as in FIG. 5.

Figure 9:
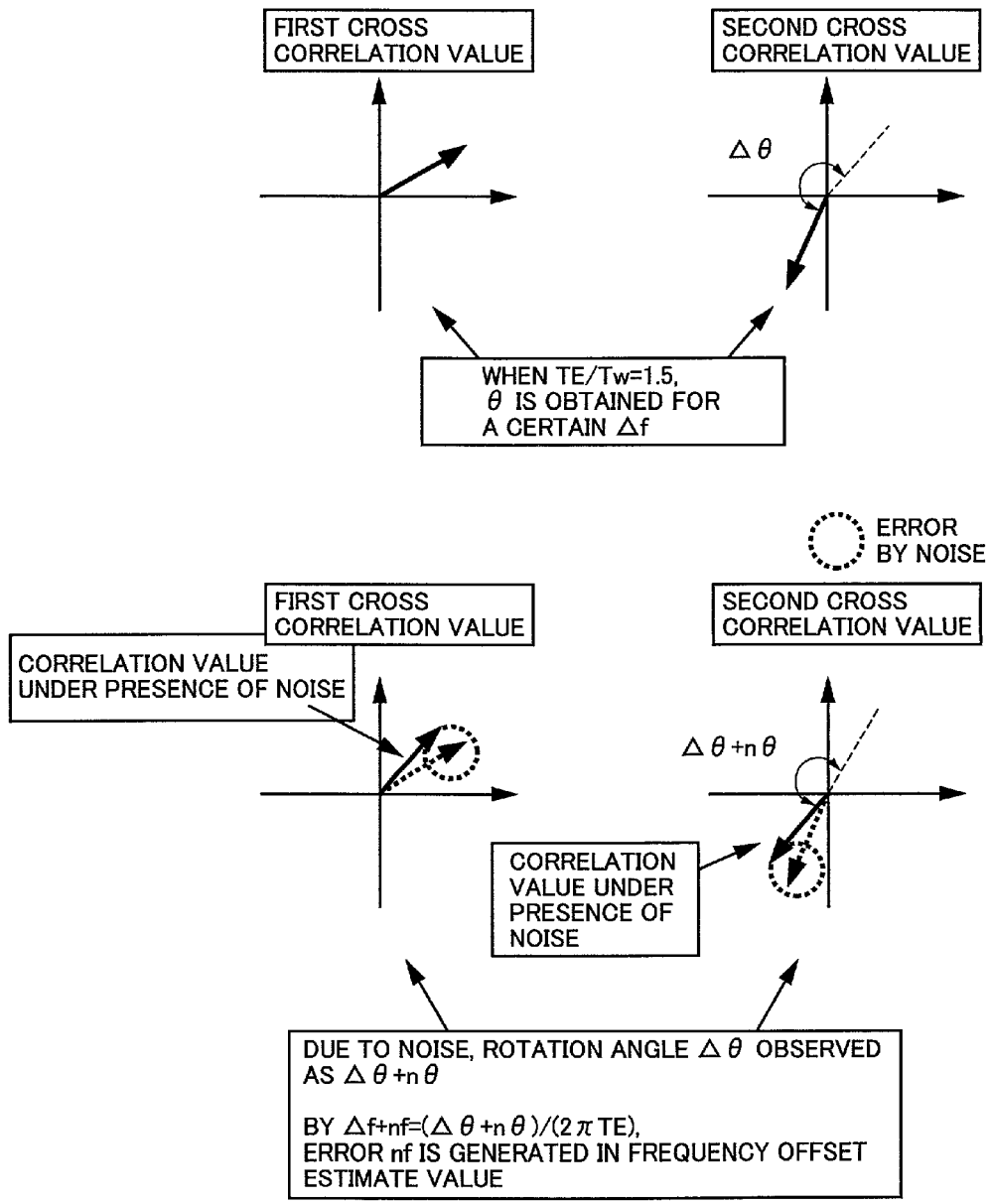
FIG. 9 is a diagram to describe increase in a frequency offset estimate error due to noise when TE/Tw is small in the frequency offset compensator of the OFDM receiver.
Figure 10:
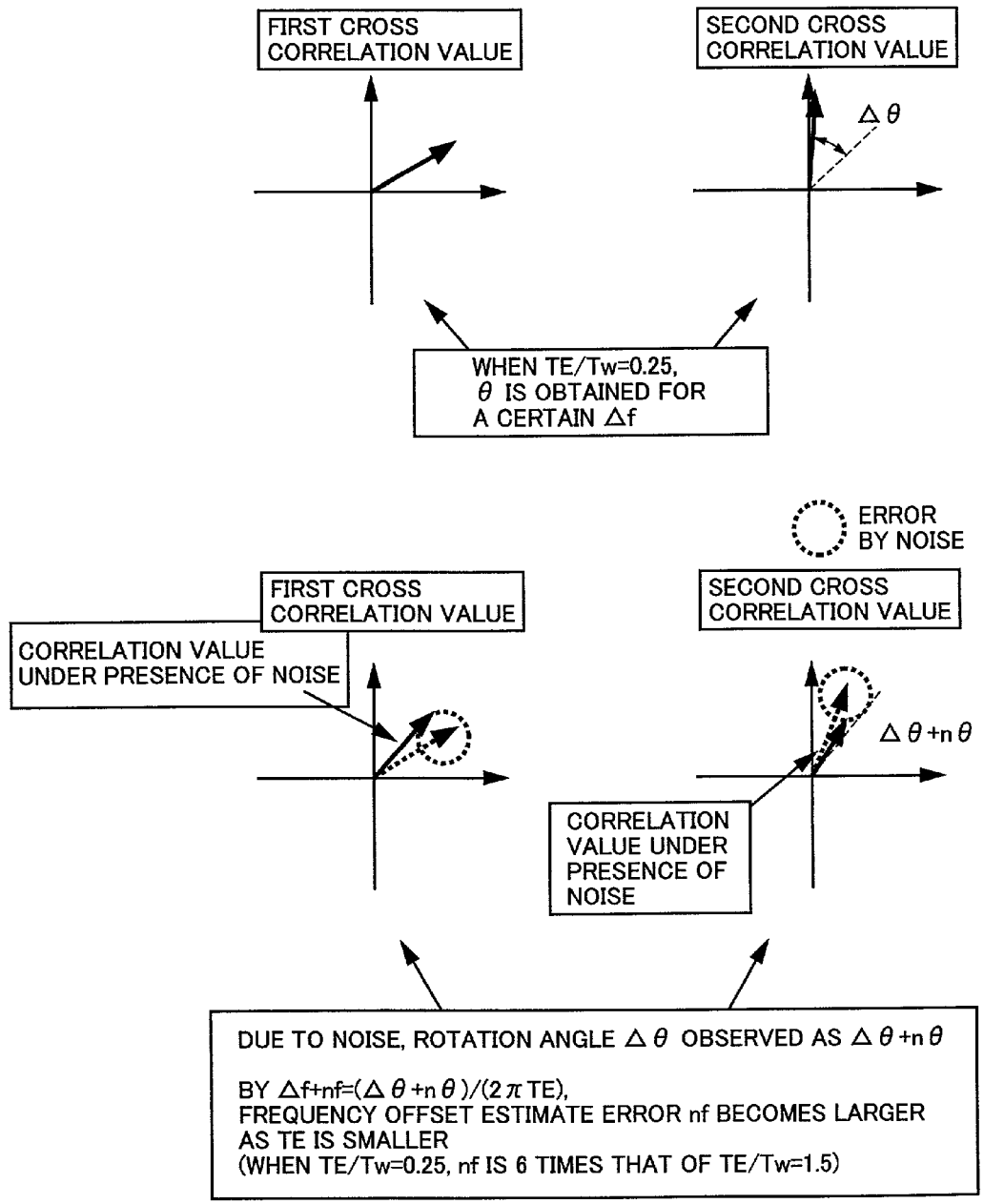
FIG. 10 is a diagram to describe reduction in a frequency offset estimate error due to noise when TE/Tw is large in the frequency offset compensator of the OFDM receiver.

The presence of noise will cause error in the cross correlation value. As a result, error $n\theta$ is generated for rotation angle $\Delta\theta$ as shown in FIGS. 9 and 10.

Here, error nf due to noise is also generated in the frequency offset estimate value. As a result, the frequency offset estimate value is $$\Delta f + nf = (\Delta\theta + n\theta)/(2\pi TE)$$

Therefore, estimate error nf of frequency offset is relatively increased as TE is reduced under the circumstance where noise is present (in the case of TE/Tw=0.25, 6 times that of TE/Tw=1.5).

Figure 6:
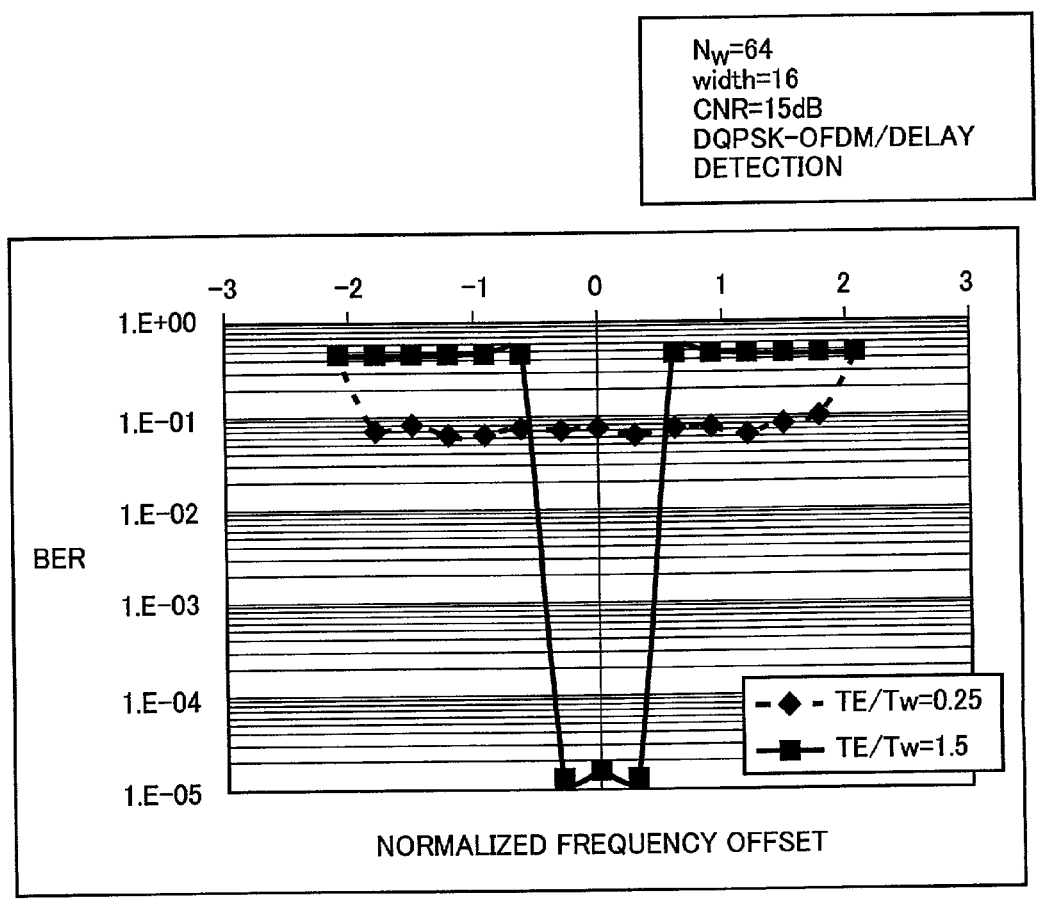
FIG. 6 is a diagram to describe the normalized frequency offset versus bit error rate characteristics when a reference signal with different reference data (equivalent estimated time difference) TE is used in a frequency offset compensator having a low CNR of the OFDM receiver according to the first embodiment of present invention.

Therefore, error floor occurs since frequency offset estimate error nf is great when TE/Tw=0.25, as shown in FIG. 6, whereas error floor does not occur when TE/Tw=1.5 since frequency offset estimate error nf is suppressed to a relatively low level.

It is therefore appreciated that the estimate error of a frequency offset can be further reduced by increasing reference data TE value.

Thus, the estimation range and accuracy of the frequency offset value can be set arbitrarily depending upon the selection of the value of time difference reference data TE equivalent to the reference signal, i.e. selection of the reference signal per se.

Although two continuous start symbols each having the length of Tgi+Tw are employed as known symbols to be added ahead of the data symbol in the first embodiment, the length of the start symbol and the number of consecutive start symbols are not limited thereto. Start symbols of an arbitrary length and arbitrary number can be added.

The first embodiment was described for a frequency offset compensator that estimates frequency offset with two reference signals as one set (N=2). Generally, the estimate error of frequency offset caused by noise can be suppressed by estimating the frequency offset of two or more reference signals as one set (N≧2).

Second Embodiment

A frequency offset compensator of an OFDM receiver according to a second embodiment of the present invention with two or more reference signals as one set will be described with reference to FIGS. 11 and 12. Components common to those of the frequency offset compensator of the first embodiment shown in FIG. 1 have the same reference character allotted, and description thereof will not be repeated.

Figure 11:
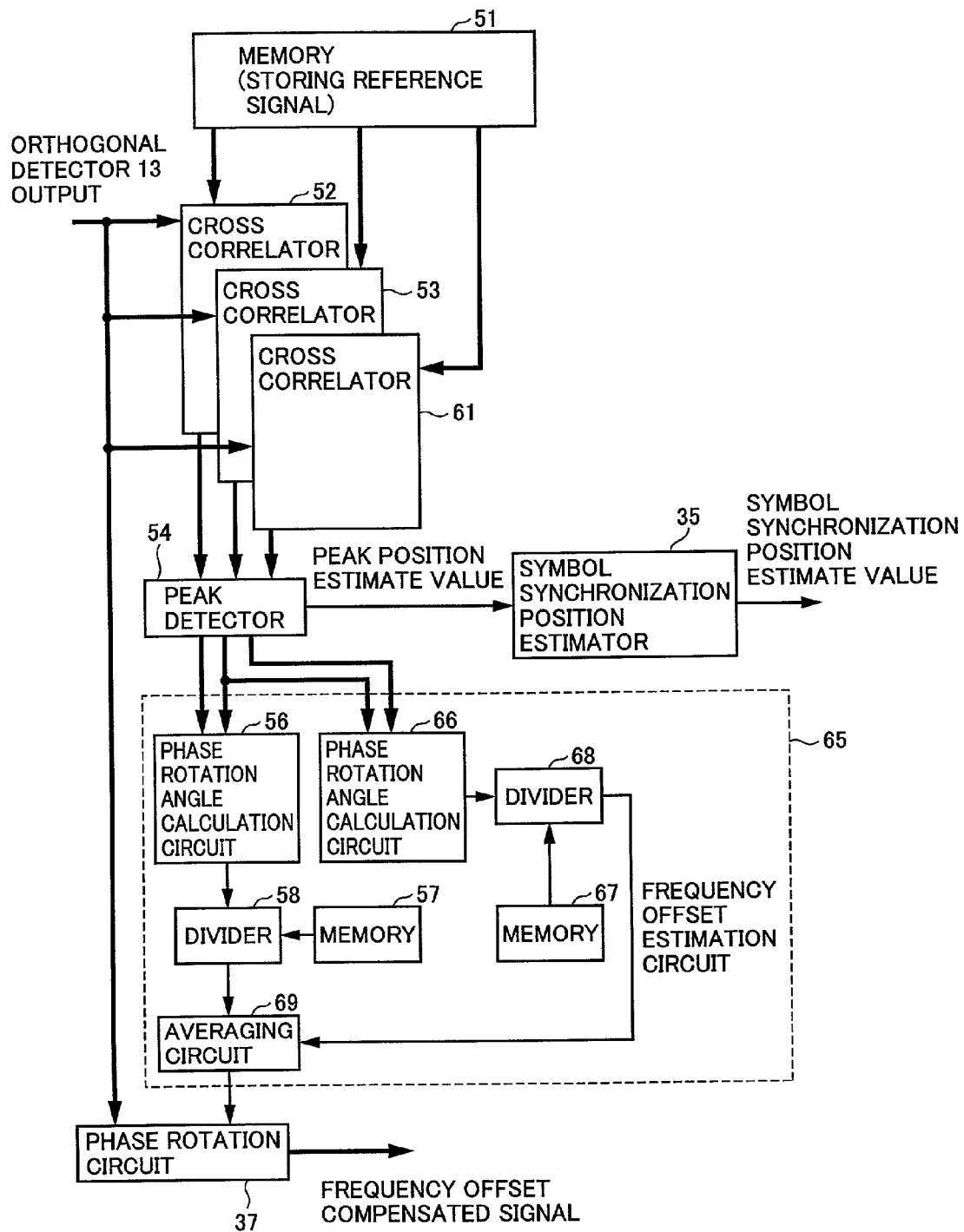
FIG. 11 is a block diagram showing a frequency offset compensator of an OFDM receiver according to a second embodiment of the present invention.
Figure 12:
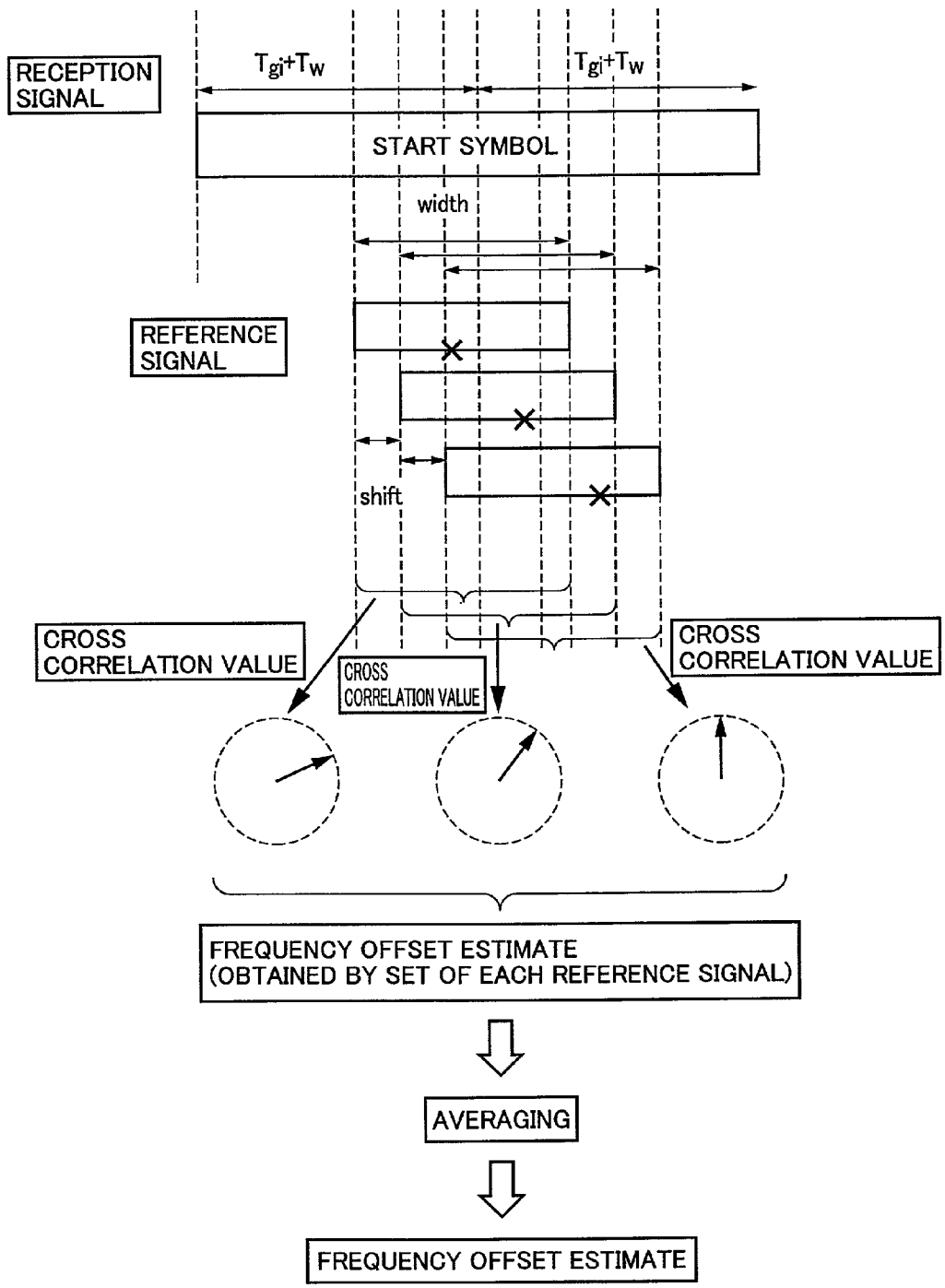
FIG. 12 is a diagram to describe the operation mechanism of the frequency offset compensator of the OFDM receiver according to the second embodiment of the present invention. x represents the equivalent estimated position of the phase rotation angle.

As shown in FIG. 11, the OFDM receiver of the second embodiment includes a memory storing three types (N=3) of reference signals, each corresponding to an arbitrary portion in a start symbol, cross correlators 52, 53 and 61 calculating the cross correlation values between the signal output from digital orthogonal detector 13 (FIG. 47) and respective ones of the three reference signals stored in memory 51, a peak detector 54 detecting the peak position of each of the outputs of cross correlators 52, 53 and 61, and a frequency offset estimation circuit 65 estimating a frequency offset value based on the cross correlation value at each peak position detected at peak detector 54.

Frequency offset estimation circuit 65 includes a phase rotation angle calculation circuit 56 calculating a phase rotation angle of a reception signal from each cross correlation value obtained with respect to first and second reference signals, a divider 58 dividing the output of phase rotation angle calculation circuit 56 by reference data (equivalent estimated time difference) $2\pi TE1$ stored in memory 57, a phase rotation angle calculation circuit 66 calculating the phase rotation angle of a reception signal from respective cross correlation values obtained for second and third reference signals, a divider 68 dividing the output of phase rotation angle calculation circuit 66 by reference data (equivalent estimated time difference) $2\pi TE2$ stored in memory 67, and an averaging circuit 69 obtaining the average between the output of divider 58 and the output of divider 68 to output the average as a frequency offset estimate value.

The operation of the frequency offset compensator of the second embodiment will be described hereinafter with reference to FIG. 12. Here, the three reference signals corresponding to portions in two consecutive start symbols each have a width "width" and shifted in timing sequentially by "shift" from each other, as shown in FIG. 12. By calculating the cross correlation value between respective ones of the three reference signals and the reception signal, the phase rotation angle of the reception signal is obtained from each cross correlation value. Then by comparing these phase rotation angles with each other, the frequency offset is estimated.

Since three reference signals are used in the second embodiment, the cross correlation values at respective peak positions of the corresponding cross correlation values, i.e. three phase rotation angles, are obtained. Based on the obtained phase rotation angles, phase rotation angle calculation circuits 56 and 66 can calculate 2 (=N–1) phase rotation angle differences.

The phase rotation angle difference calculated by phase rotation angle calculation circuit 56 is divided by reference data (equivalent estimated time difference) $2\pi TE1$ corresponding to the first and second reference signals stored in memory 57. Also, the phase rotation angle difference calculated by phase rotation angle calculation circuit 66 is divided by reference data (equivalent estimated time difference) $2\pi TE2$ corresponding to second and third reference signals stored in memory 67. These divided results are all averaged and regarded as the frequency offset estimate value. Accordingly, estimate error caused by noise can be suppressed in estimating the frequency offset value.

Similar to the first embodiment, reference data (equivalent time difference in reference signals) TEn (n=1~N–1) is calculated from the phase rotation angle of respective cross correlation values when a certain frequency offset is applied in advance to the start symbol in the second embodiment. Using the calculated reference data, each frequency offset estimate value $\Delta fn = \Delta \theta/(2\pi TEn)(n=1\sim N-1)$ is obtained, where $$\Delta f = \Sigma \Delta fn/(N-1)$$

is output to phase rotation circuit 37 as the frequency offset estimate value. Based on this averaged frequency offset estimate value, phase rotation circuit 37 can compensate for a frequency offset of the reception signal from digital orthogonal detector 13 (FIG. 47).

When the number of types N of the reference signal is increased as in the above-described second embodiment, N–1 frequency offset estimate values are obtained and averaged to be provided as the eventual frequency offset estimate value. Therefore, frequency offset estimation that is impervious to noise can be implemented.

Figure 48:
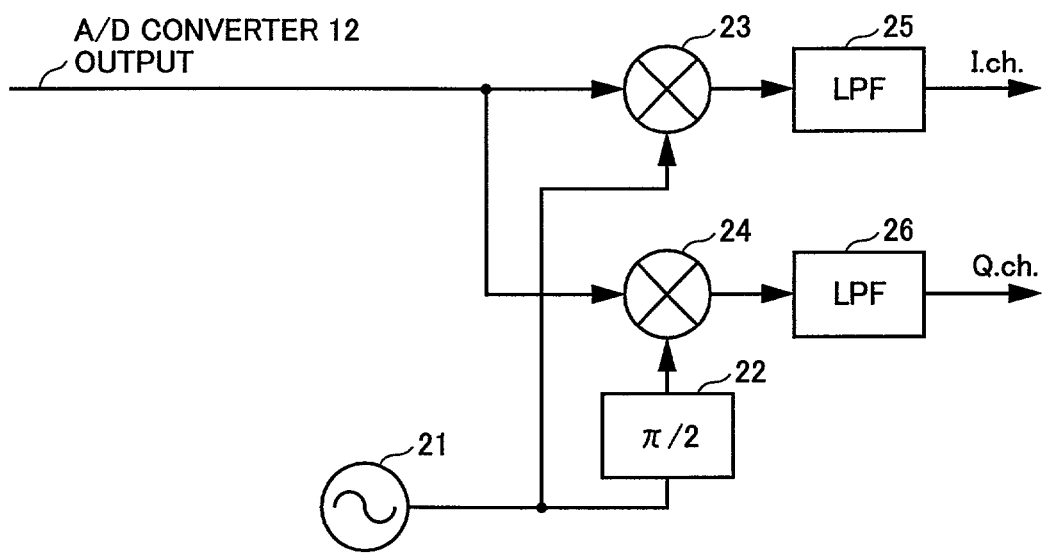
FIG. 48 is a block diagram showing an example of a digital orthogonal detector in an OFDM receiver of conventional art.
Figure 49:
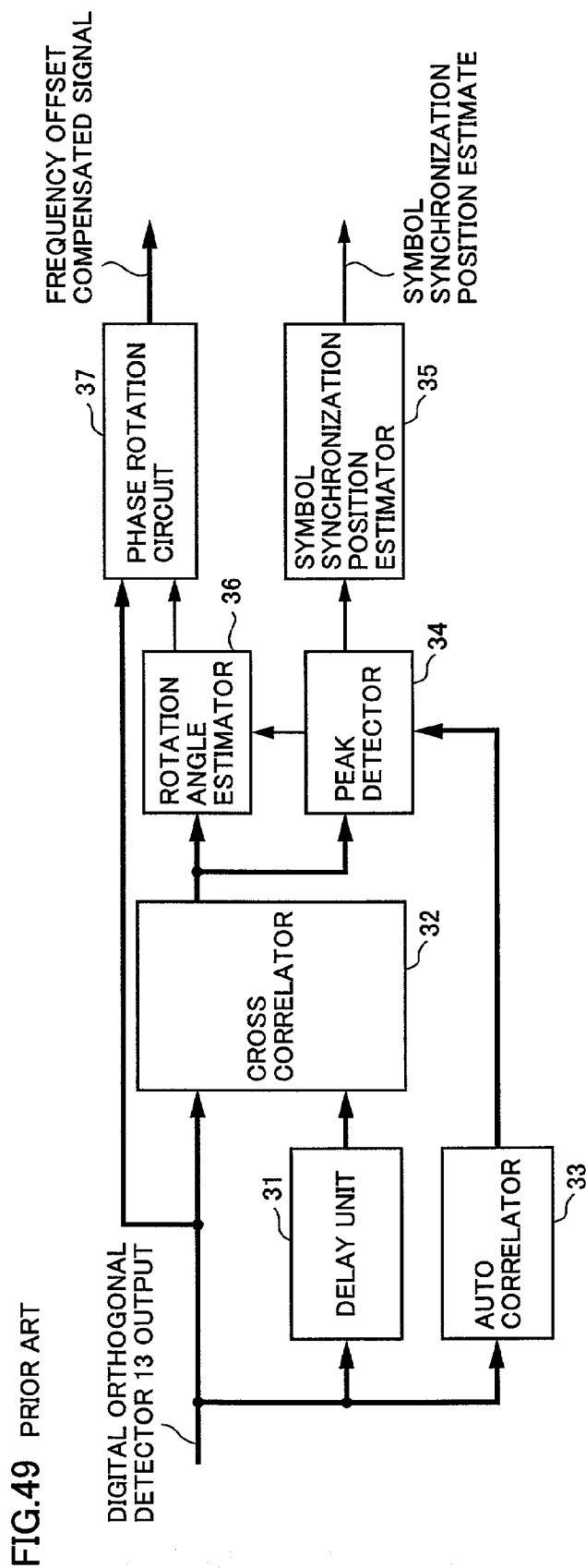
FIG. 49 is a block diagram showing an example of a frequency offset compensator in an OFDM receiver of conventional art.
Figure 50:
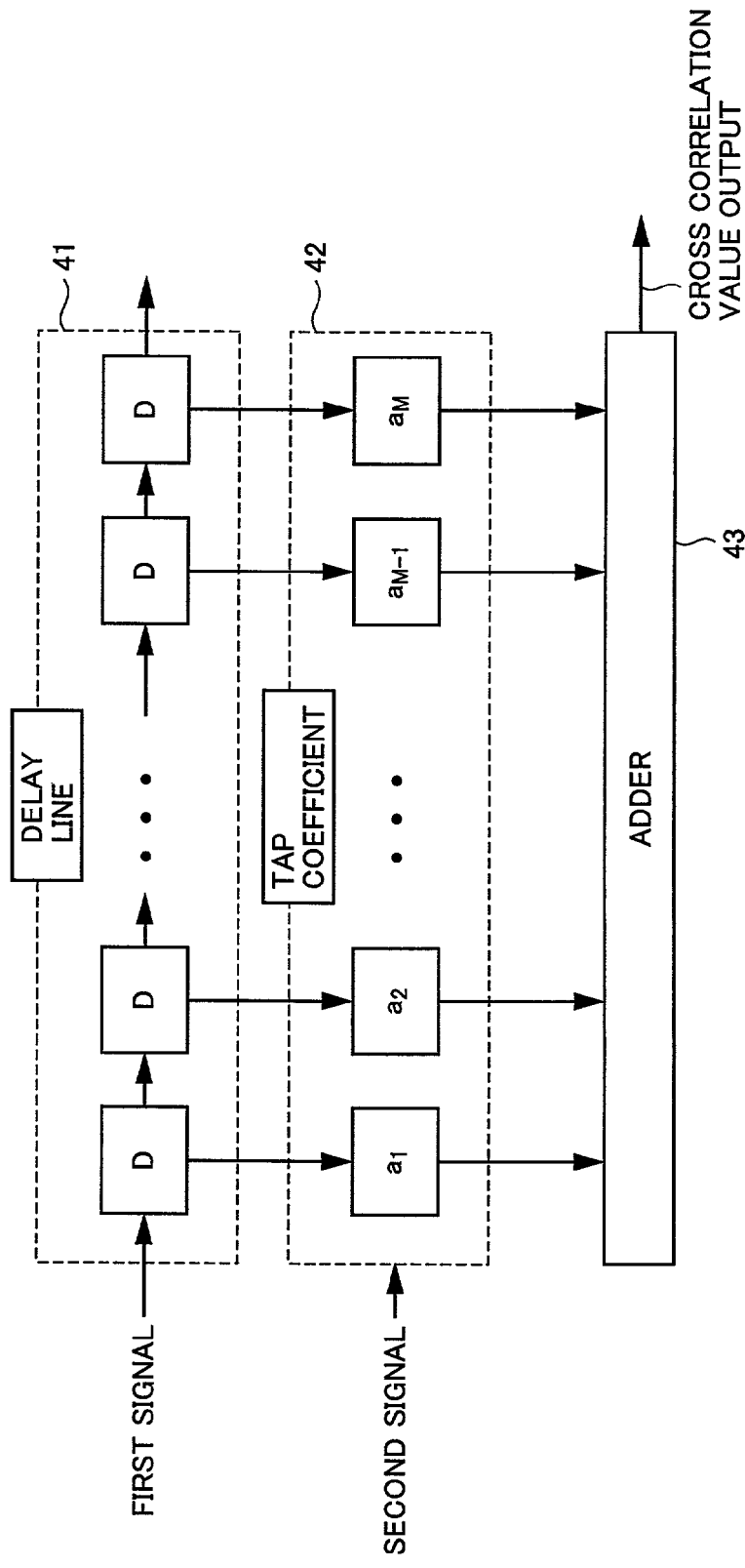
FIG. 50 is a block diagram showing a correlator of a frequency offset compensator in an OFDM receiver of conventional art.
Figure 51:
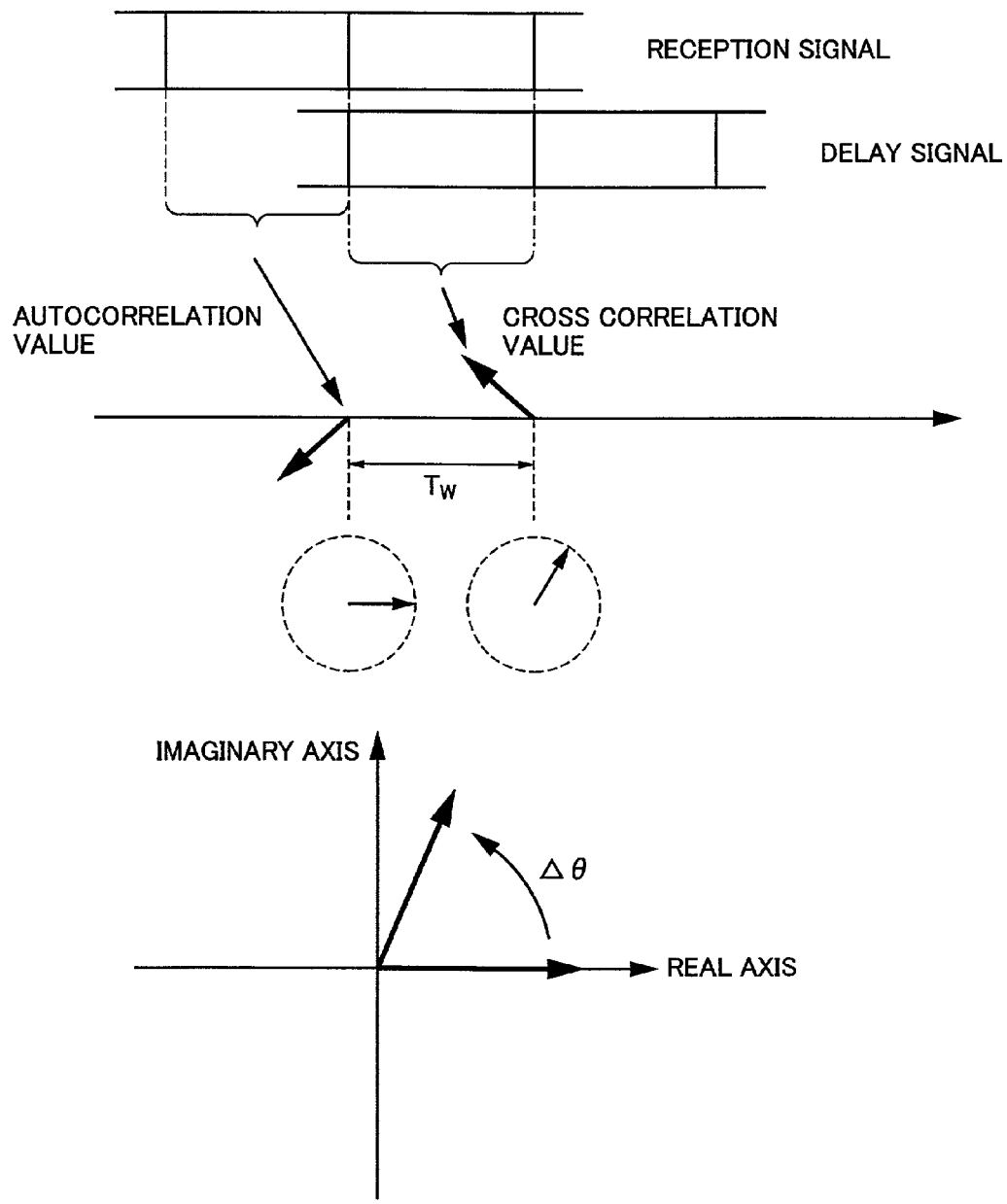
FIG. 51 is a diagram to describe the operation mechanism of a frequency offset compensator in an OFDM receiver of conventional art.

In the frequency offset compensator of the above first and second embodiments, the frequency offset is compensated by the phase rotation of a reception signal through phase rotation circuit 37. The frequency offset of a reception signal can be compensated for without using phase rotation circuit 37. More specifically, frequency offset value $\Delta f$ obtained at frequency offset estimation circuit 65 is applied to the control input of local oscillator 21 (FIG. 48) in digital orthogonal detector 13 to control the oscillation frequency variably.

Third Embodiment

An OFDM receiver according to a third embodiment of the present invention will be described with reference to FIGS. 13–20. Components common to those of the frequency offset compensator in the first embodiment shown in FIG. 1 have the same reference character allotted, and description thereof will not be repeated.

Before describing the structure of the third embodiment, the reason why the accuracy of estimation is improved by repeatedly estimating the frequency offset will be described.

In general, accuracy of the frequency offset estimate is degraded as the frequency offset becomes greater.

Figure 13:
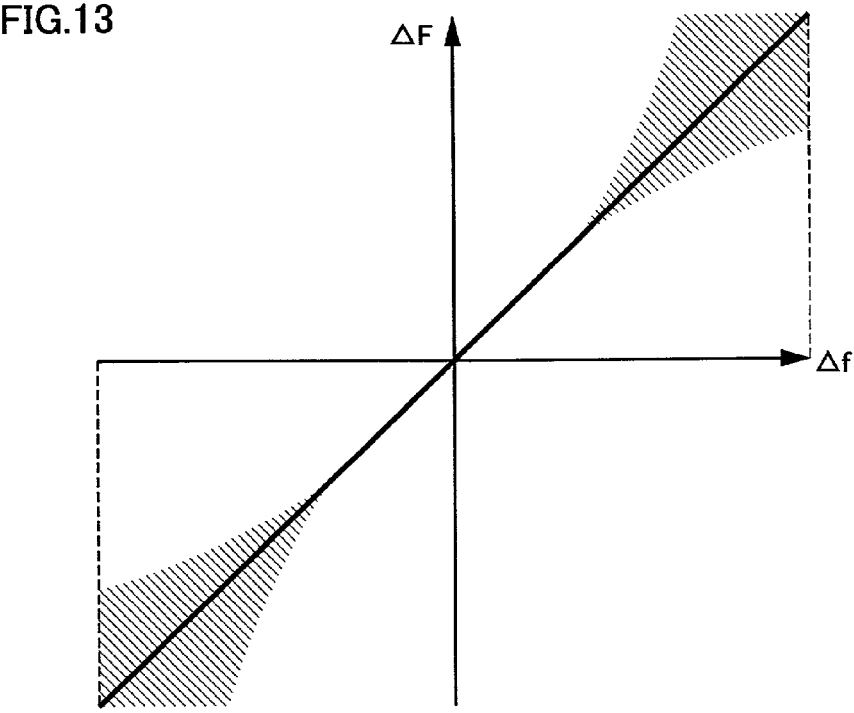
FIG. 13 is a graph showing the relationship between a frequency offset value and a frequency offset estimate value by the general frequency offset estimation method in a frequency offset compensator of an OFDM receiver. The bold solid line represents the noiseless portion. The hatched region represents the frequency offset estimate error range when there is noise. Δf represents the frequency offset value. ΔF represents the frequency offset estimate value.

The graph of FIG. 13 represents the general relationship between a frequency offset value and a frequency offset estimate value. It is appreciated from the graph that the frequency offset estimate error becomes larger as the frequency offset value increases. This is considered to be caused by the amplitude of the cross correlation value becoming smaller when the frequency offset is great to become more susceptible to noise since the frequency offset is obtained by the phase rotation angle of a cross correlation value between a start symbol included in a reception signal and a reference signal in estimating the frequency offset value.

Figure 14:
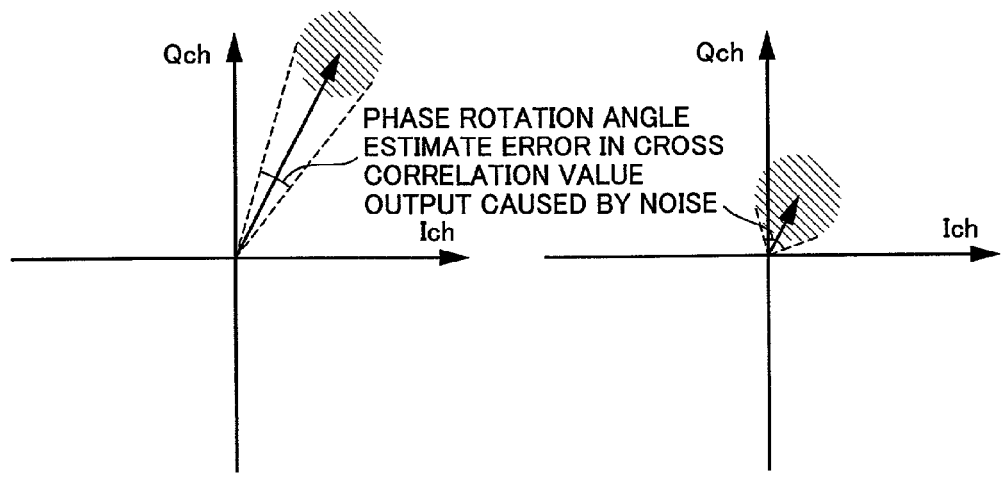
FIG. 14 is a diagram to describe increase in the estimated error of the phase angle of a cross correlation value when the amplitude of the cross correlation value becomes smaller in a frequency offset compensator of an OFDM receiver. The hatched region represents the error range of the cross correlation value output due to noise.

It is appreciated from the graph of FIG. 14 that the estimate error of the phase angle of the cross correlation value becomes greater since the noise is increased with respect to the amplitude of the cross correlation value as the amplitude of the cross correlation value becomes smaller.

The third embodiment is directed to reduce the frequency offset estimate error by repeatedly executing frequency offset estimation.

Figure 15:
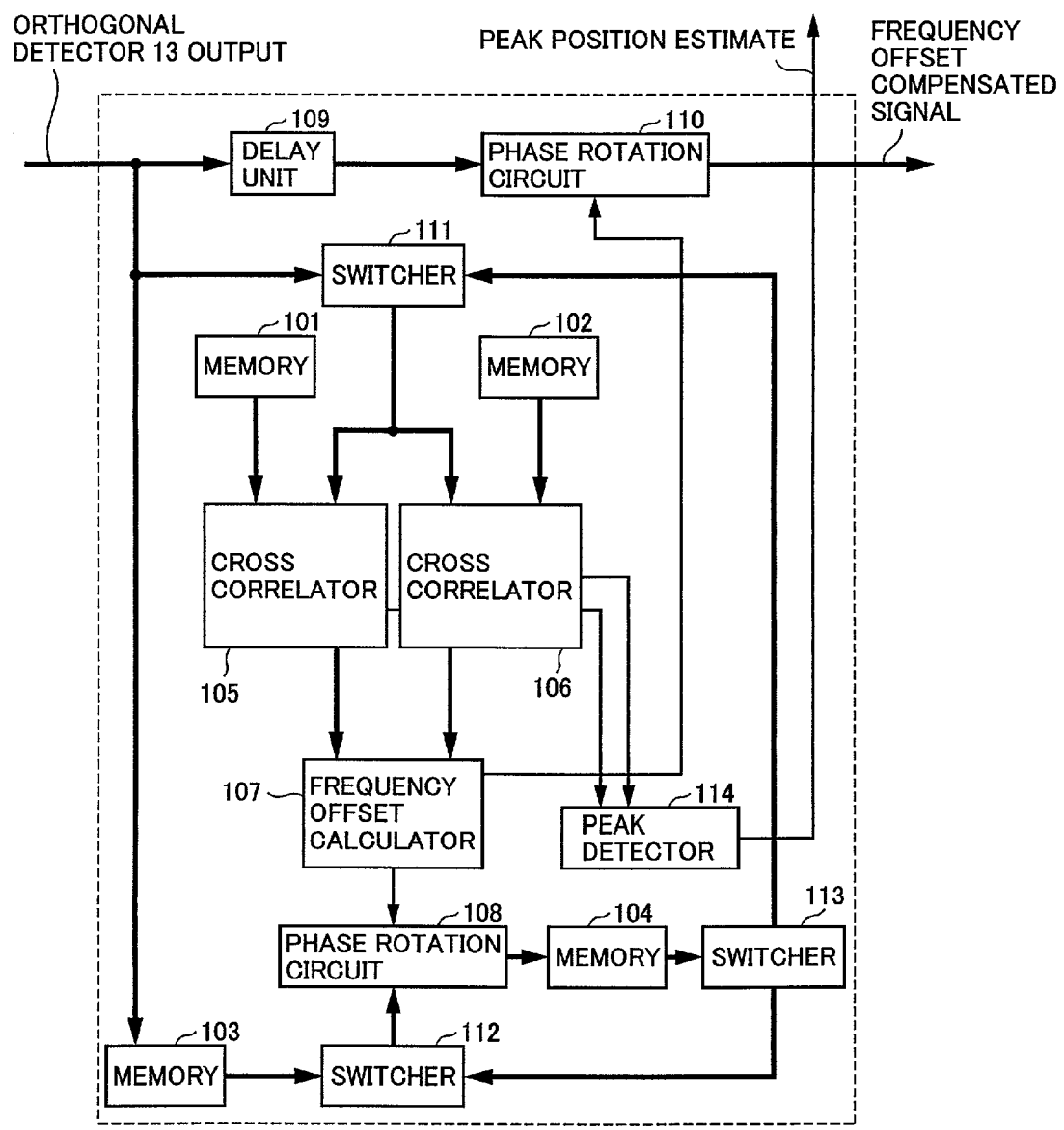
FIG. 15 is a block diagram of a frequency offset compensator of an OFDM receiver according to a third embodiment of the present invention.

Referring to FIG. 15, the frequency offset compensator of the OFDM receiver of the third embodiment includes memories 101 and 102 storing reference signals, a memory 103 storing a reception signal only during the period of time required to calculate a frequency offset, a memory 104 storing the output of phase rotation circuit 108, cross correlators 105 and 106 calculating the cross correlation values between the output of digital orthogonal detector 13 (FIG. 47) or the received start symbol stored in memory 104 and respective reference signals stored in memories 101 and 102, a peak detector 114 detecting a peak position from the output of each cross correlator to estimate a symbol synchronizing position, a frequency offset calculator 107 calculating the phase rotation angle from the outputs of cross correlators 105 and 106 to estimate a frequency offset value, a phase rotation circuit 108 rotating the phase of the output from memory 103 or 104 based on the output from frequency offset calculator 107, and then providing the result to memory 104, a delay unit 109 delaying the output of orthogonal detector 13 (FIG. 47) by a period of time required to compensate for frequency offset, a phase rotation circuit 110 rotating the phase of the signal output from delay unit 109 based on the output from frequency offset calculator 107, a switcher 111 selectively switching between the outputs of digital orthogonal detector 13 (FIG. 47) and memory 104 to provide the selected output to cross correlators 105 and 106, a switcher 112 selectively switching between the output of memory 103 and the output of memory 104 to provide the selected output to phase rotation circuit 108, and a switcher 113 selectively switching the signal stored in memory 104 to one input of switcher 111 or 112.

The switching operation of switchers 111, 112 and 113 are under control of control signals from controller 2000 (FIG. 47).

The operation of the frequency offset compensator according to third embodiment will be described with reference to the block diagrams of FIGS. 16–18.

Figure 16:
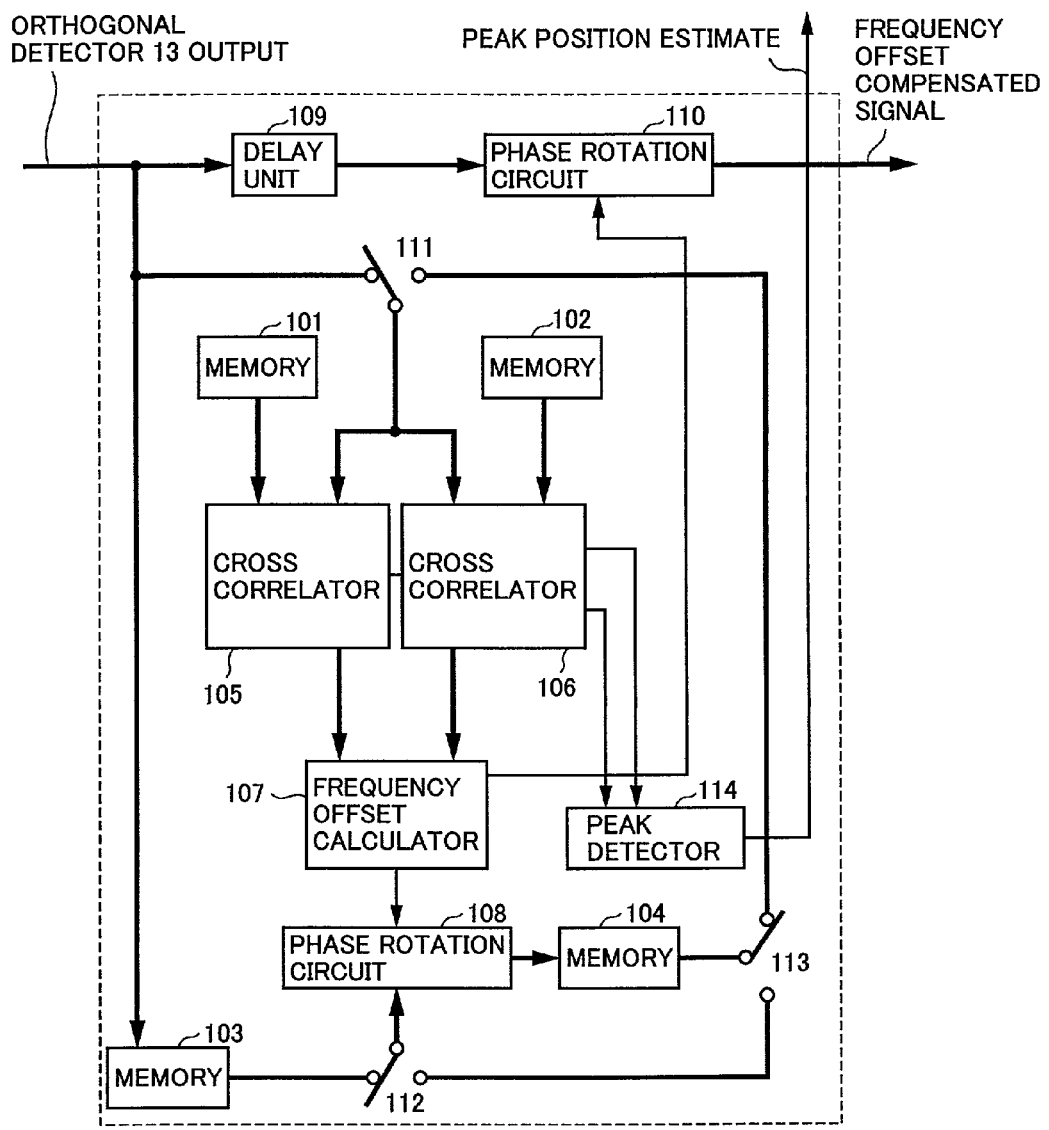
FIG. 16 is a block diagram to describe the operation of the frequency offset compensator of the OFDM receiver according to the third embodiment of the present invention.

As shown in FIG. 16, switching control is effected by controller 2000 so that switcher 111 is connected to the output side of digital orthogonal detector 13 (FIG. 47), switcher 112 is connected to the memory 103 side, and switcher 113 is connected to the switcher 111 side. The signal from digital orthogonal detector 13 is applied to both cross correlators 105 and 106 through switcher 111. Cross correlators 105 and 106 obtain cross correlation values with respective reference signals stored in memories 101 and 102. The cross correlation values calculated at respective cross correlators are applied to frequency offset calculator 107.

The signal from digital orthogonal detector 13 is stored in memory 103 at the same time.

Frequency offset calculator 107 calculates the frequency offset estimate based on the two applied cross correlation values. According to the calculated frequency offset estimate value, phase rotation circuit 110 rotates the phase of the output of delay unit 109. Delay unit 109 holds the output of orthogonal detector 13 during the period of time required to calculate the frequency offset estimate value, and provides the same to phase rotation circuit 110 following completion of frequency offset estimation. Accordingly, frequency offset is compensated for from the beginning of the reception data. Phase rotation circuit 108 rotates the phase of the signal stored in memory 103 based on the calculated frequency offset estimate value. The result is stored in memory 104.

Figure 17:
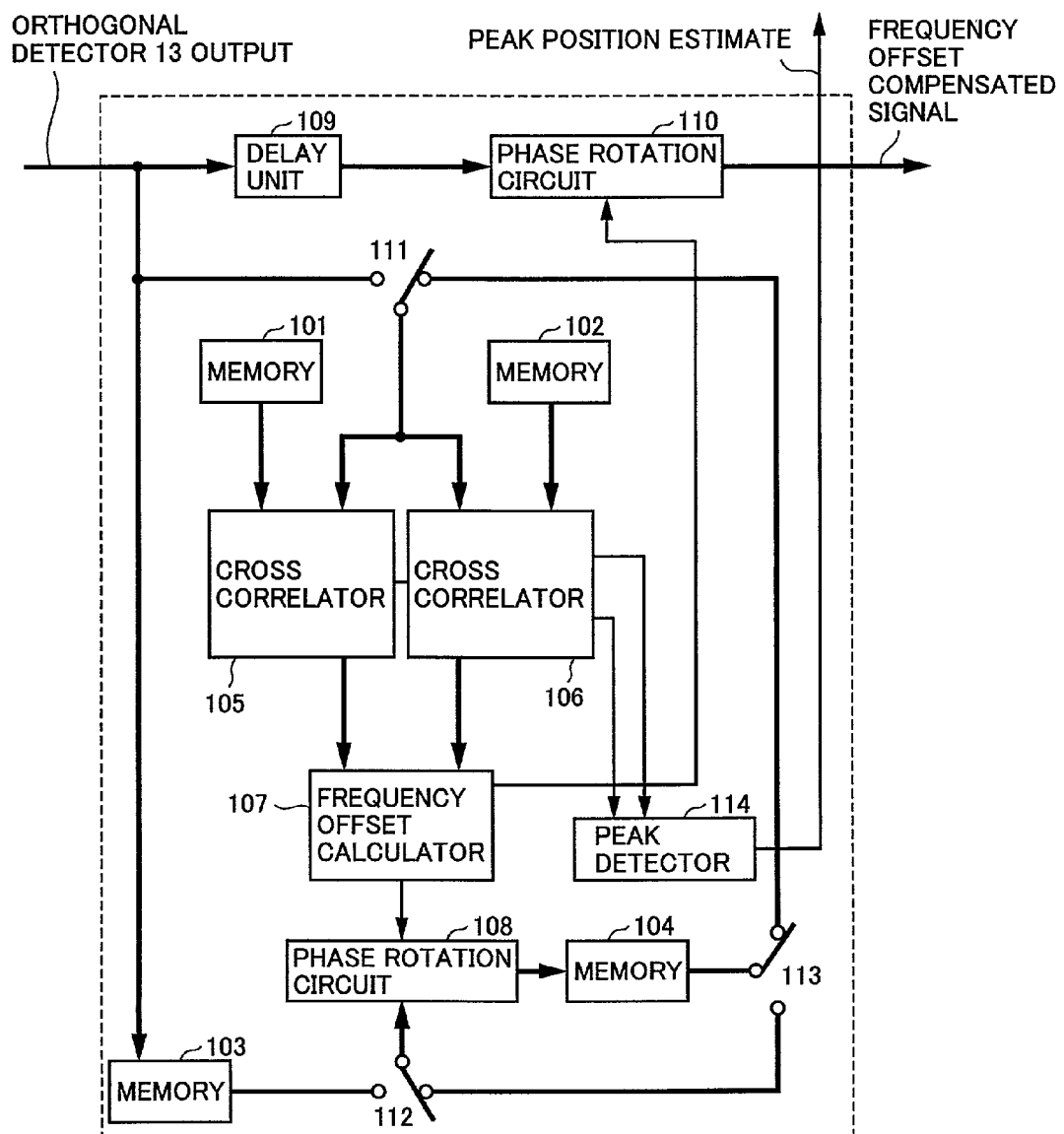
FIG. 17 is a block diagram to describe an operation of the frequency offset compensator of the OFDM receiver according to the third embodiment of the present invention.

Then, switching control is effected by controller 2000 so that switcher 111 is connected to the switcher 113 side and switcher 112 is connected to the switcher 113 side, as shown in FIG. 17. Cross correlators 105 and 106 calculate the cross correlation values between the signal stored in memory 104 and respective reference signals stored in memories 101 and 102. Based on the calculated cross correlation values, frequency offset calculator 107 calculates and provides a frequency offset estimate value to phase rotation circuits 108 and 110.

Figure 18:
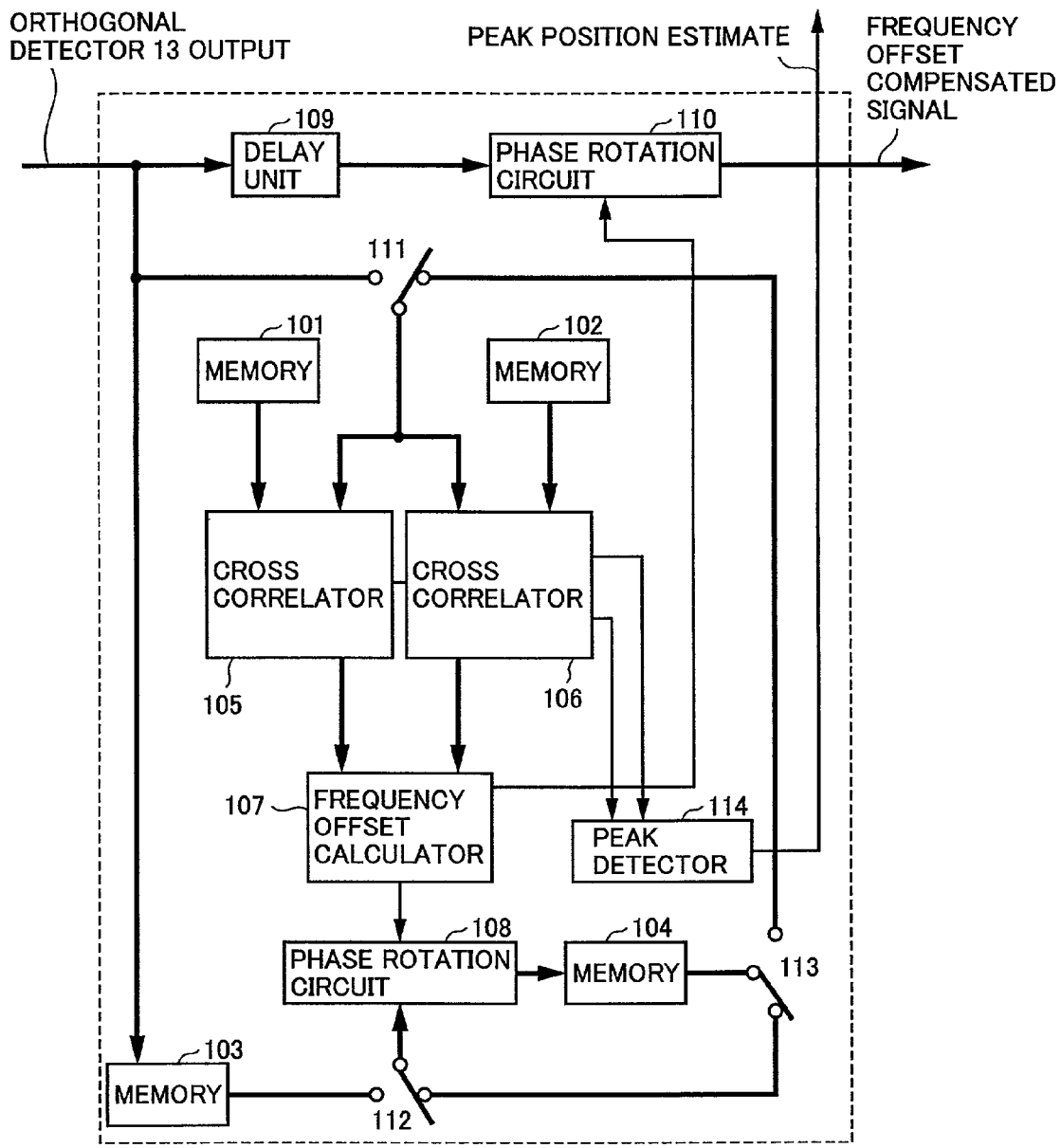
FIG. 18 is a block diagram to describe an operation of the frequency offset compensator of the OFDM receiver according to the third embodiment of the present invention.

Then, switching control is effected by controller 2000 so that switcher 113 is connected to the switcher 112 side, as shown in FIG. 18. Based on the frequency offset estimate value calculated by frequency offset calculator 107, phase rotation circuit 108 rotates the phase of the signal stored in memory 104 and stores the phase-rotated signal in memory 104 again. Then, switching control is effected by controller 2000 so that switcher 113 is connected to the switcher 111 side. Thereafter, the operation of obtaining cross correlation values between the signal stored in memory 104 and respective reference signals, estimating the frequency offset based on the calculated cross correlation values, rotating the phase of the signal stored in memory 104, and storing the phase-rotated signal in memory 104 again is repeated.

The above procedure of a frequency offset compensator according to the third embodiment will be described hereinafter with reference to the flow chart of FIG. 19.

Figure 19:
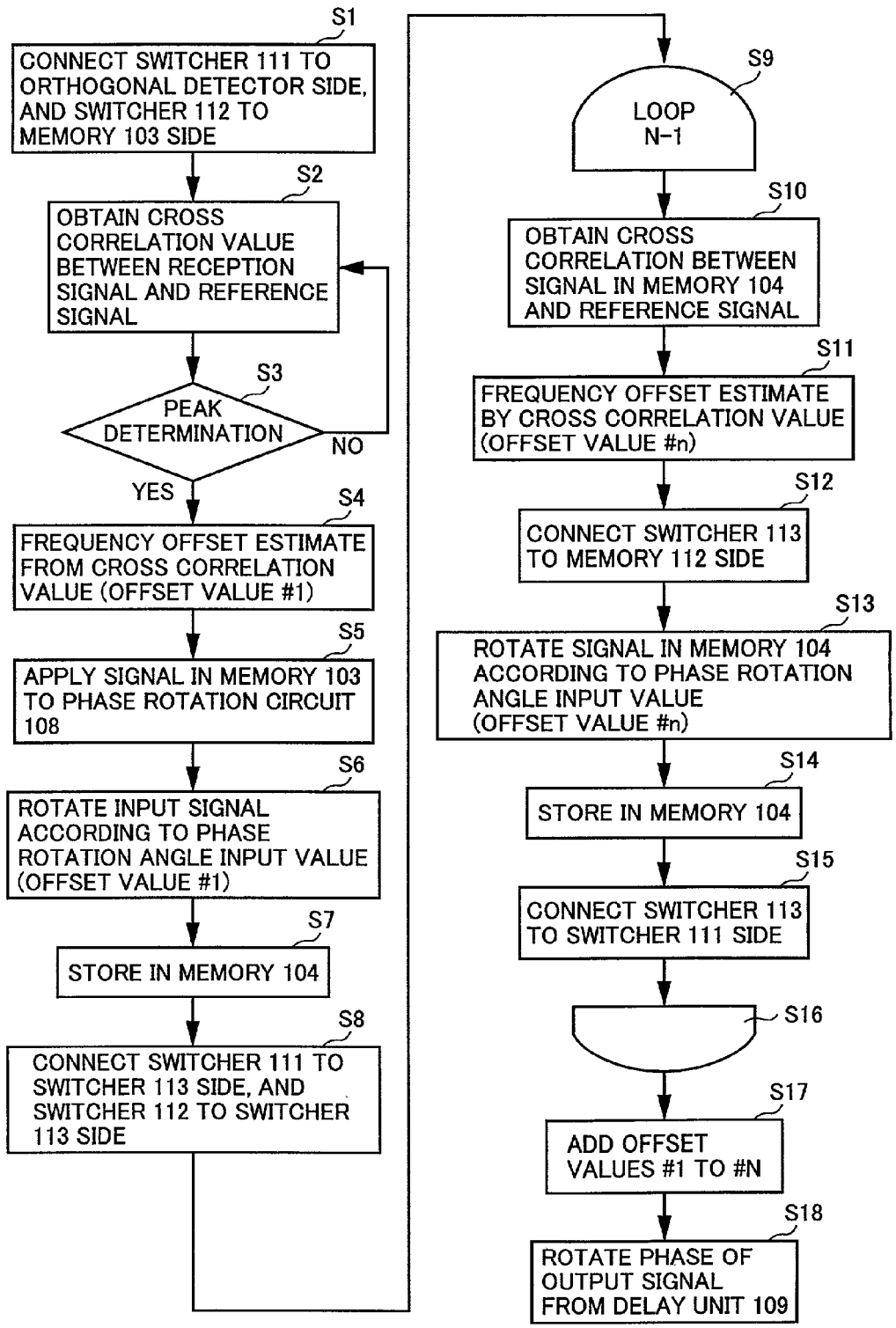
FIG. 19 is a flow chart representing the procedure in the frequency offset compensator of the OFDM receiver according to the third embodiment of the present invention.

In the example of FIG. 19, it is assumed that estimation of a frequency offset is effected N times under control of controller 2000 (FIG. 47). Also, by monitoring the cross correlation value between a reception signal and a reference signal through peak detector 114, the start symbol position and data symbol position can be estimated in the frequency offset estimator.

At step S1, switching control is executed so that switcher 111 is connected to the output side of digital orthogonal detector 13, and switcher 112 is connected to the memory 103 side. At step S2, the cross correlation values between the reception signal from digital orthogonal detector 13 and respective reference signals stored in memories 101 and 102 is calculated by cross correlators 105 and 106. At step S3, determination is made whether peak detector 114 has detected the peak position of the cross correlation value. When the peak position is not detected, the process of step S2 is repeated. When the peak position is detected, control proceeds to step S4 to calculate a frequency offset estimate value (offset value #1) from the cross correlation values calculated at cross correlators 105 and 106.

At step S5, the signal from orthogonal detector 13 stored in memory 103 is provided to phase rotation circuit 108 via switcher 112. At step S6, phase rotation circuit 108 rotates the phase of the signal input from memory 103 according to the aforementioned frequency offset estimate value (offset value #1). At step S7, the reception signal phase-rotated by phase rotation circuit 108 is stored in memory 104.

At step S8, switching control is effected so that switcher 111 is connected to the switcher 113 side and switcher 112 is connected to the switcher 113 side. The process set forth below is repeated (N−1) times from step S9 to step S16.

At step S10, cross correlators 105 and 106 calculate the cross correlation values between the signal applied from memory 104 through switchers 113 and 111 and respective reference signals stored in memories 101 and 102. At step S11, frequency offset calculator 107 calculates a frequency offset estimate value (offset value #n). At step S12, switching control is effected to switch switcher 113 to the switcher 112 side. At step S13, phase rotation circuit 108 rotates the phase of the signal read out from memory 104 via switchers 113 and 112 according to the calculated frequency offset estimate value (offset value #n). At step S14, the phase-rotated signal by phase rotation circuit 108 is stored in memory 104 again.

At step S15, switching control is effected to connect switcher 113 to the switcher 111 side. The process from step S10 to S16 is repeated (N−1) times. Following repetition of (N−1) times, control proceeds to step S17 to add all the calculated offset values #1 to #N. At step S18, the phase of the signal output from delay unit 109 is rotated by phase rotation circuit 110 according to the added value.

Figure 20:
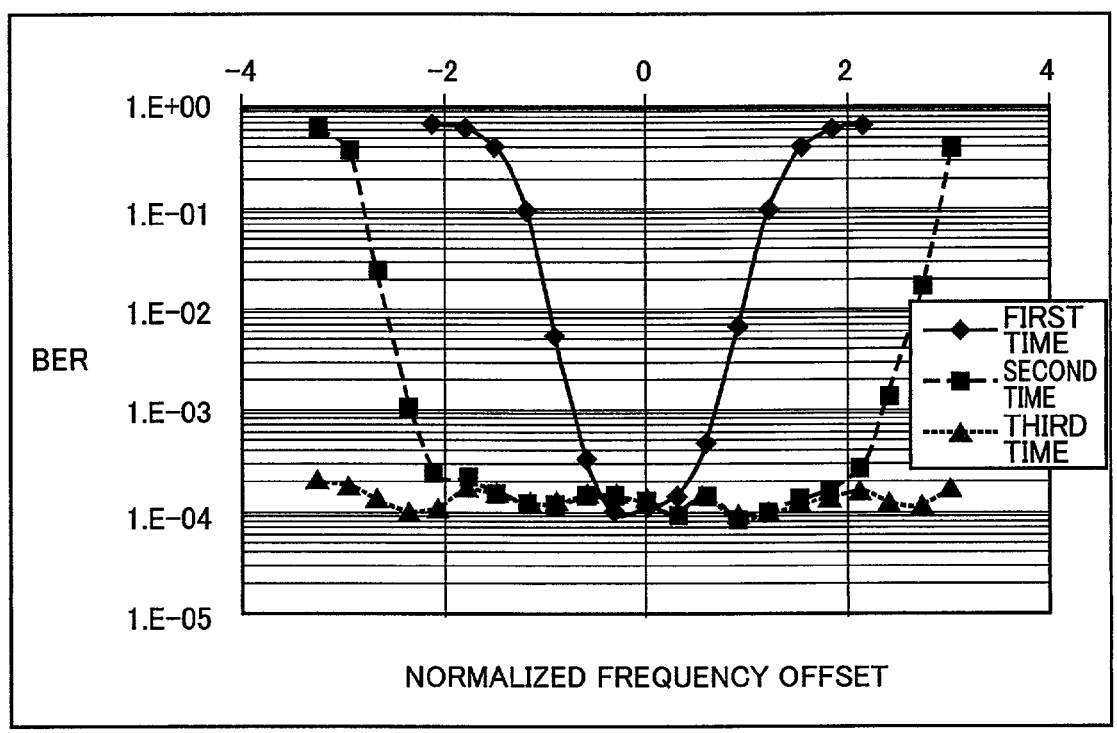
FIG. 20 is a graph showing the relationship between the normalized frequency offset and the bit error rate obtained from the frequency offset compensator of the OFDM receiver according to the third embodiment of the present invention.

FIG. 20 is a graph showing the relationship between the normalized frequency offset obtained from the frequency offset compensator of the third embodiment and the bit error rate when the width of the reference signal is width=16 and the shift between the two reference signals is shift=8. As shown in FIG. 20, at the first time, the cross correlation values between the start symbol in the reception signal and the reference signals are calculated to obtain a frequency offset estimate value. The frequency offset is compensated for by the obtained value. At the second time, the cross correlation value between the start symbol after frequency offset compensation and the reference signals are calculated to obtain a frequency offset estimate value. The frequency offset is compensated for based on that obtained value. The cross correlation value obtained at this stage has a larger amplitude and smaller phase angle than those of the cross correlation value obtained between the start symbol in the reception signal and the reference signal at the first time. Therefore, a frequency offset estimate value closer to the actual frequency offset value will be obtained by the second offset estimation. By repeating a process similar to that of the second time at the third time, the number of offset estimations increases to allow greater frequency offset compensation.

In the above third embodiment, the frequency offset is estimated with two reference signals (N=2) as one set. By carrying out estimation of a frequency offset with more than two reference signals (N≧2) as one set, frequency offset estimation error caused by noise can be further suppressed.

Fourth Embodiment

An OFDM receiver according to a fourth embodiment of the present invention will be described with reference to FIG. 21. Components common to those of the above third embodiment have the same reference character allotted, and description thereof will not be repeated.

Figure 21:
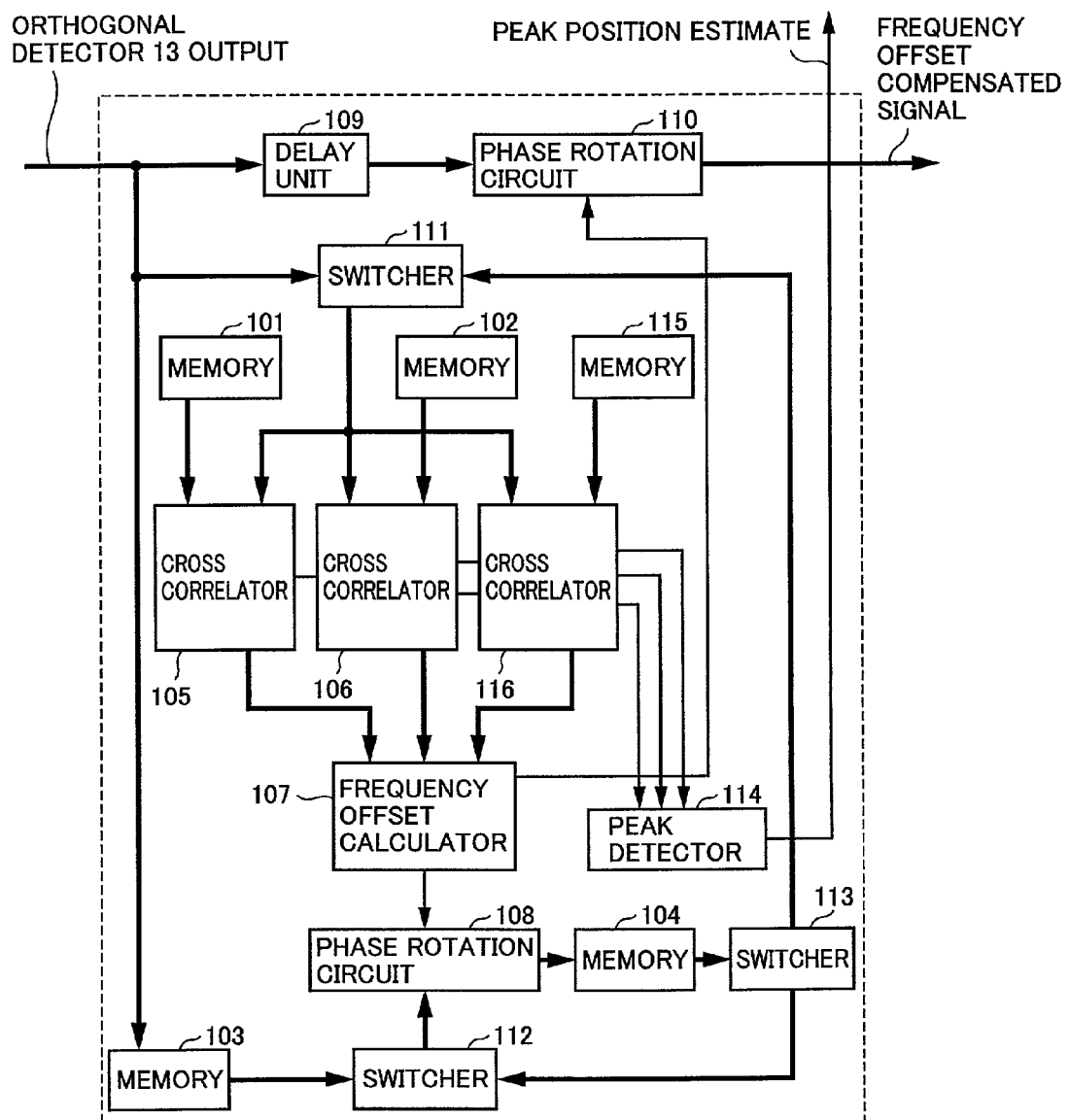
FIG. 21 is a block diagram showing a frequency offset compensator of an OFDM receiver according to a fourth embodiment of the present invention.

As shown in FIG. 21, the frequency offset compensator of the fourth embodiment includes memories 101, 102, 115 storing three types (N=3) of reference signals corresponding to arbitrary portions in a start symbol, and cross correlators 105, 106 and 111 calculating the cross correlation values between the output signal from digital orthogonal detector 13 (FIG. 14) and the three reference signals stored in memories 101, 102 and 115, respectively.

According to the frequency offset compensator of the fourth embodiment shown in FIG. 21, the phase rotation angles are calculated by three cross correlators 105, 106 and 116 and applied to frequency offset calculator 107. Frequency offset calculator 107 estimates two frequency offset values according to the phase rotation angles. An average thereof is applied to phase rotation circuit 108 as a frequency offset estimate value for frequency offset estimation. Thus, estimation error caused by noise can be suppressed in estimating a frequency offset value.

Fifth Embodiment

An OFDM receiver according to a fifth embodiment of the present invention will be described with reference to FIGS. 22–24. Components common to those in the previous first embodiment have the same reference character allotted, and description thereof will not be repeated.

Before describing the structure of the fifth embodiment in detail, the reason why estimation accuracy is improved by the frequency offset estimation method of the fifth embodiment will be described here.

As described in association with each of the above embodiments, the frequency offset estimate value can be calculated basically from one pair of cross correlation values. More specifically, frequency offset can be estimated at a wider range as the value of reference data (equivalent estimated time difference) TE becomes smaller from equation $\Delta f = \Delta\theta/(2\pi TE)$ which is the equation to derive the frequency offset estimate value. Conversely, the frequency offset estimation range becomes smaller as the value of reference data TE becomes greater.

Considering the case where noise is added to the reception signal, the obtained phase rotation angle $\Delta\theta$ will include error $n\theta$ due to the noise. The frequency offset estimate value when noise is added to the reception signal is represented as $\Delta f + nf = (\Delta\theta + n\theta)/(2\pi TE)$ taking into consideration error $n\theta$. Therefore, it is appreciated that the frequency offset estimate value is more and less affected by error $n\theta$ caused by noise as the value of reference data TE becomes smaller and larger, respectively.

It is therefore understood that when a small value of reference data TE is taken, frequency offset estimation of a larger range is allowed while frequency offset estimate error nf caused by noise becomes larger.

In view of the foregoing, the frequency offset compensator according to the fifth embodiment of the present invention is implemented to carry out estimation and compensation for frequency offset in order to compensate for frequency offset in a wide range at higher accuracy. First, a small value of reference data TE is used to obtain a frequency offset estimate value over a wide range to carry out frequency offset compensation. Then, a larger value of reference data TE is used to estimate and compensate for frequency offset so that the error of the previously executed frequency offset compensation is reduced.

More specifically, a plurality of sets of reference signals, each formed of two reference signals, and reference data TE differing for each corresponding set of a plurality of reference signals are prepared. Estimation and compensation for a frequency offset are repeatedly carried out sequentially using the set of reference signals in the order starting from the one with the smaller reference data TE. The frequency offset estimate value obtained each time is accumulated. The added value of the frequency offset estimate values eventually obtained is applied to the phase rotation circuit. The phase of the signal from the orthogonal detector circuit is rotated based on the applied value. Thus, frequency offset estimation corresponding to a wide range of frequency offset and that is robust with respect to noise can be carried out.

Figure 22:
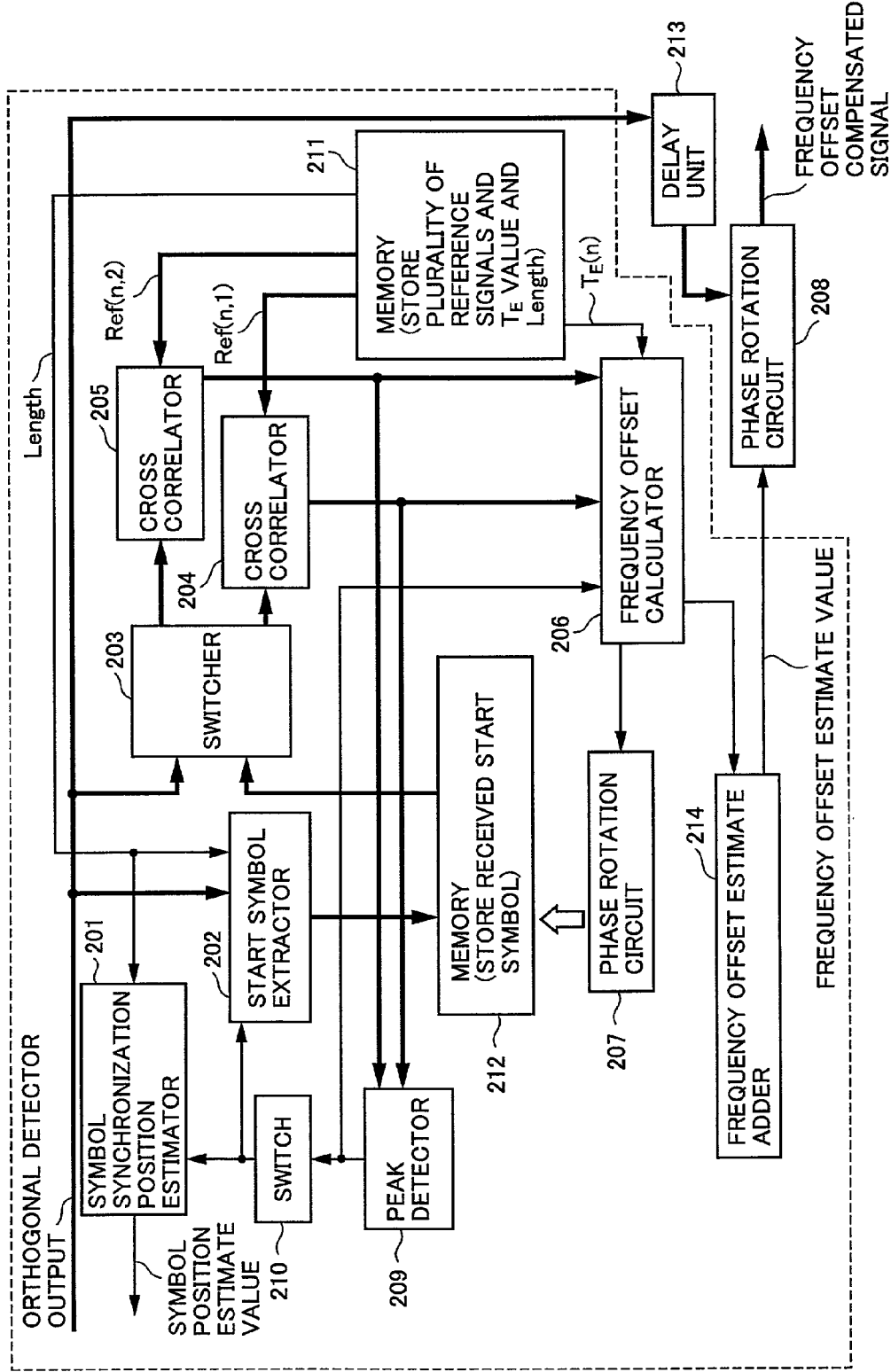
FIG. 22 is a block diagram showing a frequency offset compensator of an OFDM receiver according to a fifth embodiment of the present invention.

As shown in FIG. 22, the frequency offset estimator according to the fifth embodiment of the present invention includes a memory 211 storing a Length value representing the length from the beginning of the start symbol of the reception signal and the end of the reference signal, a plurality of reference signals, and a plurality of reference data (equivalent estimated time difference) TE respectively corresponding to the plurality of sets of these reference signals, a memory 212 storing the received start symbol, a switcher 203 selectively switching between the outputs of digital orthogonal detector 13 (FIG. 47) and memory 212 for output, cross correlators 204 and 205 calculating the cross correlation values between the output of switcher 203 and respective values of the two types of reference signals (one set) stored in memory 211, a peak detector 209 detecting a peak of the cross correlation value output from each of cross correlators 204 and 205 to output a symbol position estimate value, a frequency offset calculator 206 calculating the frequency offset estimate value using the outputs of cross correlators 204 and 205, the output of peak detector 209, and the value of corresponding reference data TE stored in memory 212, a phase rotation circuit 207 rotating the phase of the received start symbol stored in memory 212 according to the output of frequency offset calculator 206, a frequency offset estimate value adder 214 adding the output of frequency offset calculator 206 for output, a delay unit 213 delaying the reception signal from orthogonal detector 13 until the adding operation of frequency offset estimate value adder 214 ends, a phase rotation circuit 208 rotating the phase of the output of delay unit 213 according to the output of frequency offset estimate adder 214, a switch 210 controlling the on/off of the output of the signal from peak detector 209, a symbol synchronization position estimator 201 estimating the position of the data symbol based on the peak value output from switch 210 and the Length value stored in memory 211, and a start symbol extractor 202 writing the signal in the start symbol section of the reception signal into memory 212, based on the peak value output from switch 210 and the Length value stored in memory 211.

Figure 23:
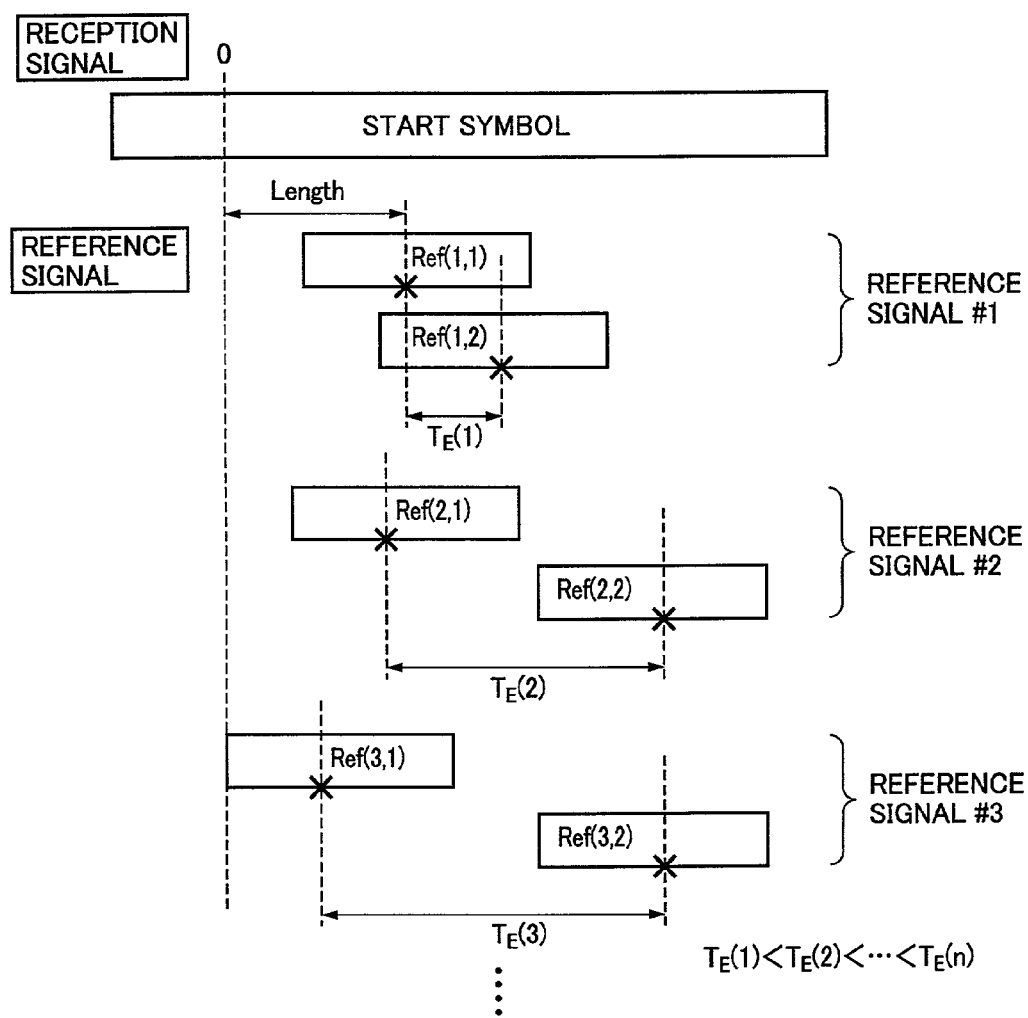
FIG. 23 shows the relationship between reference signals stored in a memory 211 of the frequency offset estimator of FIG. 22. x represents the equivalent estimated position of the phase rotation angle length of reference signal is constant).
Figure 24:
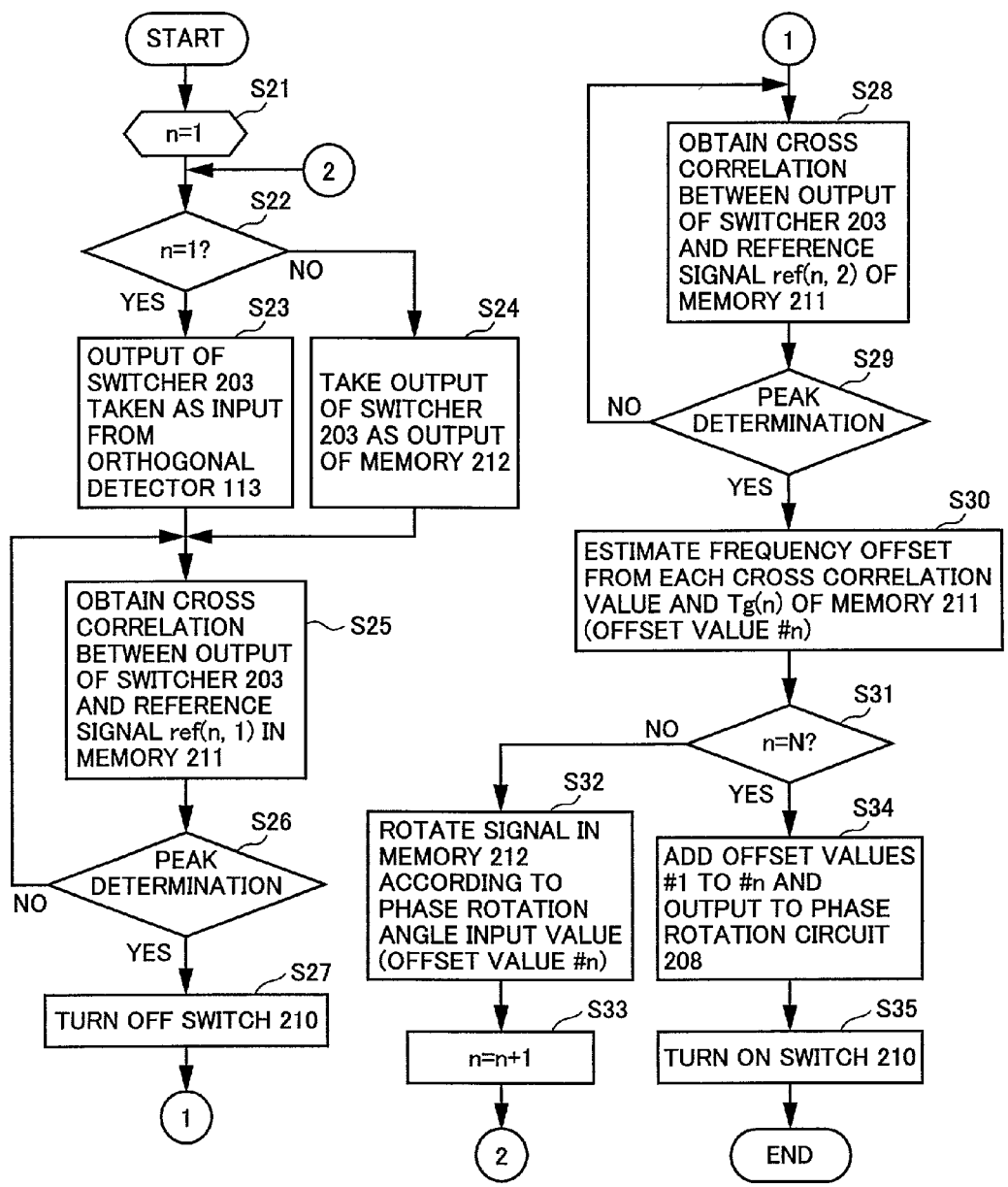
FIG. 24 is a flow chart of the procedure of the frequency offset estimator of an OFDM receiver according to the fifth embodiment of the present invention.

As shown in FIG. 23, memory 211 stores N(N is a positive integer) sets constituted by a pair of reference signals Ref(n, 1), Ref(n, 2), and reference data TE(n) representing the distance between "equivalent estimated position of the phase rotation angle" of respective reference signals. Memory 211 also stores the distance from the beginning of the start symbol to the end of Ref(n, 1) as "Length". Here, reference signals Ref(n, 1) and Ref(n, 2) fall within the start symbol, and have equal and constant length.

Start symbol extractor 202 extracts the start symbol from the reception signal to initiate writing into memory 212. When cross correlator 205 provides a peak output after cross correlator 204 provides a peak output, frequency offset calculator 206 estimates the frequency offset. According to the estimated result, phase rotation circuit 207 rotates the phase of the start symbol written in memory 212, commencing rewriting the contents of memory 212. It is to be noted that the contents of memory 212 will not be rewritten over the writing operation of the extracted start symbol by start symbol extractor 202.

Subsequent to the first phase rotation process on the start symbol stored in memory 212, the writing operation of the start symbol into memory 212 from start symbol extractor 202 will not be effected until arrival of the start symbol of the next packet. Therefore, as to the second phase rotation process and et seq., only phase rotation circuit 207 rewrites the contents of memory 212. Switcher 203 receives the data of memory 212 rewritten by phase rotation circuit 207. Peak detector 209 has the set threshold value, and operates to determine the peak at the time point where the applied cross correlation value exceeds the relevant threshold value.

The operation of the frequency offset estimator according to the fifth embodiment will be described with reference to FIG. 22.

Here, it is assumed that memory 212 stores three pairs of reference signals Ref(n, 1), Ref(n, 2), and reference data (equivalent estimated time difference) TE(n) between reference signals of each pair. It is also assumed that the values of corresponding TE(n) (n=1, 2, 3) are TE(1)=TW/50, TE(2)=TW/8, TE(3)=TW/2, respectively, and Length=20.

The signal from digital orthogonal detector 13 (FIG. 47) is applied to start symbol extractor 202, as well as to cross correlators 204 and 205 via switcher 203. Cross correlators 204 and 205 obtain the cross correlation values between the input signal and respective value of reference signals Ref(1, 1), Ref(1, 2) of the pair stored in memory 212. Peak detector 209 detects the peak position of the calculated cross correlation value.

Frequency offset calculator 206 estimates a frequency offset value #1 using the cross correlation value at each peak position and the value of corresponding reference data TE(1) stored in memory 211. The output of peak detector 209 is applied to symbol synchronization position estimator 203 via switch 210 in an ON state. The symbol position estimate output from symbol synchronization position estimator 201 is provided to symbol clock generator 15 shown in FIG. 47. The output of peak detector 209 is applied to start symbol extractor 202 via switch 210 in an on state. Start symbol extractor 202 extracts the start symbol from the reception signal and stores the same in memory 212. Switch 210 is turned off after the peak is detected by cross correlator 204.

When noise is added in the reception signal, the correct offset estimation cannot be achieved since there is an error in the estimated offset. In the present embodiment, the phase of the start symbol stored in memory 212 is rotated by phase rotation circuit 207 using offset estimate value #1, and then written back into memory 212. Also, offset estimate value #1 is applied to frequency offset estimate value adder 214 to be accumulated.

Under control of controller 2000 (FIG. 47), switcher 203 is switched so that the signal stored in memory 212 is applied to cross correlators 204 and 205. Cross correlators 204 and 205 calculate the cross correlation values between the signal input from memory 212 and respective values of the reference signal pair Ref(2, 1), Ref(2, 2) stored in memory 212. Peak detector 209 detects the peak position of the cross correlation value.

Frequency offset calculator 206 estimates a frequency offset estimate value #2 using the cross correlation value at each peak position and the value of corresponding reference data TE(2) stored in memory 211. Offset estimate value #2 is applied to frequency offset estimate value adder 212 to be accumulated. Although the estimated offset value still includes an error, this error is smaller than that of the initial estimate.

Using this offset estimate value #2, the phase of the start symbol stored in memory 212 is rotated by phase rotation circuit 207 to be written into memory 212. Then, the signal in memory 212 is applied again to cross correlators 204 and 205. Cross correlators 204 and 205 obtained a cross correlation value between the signal input from memory 212 and respective values of the reference signal pair Ref(3, 1), Ref(3, 2) stored in memory 211. Peak detector 209 detects the peak position of the cross correlation value.

Frequency offset calculator 206 estimates a frequency offset estimate value #3 using the cross correlation value at each peak position and the value of reference data TE(3) stored in memory 211. Offset estimate value #3 is applied to frequency offset estimate value adder 214 to be accumulated. Here, the error included in the estimated offset value is further smaller than that of the previous estimation.

The eventual frequency offset estimate value is the result of adding the calculated offset estimate values #1, #2 and #3, which is applied from frequency offset estimate adder 214 to phase rotation circuit 208. Phase rotation circuit 208 rotates the phase of the reception signal output from delay unit 213 according to the frequency offset estimate value output from frequency offset estimate adder 214 to compensate for a frequency offset.

The procedure under control of controller 2000 (FIG. 47) in the frequency offset estimator of the fifth embodiment will be described hereinafter with reference to the flow chart of FIG. 24.

At step S21, n=1 is set. At step S22, determination is made whether n=1. When n=1, control proceeds to step S23 to switch the output of switcher 203 to the input from digital orthogonal detector 13 (FIG. 47). When n≠1, control proceeds to step 24 to switch the output from switcher 203 to the output from memory 212.

At step S25, the cross correlation value between the output of switcher 203 and reference signal Ref(n, 1) stored in memory 21 is obtained. At step S26, determination is made of the peak position of the cross correlation signal. When the peak position is not determined, the process of steps S25 and S26 is repeated. When the peak position is determined, control proceeds to step S27 to turn off switch 210.

At step S28, the cross correlation value between the output of switcher 203 and reference signal Ref(n, 2) of memory 211 is obtained. At step S29, determination is made of the peak position, similar to that of the previous step S26. When the peak position is not determined, the process of steps S28 and S29 is repeated. When the peak position is determined, control proceeds to step S30 to estimate the frequency offset (offset estimate value n) based on respective cross correlation values and reference data TE(n) stored in memory 211.

At step S31, determination is made whether n=N, i.e. whether a frequency offset estimation process has been carried out for a predetermined number of times N. When not completely carried out, control proceeds to step S32 to rotate the phase of the signal stored in memory 212 according to offset estimate value #n, and the phase-rotated signal is written back into memory 212. Also, n is counted up. The process from step S22 to S30 is repeated until n=N.

In other words, the cross correlation value is calculated between the signal stored in memory 212 and a reference signal pair Ref(n, 1), Ref(n, 2) differing from the pair used in the cross correlation calculation with the reception signal. Using reference data TE(n) (TE(1)<TE(2)< . . . <TE(N)) stored in memory 212, frequency offset estimate value #n is obtained in a similar manner. Then, the process of rotating the phase of the reception start symbol stored in memory 212 based on estimate value #n is carried out N–1 times (n=2, 3, . . . , N).

At step S31, when determination of n=N is made, i.e. when determination is made that a frequency offset estimation process has been carried out for a predetermined number of times N, control proceeds to step S34 to add offset estimate values #1–#n calculated by the preceding processes in frequency offset estimate value adder 214. The result is provided to phase rotation circuit 208 as the frequency offset estimate value.

According to the offset compensator of the fifth embodiment of the present invention, offset compensation is effected by obtaining a frequency offset estimate value each time while the value of reference data (equivalent estimated time difference) TE is sequentially increased for the required number of times. Each frequency offset estimate value is added to obtain an eventual frequency offset estimate value, which is used in the frequency offset compensation on the reception signal. Therefore, the frequency offset compensation can be carried out in higher accuracy.

Sixth Embodiment

Figure 25:
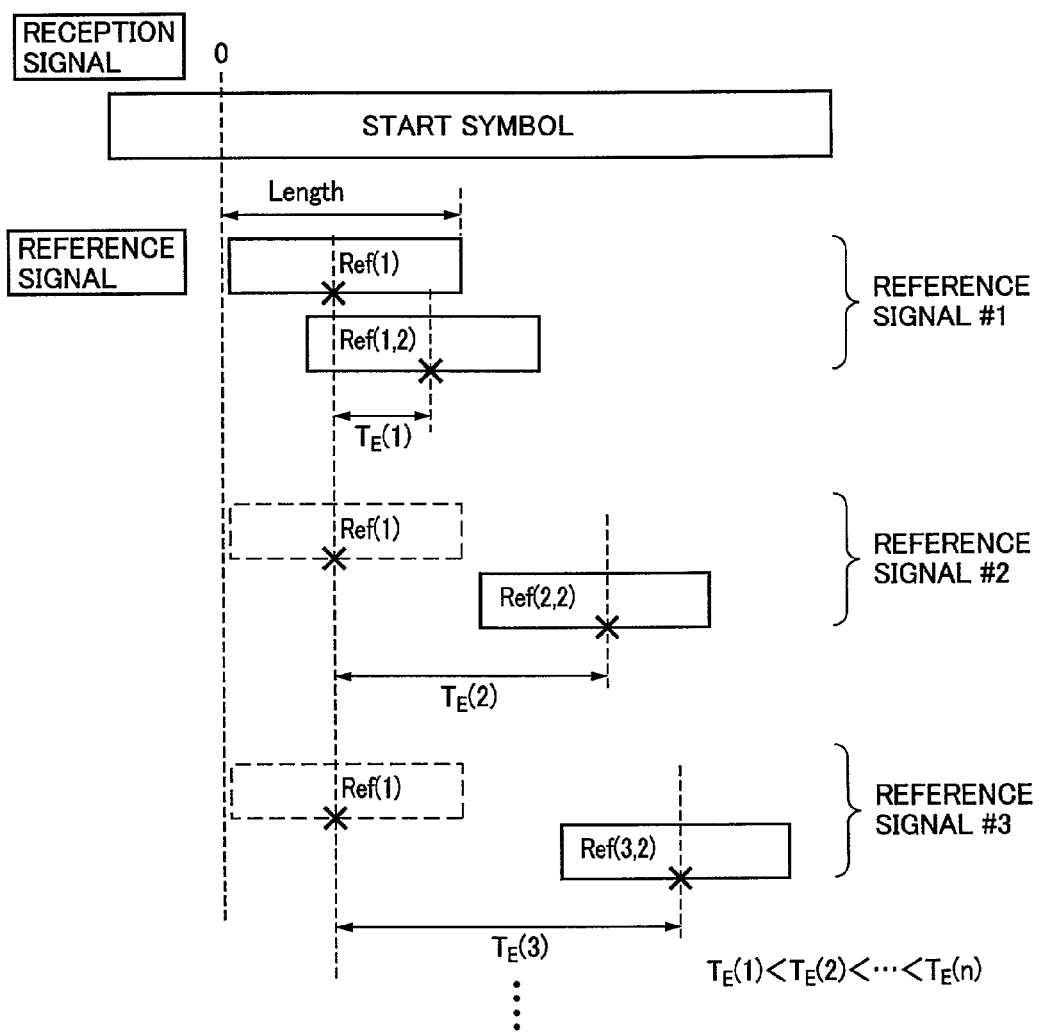
FIG. 25 is a diagram to describe the relationship between reference signals stored in memory 211 of a frequency offset estimator of an OFDM receiver according to a sixth embodiment of the present invention. x represents an equivalent estimated position of the phase rotation angle (length of reference signal is constant).

An OFDM receiver according to a sixth embodiment of the present invention will be described with reference to FIG. 25.

In the previous fifth embodiment, N sets constituted by a pair of reference signals Ref(1), Ref(n, 2), and reference data TE(n) representing the distance between "equivalent estimated position of phase rotation angle" of respective reference signals, as shown in FIG. 23, are prepared. In the current sixth embodiment, N sets (N is a positive integer) constituted by a pair of reference signals Ref(1), Ref(n, 2), and reference data TE(n) which is the distance between "equivalent estimated position of the phase rotation angle" of respective reference signals are stored, as well as "Length" representing the distance from the beginning of the start symbol to the end of Ref(1). Here, Ref(1) and Ref(n, 2) fit in the start symbol, and have equal and constant lengths.

According to the invention of the sixth embodiment, the amount of memory used can be reduced by using Ref(1) at one side of the pair of reference signals.

Seventh Embodiment

An OFDM receiver according to a seventh embodiment of the present invention will be described with reference to FIGS. 26–28.

In the previous fifth and sixth embodiments, the frequency offset compensator carried out frequency offset compensation by rotating the phase of the reception signal through phase rotation circuit 208 based on the eventual frequency offset estimate value added and output at frequency offset estimate value adder 214, as shown in FIG. 22. In the present seventh embodiment, the estimated and added eventual frequency offset estimate value is applied to a local oscillator of digital orthogonal detector 13 of the OFDM receiver shown in FIG. 47, similar to the fifth and sixth embodiments, to control variably the oscillation frequency in order to compensate for frequency offset of the reception signal.

Figure 26:
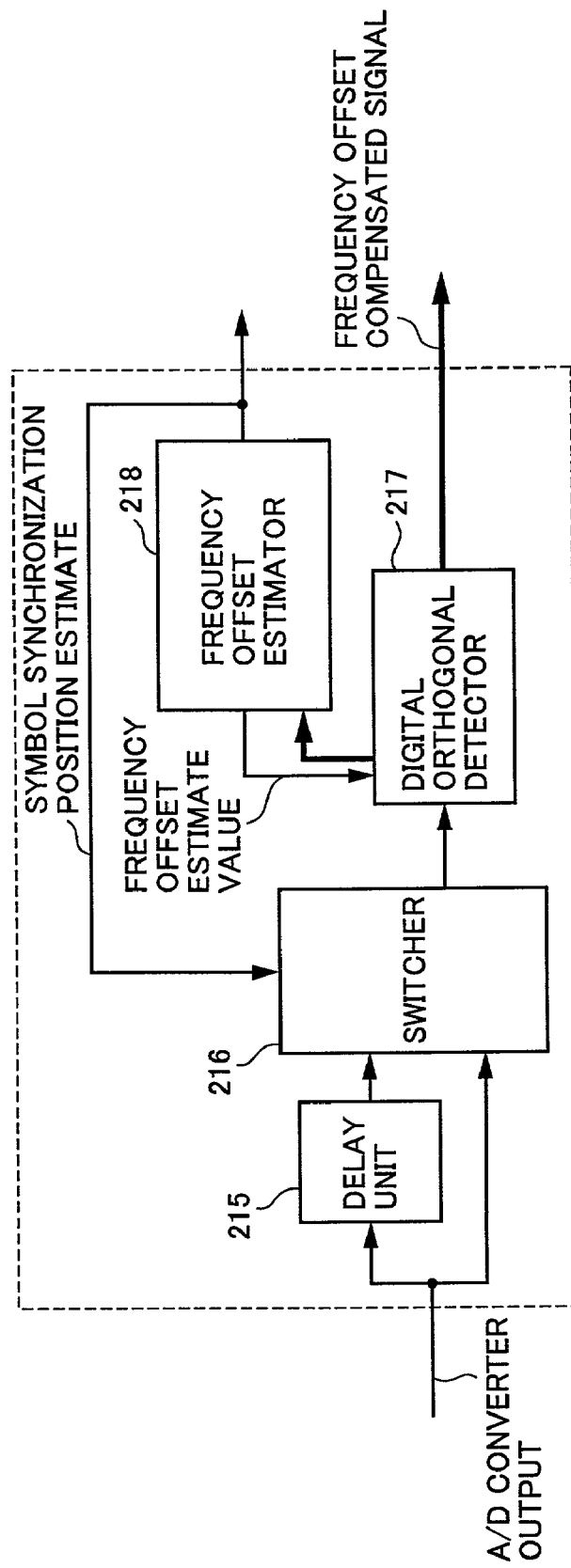
FIG. 26 is a block diagram showing an orthogonal detector with a frequency offset compensation function of an OFDM receiver according to a seventh embodiment of the present invention.

FIG. 26 is a block diagram showing a structure of an orthogonal detector with the frequency offset compensation function in an OFDM receiver of the seventh embodiment. FIG. 27 is a block diagram showing the structure of frequency offset estimator 218 of FIG. 26. FIG. 28 is a block diagram showing the structure of digital orthogonal detector 217 of FIG. 26. The structure and operation of frequency offset estimator 218 shown in FIG. 27 are substantially similar to those of the frequency offset estimator of FIG. 22. Therefore, description thereof will not be repeated.

Figure 28:
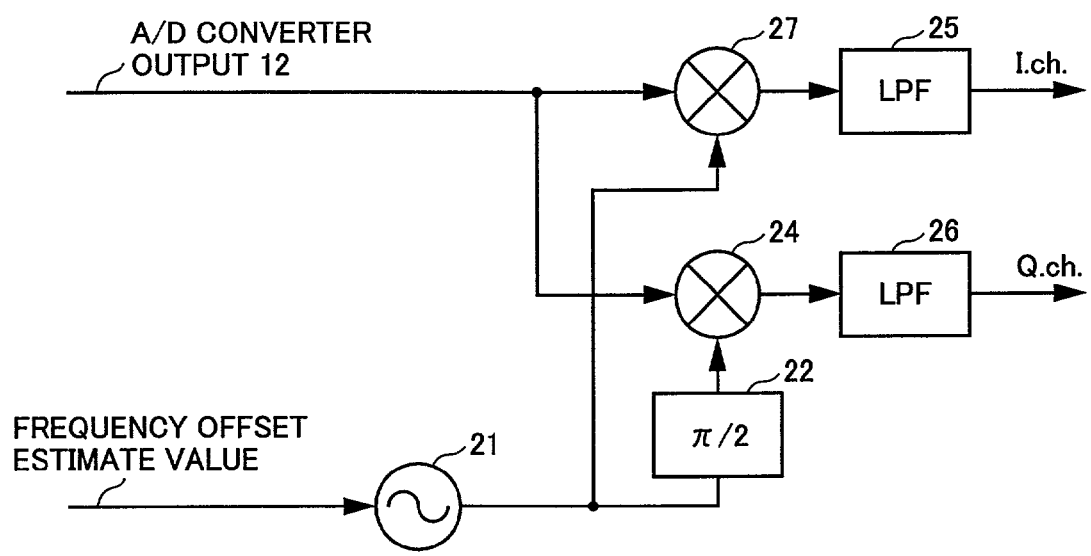
FIG. 28 is a block diagram showing a digital orthogonal detector of the orthogonal detector unit with the frequency offset compensation function of FIG. 26.

As shown in FIG. 26, the orthogonal detector with the frequency offset compensation function includes a delay unit 215 delaying the output of A/D converter 12 (FIG. 47) for a predetermined time, a switcher 216 selectively switching the output between delay unit 215 and the output of A/D converter 12 (FIG. 47) for output, a digital orthogonal detector 217 that can control the oscillation frequency as shown in FIG. 28, and that can separate the output of switcher 216 into the real component and the imaginary component, and a frequency offset estimator 218 estimating the frequency offset value output from digital orthogonal detector 217.

The operation of the orthogonal detector unit with the frequency offset compensation function of FIG. 26 will be described here. The operation set forth below is executed under control of controller 2000 (FIG. 47). First, the output from A/D converter 12 (FIG. 47) of the OFDM receiver is applied to delay unit 215 and switcher 216. Switcher 216 selects the output from A/D converter 12 (FIG. 47) to provide the selected output to digital orthogonal detector 217. Digital orthogonal detector 217 divides the applied signal into the real component and the imaginary component, and applies the same to frequency offset estimator 218.

Figure 27:
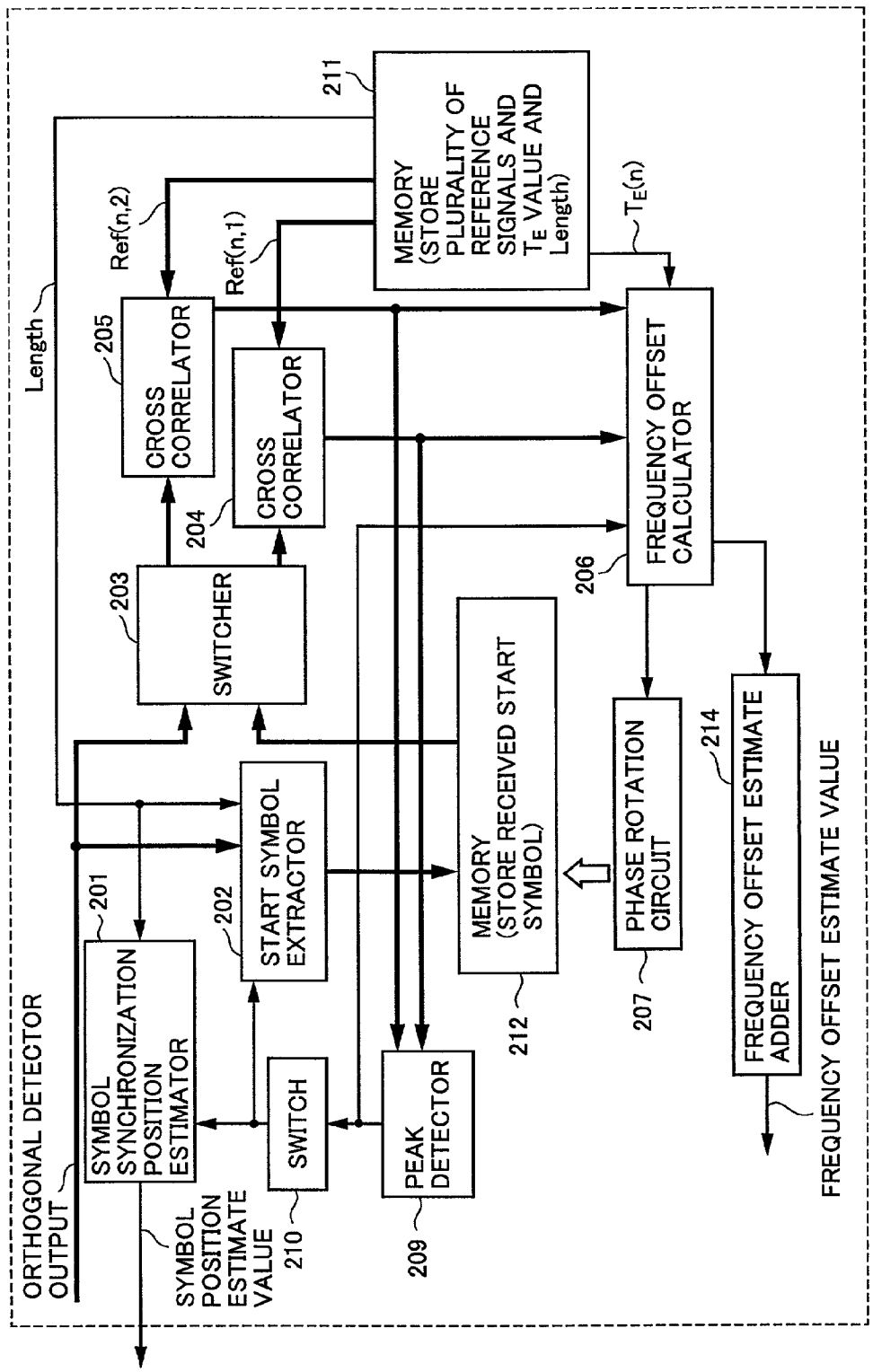
FIG. 27 is a block diagram of a frequency offset estimator of the OFDM receiver according to the seventh embodiment of the present invention.

Frequency offset estimator 218 of FIG. 27 receives the frequency offset estimate value output from frequency offset estimate value adder 214, as in the previous fifth embodiment shown in FIG. 22. Then, this frequency offset estimate value is applied to digital orthogonal detector 217. As shown in FIG. 28, the variable frequency of local oscillator 21 used in carrying out orthogonal detection on the output from delay unit 215 selected by switcher 216 is adjusted by the frequency offset estimate value. As a result, a signal whose frequency offset is compensated for will be output from digital orthogonal detector 217.

The seventh embodiment can save the amount of memory used by configuring the reference signal stored in memory 211 in frequency offset estimator 218 as in that of the previous sixth embodiment.

Eighth Embodiment

An OFDM receiver according to an eighth embodiment of the present invention will be described with reference to FIGS. 29–41.

Figure 29:
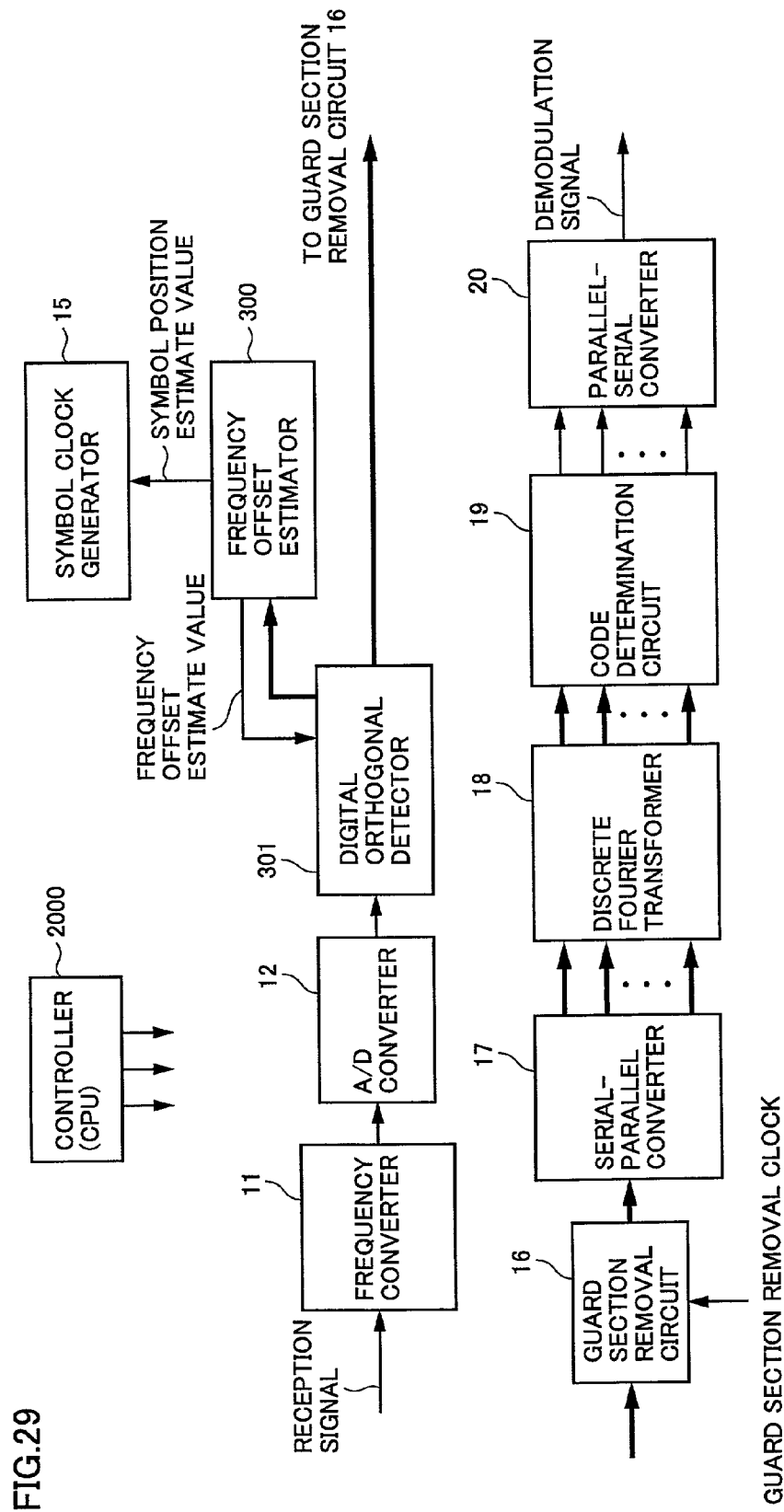
FIG. 29 is a block diagram showing the relationship between a frequency offset estimator and a digital orthogonal detector of an OFDM receiver according to an eighth embodiment of the present invention.

Frequency offset estimator 300 of the OFDM receiver of the eighth embodiment receives a reception signal from digital orthogonal detector 301 to estimate the frequency offset, as shown in FIG. 29. The frequency offset estimate value is applied to digital orthogonal detector 301. Digital orthogonal detector 301 has a structure similar to that shown in FIG. 28. The structure of the remaining components in FIG. 29 is similar to that shown in FIG. 47. Therefore, description thereof will not be repeated.

Figure 30:
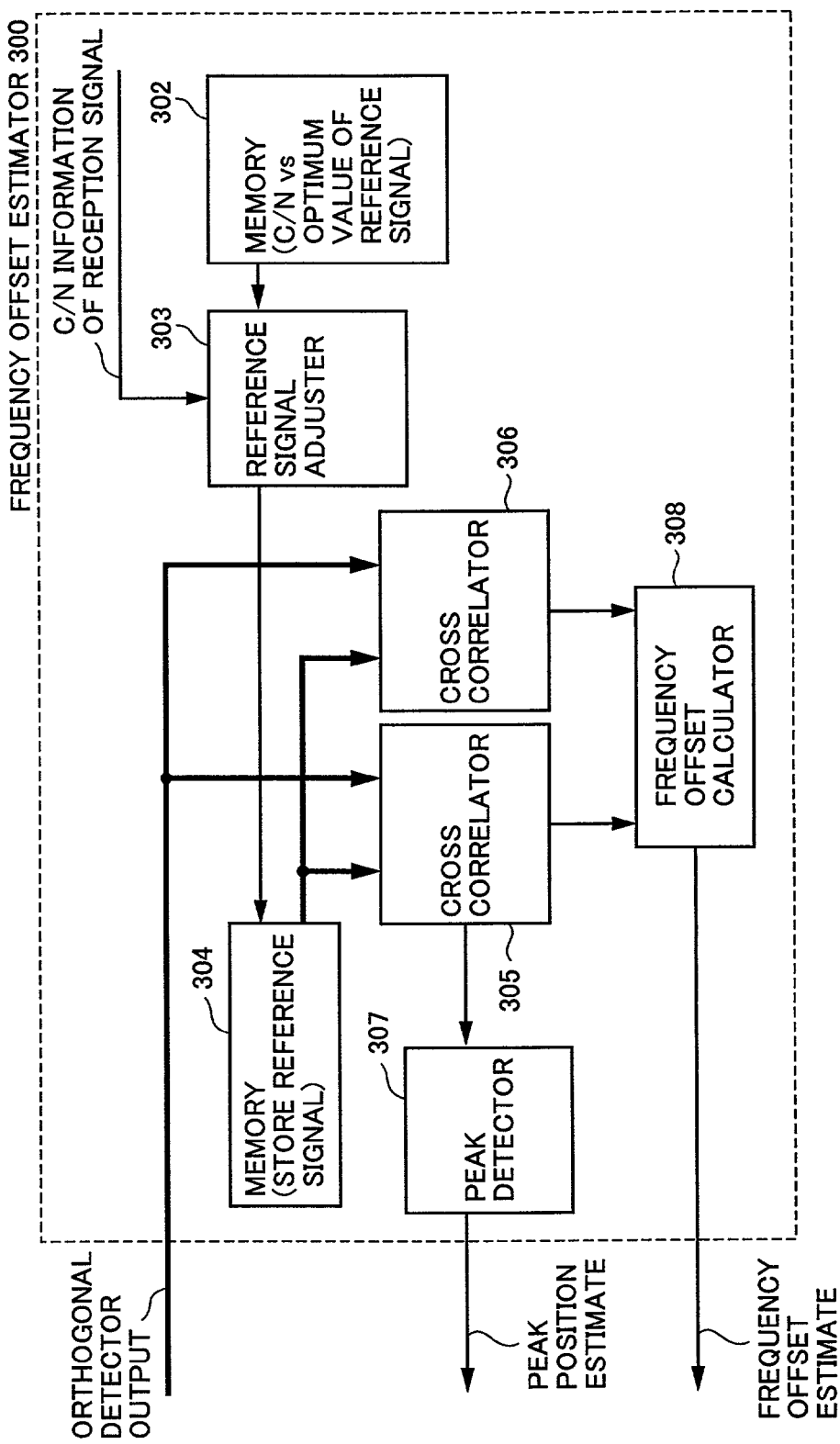
FIG. 30 is a block diagram of a frequency offset estimator of FIG. 29.

Referring to FIG. 30, frequency offset estimator 300 of FIG. 29 includes a memory 302 storing a data table of optimum reference signals corresponding to the C/N (carrier-to-noise ratio) of reception signals, a reference signal adjuster 303 selecting an optimum reference signal from the information stored in memory 302 according to the C/N of the reception signal to issue a command to memory 304 based on the selected data, a memory 304 prestored with reference signals, and from which a reference signals is output in response to a command from reference signal adjuster 303, cross correlators 305 and 306 calculating the cross correlation values between the output of digital orthogonal detector 301 (FIG. 29) and respective reference signals output from memory 304, a peak detector 307 detecting the peak position from the output of the cross correlator to estimate the symbol synchronization position, and a frequency offset calculator 308 calculating the phase rotation angle based on the outputs of cross correlators 305 and 306 to estimate a frequency offset estimate value.

The operation of frequency offset estimator 300 of FIG. 30 will be described hereinafter.

Reference signal adjuster 303 receives relevant information from the source (not shown) that generates information associated with the C/N of a reception signal. Memory 302 stores a data table of reference signal width data and reference data (equivalent estimated time difference) TE, corresponding to the C/N of the reception signal and generated based on a certain standard.

Reference signal adjuster 303 identifies the corresponding reference signal width data and reference data TE from the aforementioned table in memory 302 according to the received information associated with the C/N of the reception signal, and selects a set of corresponding reference signals.

Reference signal adjuster 303 commands memory 304 to output the selected set of reference signals. Memory 304 stores the start symbol in practice, and provides to cross correlators 305 and 306 the portion of the stored start symbol as the reference signal set so as to meet the command contents from reference signal adjuster 303.

Cross correlators 305 and 306 calculate the cross correlation values between applied respective sets of reference signals and the output of digital orthogonal detector 301. Each calculated cross correlation value is applied to frequency offset calculator 308. Frequency offset calculator 308 calculates the frequency offset estimate value based on the applied cross correlation value.

Frequency offset estimator 300 has the cross correlation value between a reception signal and a reference signal monitored by peak detector 307 to estimate the start symbol position and data symbol position, and also calculates the frequency offset estimate value based on the cross correlation value at the peak position.

An example of a data table of optimum reference signals corresponding to the C/N information of the reception signal stored in memory 302 will be described hereinafter with reference to FIGS. 31–41.

The aforementioned reference data TE has a monotone increasing relationship with respect to the time difference "shift" among a plurality of reference signals (the time difference between the beginnings of respective reference signals). Therefore, reference data TE can be increased by increasing "shift". It is therefore possible to use "shift" as a parameter instead of reference data TE. Although reference data TE should be essentially used as the parameter, the case where "shift" is used as a parameter will be described hereinafter for the sake of simplification.

Figure 31:
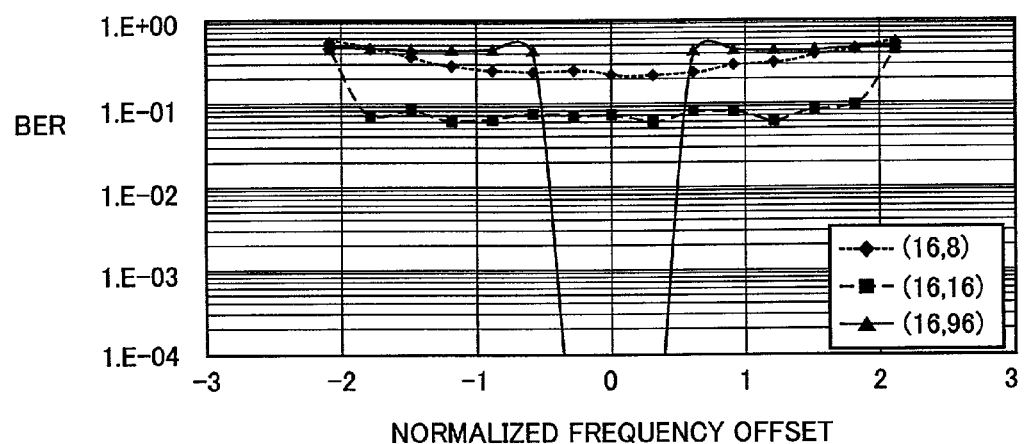
FIG. 31 is a graph showing the normalized frequency offset versus bit error rate characteristics when the width "width" of the reference signal is constant and the time difference "shift" of the reference signal is altered in the case where the C/N is relatively small.
Figure 32:
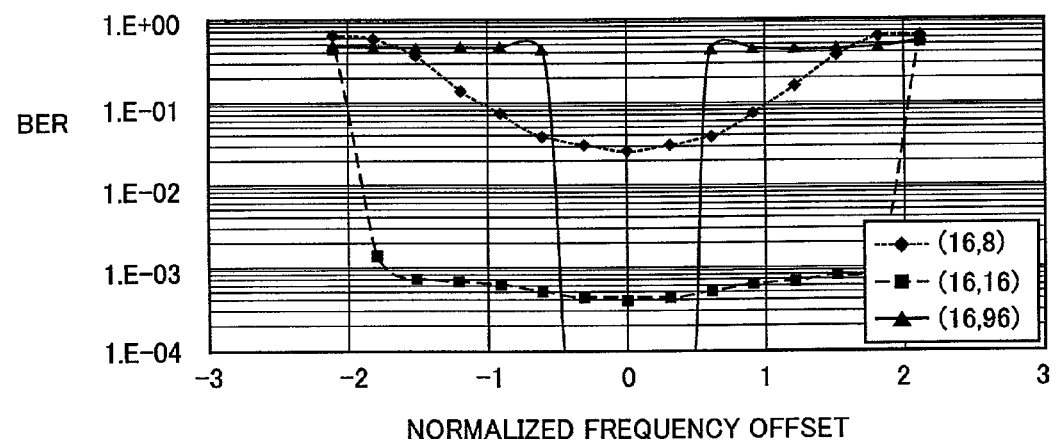
FIG. 32 is a graph showing the normalized frequency offset versus bit error rate characteristics when the width "width" of the reference signal is constant and the time difference "shift" of the reference signal is altered in the case where the C/N is moderate.
Figure 33:
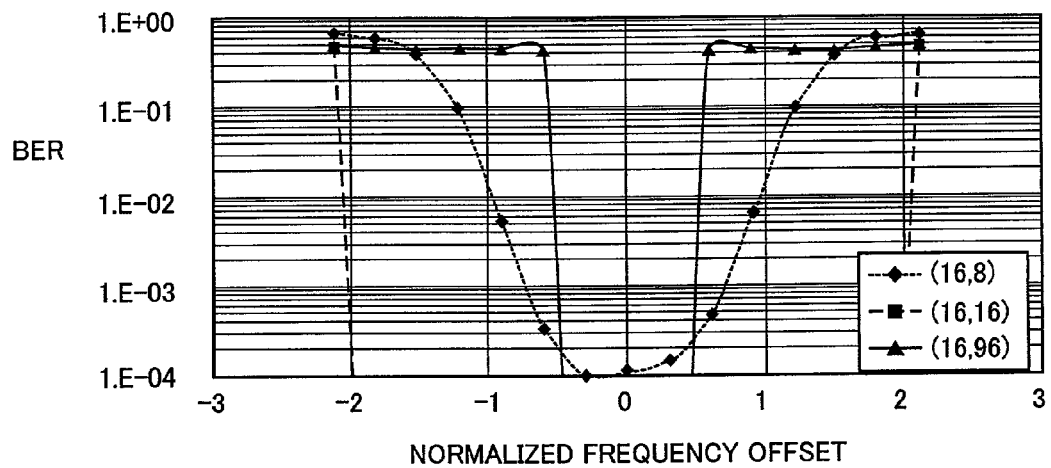
FIG. 33 is a graph showing the normalized frequency offset versus bit error rate characteristics when the width "width" of the reference signal is constant and the time difference "shift" of the reference signal is altered in the case where the C/N is relatively large.
Figure 34:
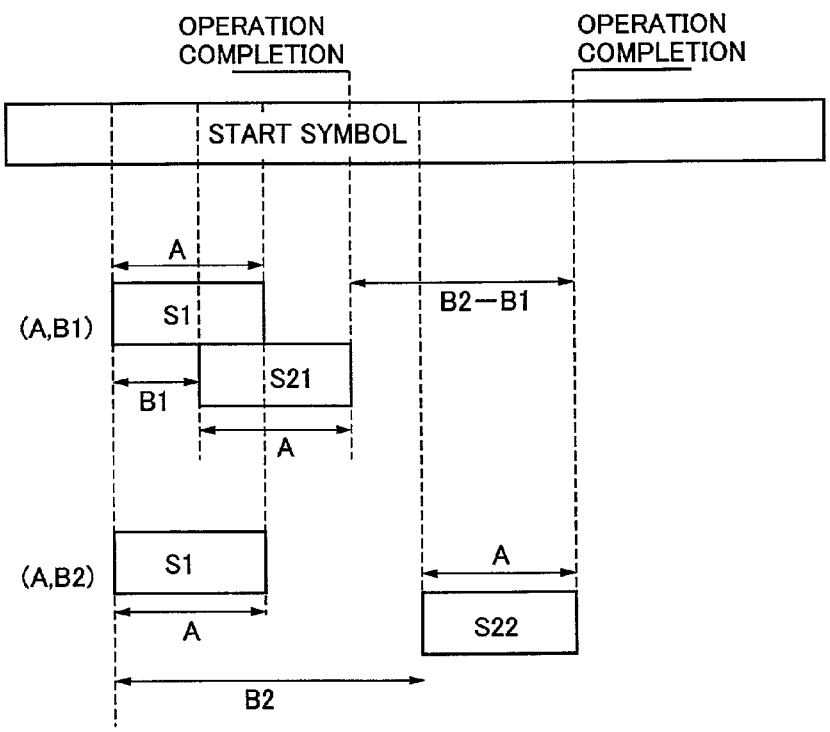
FIG. 34 is a diagram to describe reduction in the operation completion time with a smaller time difference "shift" of the reference signal. A represents the value (constant) of "width". B represents the value of "shift" (B1<B2). S1 represents the first reference signal used for correlation out of one pair of reference signals with width=A1. S21 represents the reference signal used for correlation after shifting by B1 from S1. S22 represents the reference signal used for correlation after shifting by B2 from S1.

FIGS. 31, 32 and 33 are graphs of the normalized frequency offset versus bit error rate characteristics when the width "width" of the reference signal is constant and the time difference data "shift" between reference signals is altered in the case where the C/N is small, moderate, and large, respectively.

In these graphs, the normalized frequency offset is plotted along the abscissa and the BER characteristic is plotted along the ordinate. It is assumed that the sampling clock synchronization and symbol timing synchronization are completely established. It is also assumed that: the valid symbol section is set to Tw=64; the number of points of FFT is 64; the number of subcarriers is 48; DQPSK method is employed as the modulation method; and the delay detection method is employed as the demodulation method. The numeric values in the parenthesis sequentially indicate "width" and "shift".

It is apparent from these graphs that the frequency offset estimate accuracy is improved by increasing "shift" in respective cases regardless of the level of the C/N of the reception signal. It is also understood that, as the C/N becomes smaller, the value of "shift" to obtain the desired BER characteristics increases.

Here, in the case where the desired BER is 1.0E−3, (width, shift)=(16, 19), (width, shift)=(16, 16) and (width, shift)=(16, 8) are set when the C/N of the reception signal is C/N<23 dB, 23 dB≦C/N<30 dB, and 30 dB≦C/N, respectively. The above setting is prestored in memory 302 as a table of (width, shift) for the C/N.

Reference signal adjuster 303 selects a reference signal corresponding to the (width, shift) obtained based on the above-described table according to the C/N of the reception signal, and reads out the selected reference signal from the start symbol stored in memory 304. Cross correlators 305 and 306 calculate a cross correlation value based on the read out reference signal.

It is to be noted that when there are two or more values of "shift" satisfying the desired BER characteristic, the reference signal corresponding to the smaller "shift" is selected. By selecting a reference signal with the smaller "shift", the operation completion time can be reduced, as apparent from FIG. 34.

Thus, a data table of (width, shift) corresponding to the set C/N is prestored in memory 302, and a reference signal is set based on the data table corresponding to the C/N of the reception signal. Thus, the frequency offset can be estimated at the desired accuracy.

Figure 35:
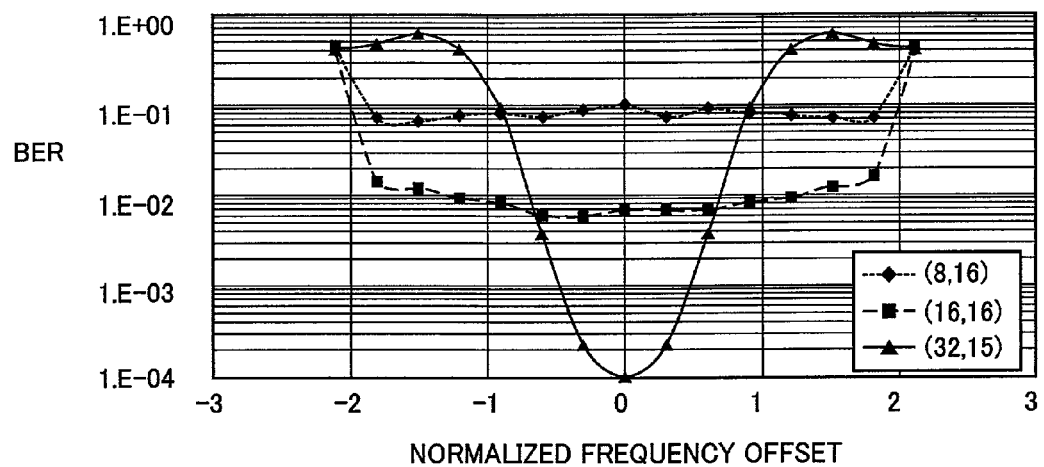
FIG. 35 is a graph representing the normalized frequency offset versus bit error rate characteristics when the time difference "shift" of the reference signal is constant and width "width" of the reference signal is altered in the case where C/N is relatively small.
Figure 36:
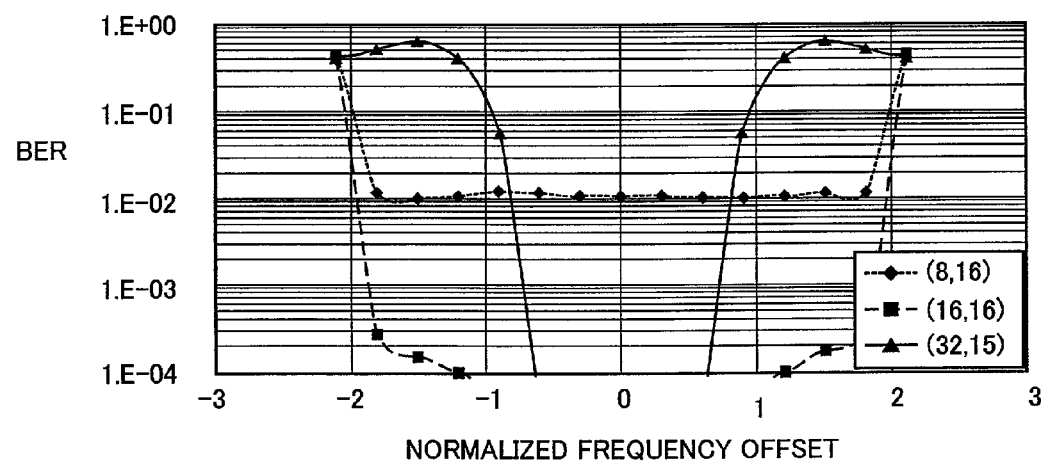
FIG. 36 is a graph representing the normalized frequency offset versus bit error rate characteristics when the time difference "shift" of the reference signal is constant and the width "width" of the reference signal is altered in the case where C/N is moderate.
Figure 37:
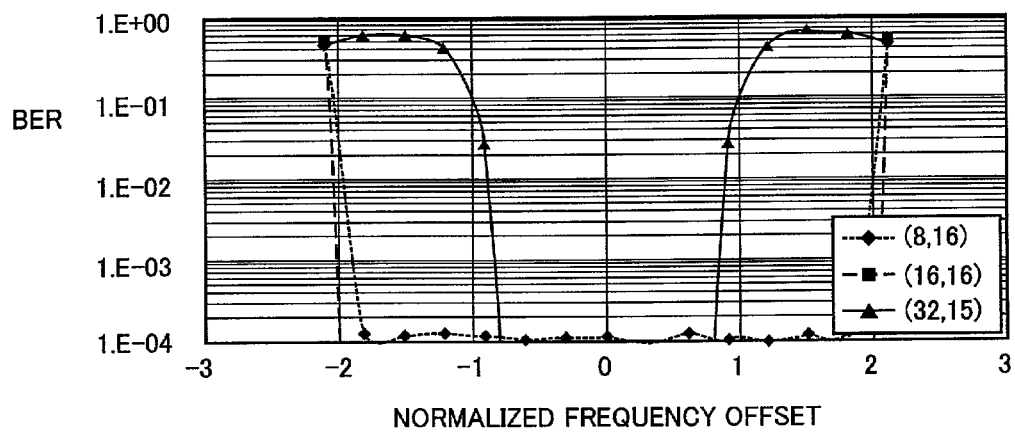
FIG. 37 is a graph representing the normalized frequency offset versus bit error rate characteristics when the time difference "shift" of the reference signal is constant and the width "width" of the reference signal is altered in the case where C/N is relatively large.
Figure 38:
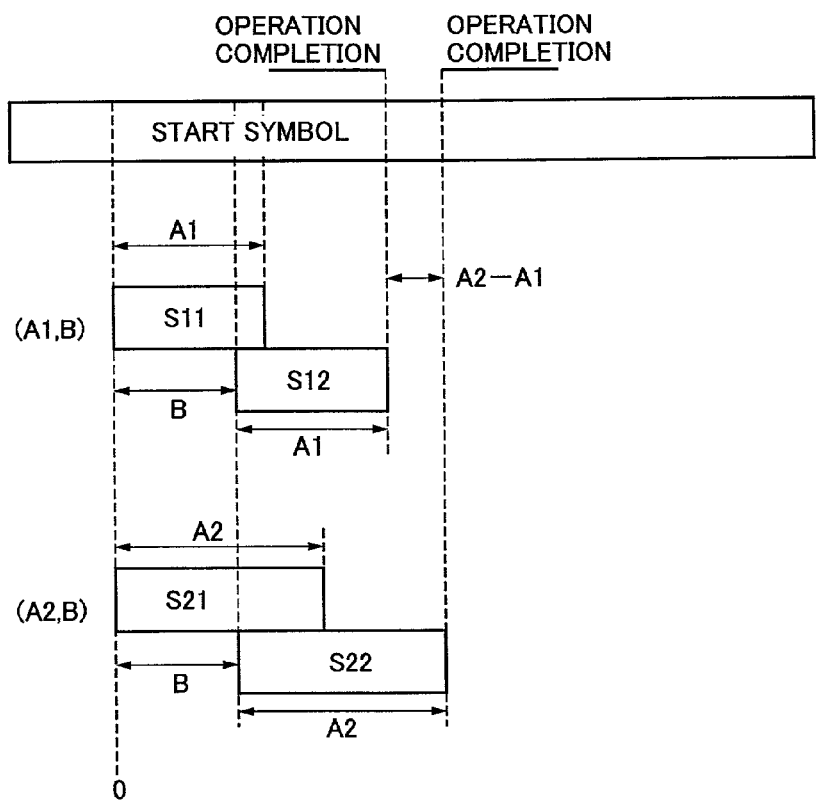
FIG. 38 is a diagram to describe reduction in the operation completion time with a smaller width "width" of the reference signal. B represents the value (constant) of "width". A represents the value of "shift" (A1<A2). S11 indicates the first reference signal used for correlation from a pair of reference signals with width=A1. S12 indicates the reference signal used for correlation after shifting by B from S1. S21 indicates the first reference signal used for correlation from a pair of reference signals with width=A2. S22 indicates the reference signal used for correlation after shifting by B from S21.

FIGS. 35, 36 and 37 are graphs of the normalized frequency offset versus bit error rate characteristics when respective reference signals have a constant "shift" and a varied "width" when the C/N is relatively small, moderate, and large, respectively.

It is apparent from these graphs that the frequency offset estimation accuracy is improved by increasing "width". It is also understood that, when the C/N is lower, the "width" to obtain a desired BER becomes larger.

Here, with respect to a set desired BER, (width, shift)= (32, 16), (width, shift)=(16, 16) and (width, shift)=(8, 16) are set when the C/N of the reception signal is C/N<25 dB, 25 dB≦C/N<30 dB, and 30 dB≦C/N, respectively. This setting is prestored in memory 302 as a table of (width, shift) with respect to the C/N.

Reference signal adjuster 303 selects a reference signal for the (width, shift) obtained based on the aforementioned table according to the C/N of the reception signal, and reads out the selected reference signal from memory 304. Cross correlators 305 and 306 calculate the cross correlation value based on the read out reference signals.

It is to be noted that when there are two or more values of "width" satisfying the desired BER characteristics, the reference signal corresponding to the smaller "width" is selected. By selecting a reference signal with a smaller "width", the operation completion time can be reduced as well as the hardware complexity, as apparent from FIG. 38. By storing such a data table of (width, shift) for a set C/N in memory 302, and selecting a reference signal based on the data table according to the C/N of the reception signal, the frequency offset can be estimated at the desired accuracy.

Figure 39:
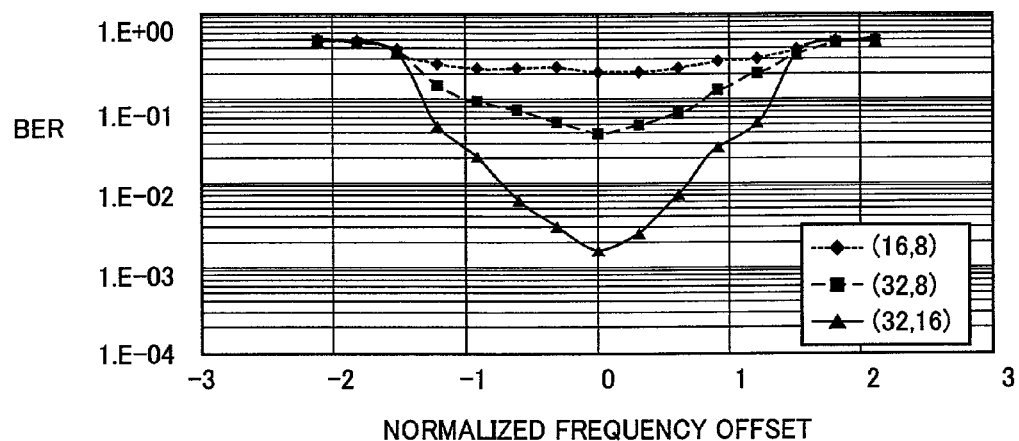
FIG. 39 is a graph indicating the normalized frequency offset versus bit error rate characteristics when the time difference "shift" and width "width" of the reference signal are altered in the case where C/N is relatively small.
Figure 40:
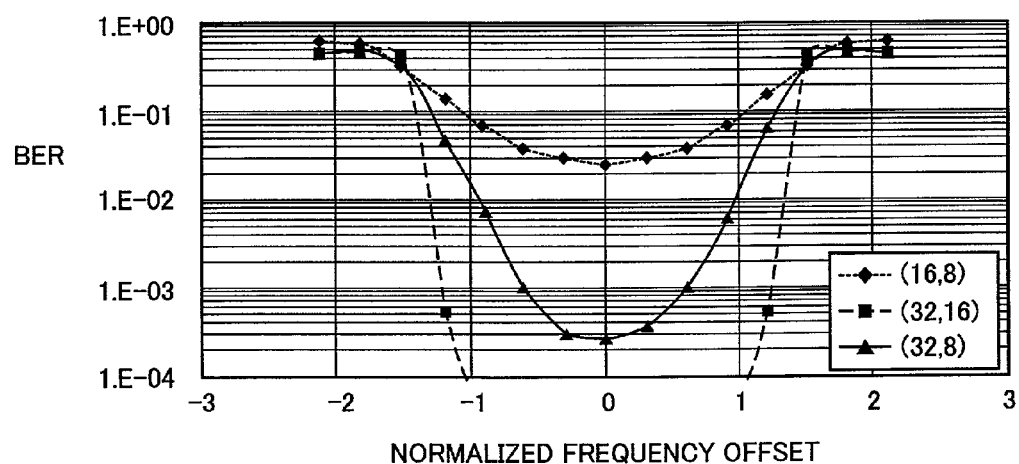
FIG. 40 is a graph indicating the normalized frequency offset versus bit error rate characteristics when the time difference "shift" and width "width" of the reference signal are altered in the case where C/N is moderate.
Figure 41:
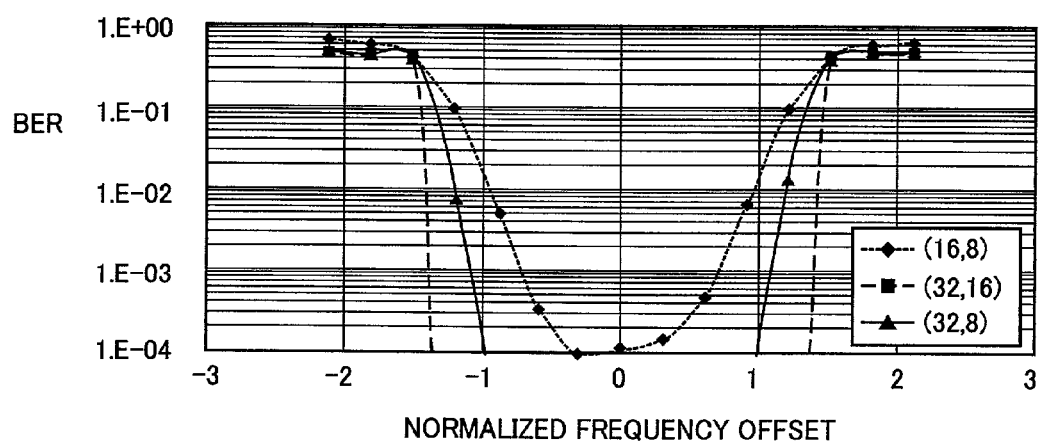
FIG. 41 is a graph indicating the normalized frequency offset versus bit error rate characteristics when the time difference "shift" and width "width" of the reference signal are altered in the case where C/N is relatively large.

FIGS. 39, 40 and 41 are graphs of the normalized frequency offset versus bit error rate characteristics when "shift" and "width" of respective reference signals are altered in the case where the C/N is relatively small, moderate, and great, respectively.

Here, with respect to the setting of a desired BER, (width, shift)=(32, 16), (width, shift)=(32, 8) and (width, shift)=(16, 8) are set when the C/N of the reception signal is C/N<23 dB, 23 dB≦C/N<30 dB and 30 dB<C/N, respectively. The above setting is prestored in memory 302 as a table of the (width, shift) for the C/N.

Reference signal adjuster 303 selects a reference signal corresponding to (width, shift) obtained based on the aforementioned table according to the C/N of the reception signal, and reads out the selected reference signal from memory 304. Cross correlators 305 and 306 calculate the cross correlation values based on the read out reference signal. It is to be noted that when there are two or more values of (width, shift) meeting the desired BER characteristics, the one that can most reduce the operation completion time is selected.

By prestoring a data table of (width, shift) corresponding to the set C/N in memory 302 and selecting a reference signal based on this data table according to the C/N of the reception signal, the frequency offset can be estimated at a desired accuracy.

Ninth Embodiment

An OFDM receiver according to a ninth embodiment of the present invention will be described with reference to FIG. 42.

Figure 42:
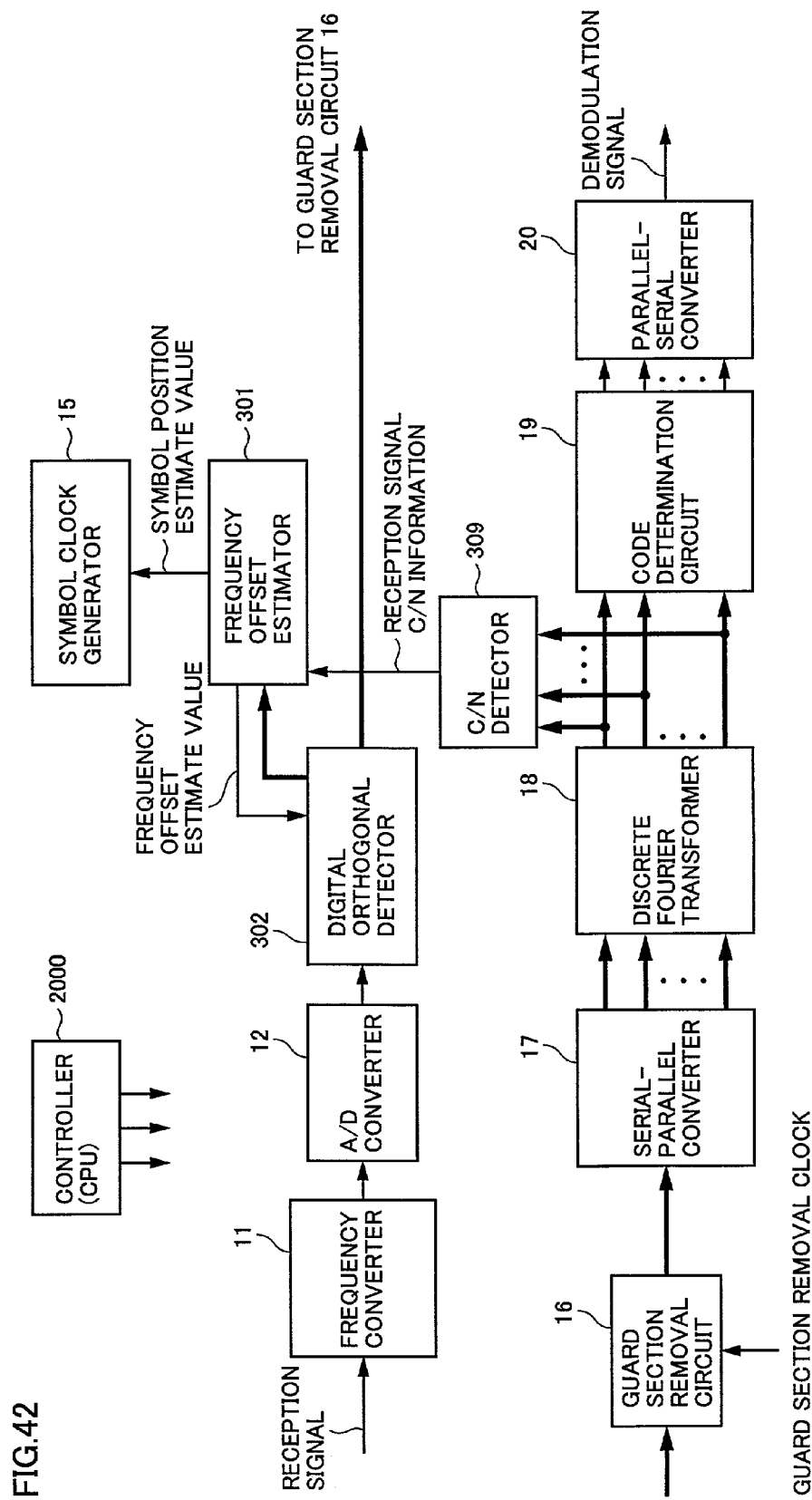
FIG. 42 shows a C/N detector obtaining the C/N information of a reception signal in an OFDM receiver according to a ninth embodiment of the present invention.
Figures 43A, 43B:
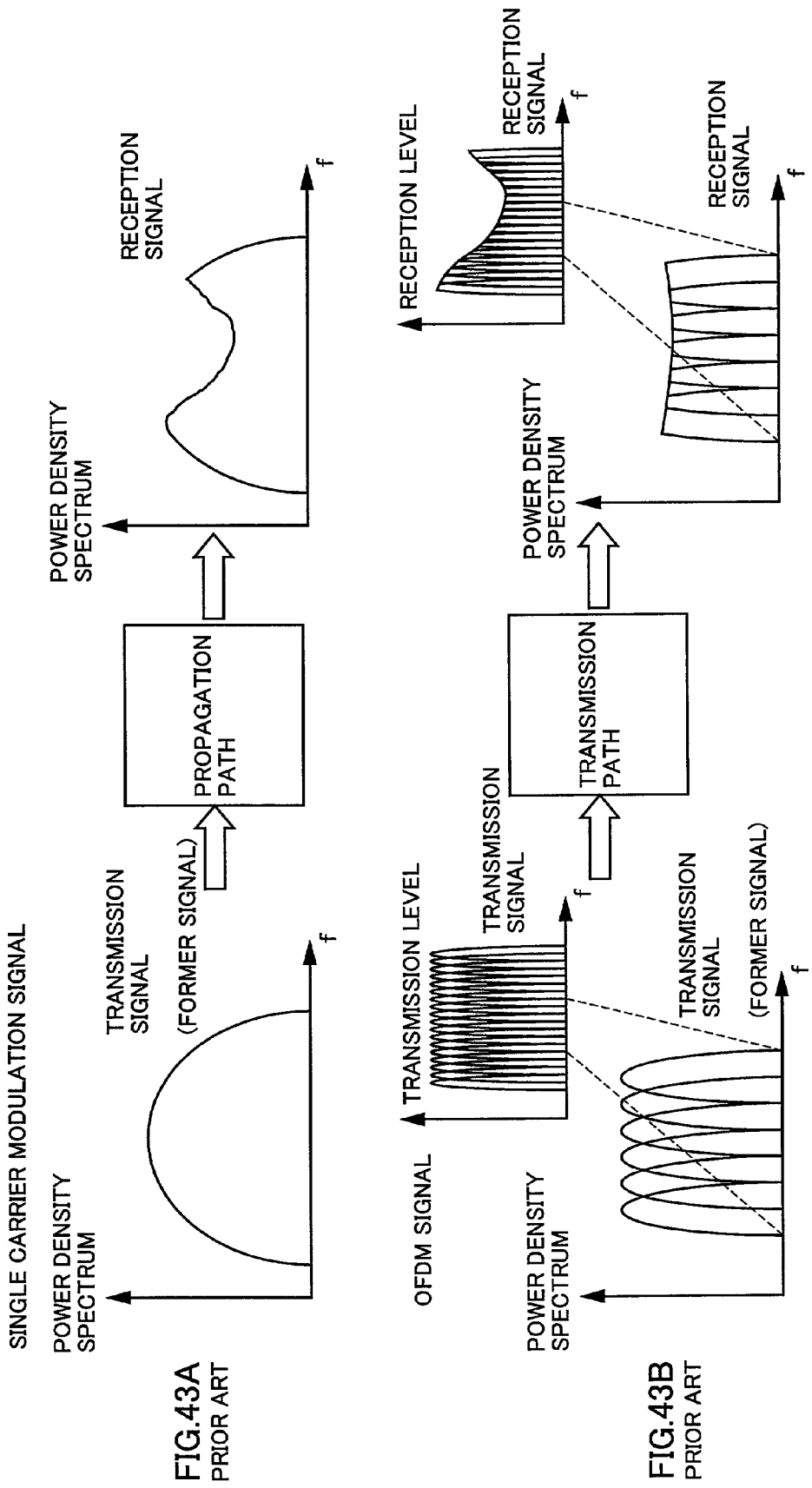
FIG. 43A is a diagram to describe the spectrum of a single carrier modulation method.
FIG. 43B is a diagram to describe the spectrum of an OFDM transmission method.
Figure 44:
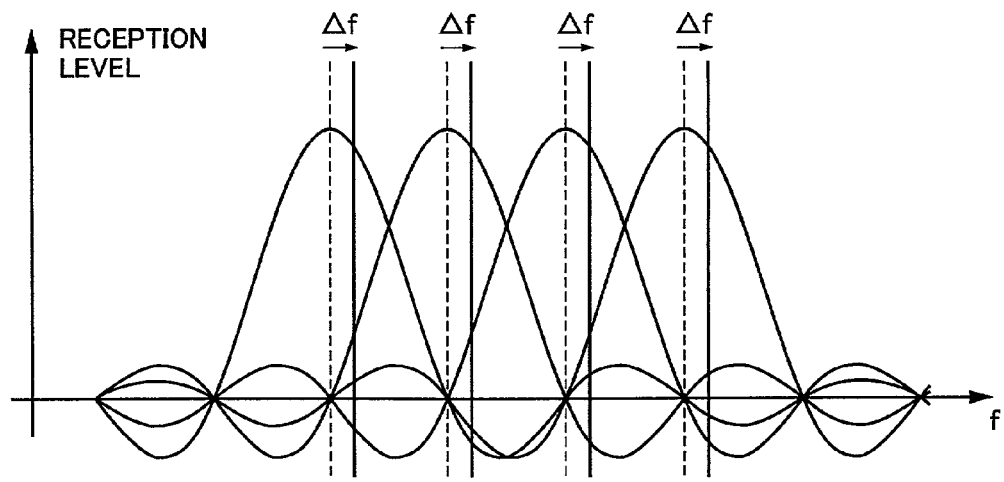
FIG. 44 is a diagram to describe a frequency offset in an OFDM signal. The vertical broken line represents the case where there is no offset (when not affected by another wave), whereas the horizontal solid line represents the case where a frequency offset is present (when affected by another wave).

FIG. 42 is a block diagram of an OFDM receiver showing an example of a C/N information source that supplies the C/N information of a reception signal to frequency offset estimator 300 of FIG. 30. A C/N detector 309 detects the level of respective output signals from a discrete Fourier transformer 18 to detect the C/N of a reception signal based on the detected signal level. The structure of other components of the ninth embodiment is similar to that shown in FIG. 29. Therefore, description thereof will not be repeated.

Figure 45:
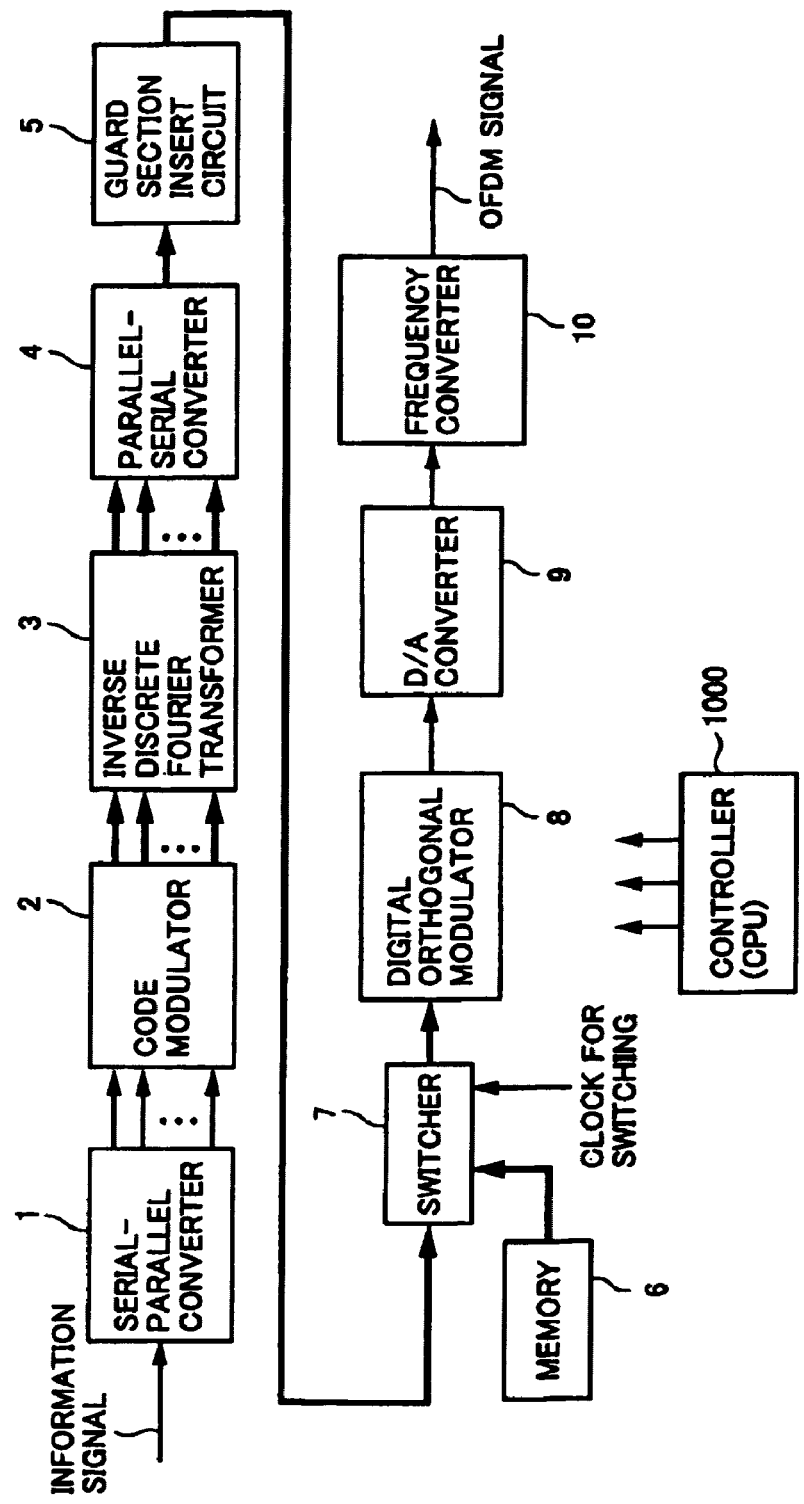
FIG. 45 is a block diagram showing an OFDM transmission apparatus of conventional art.
Figure 46:
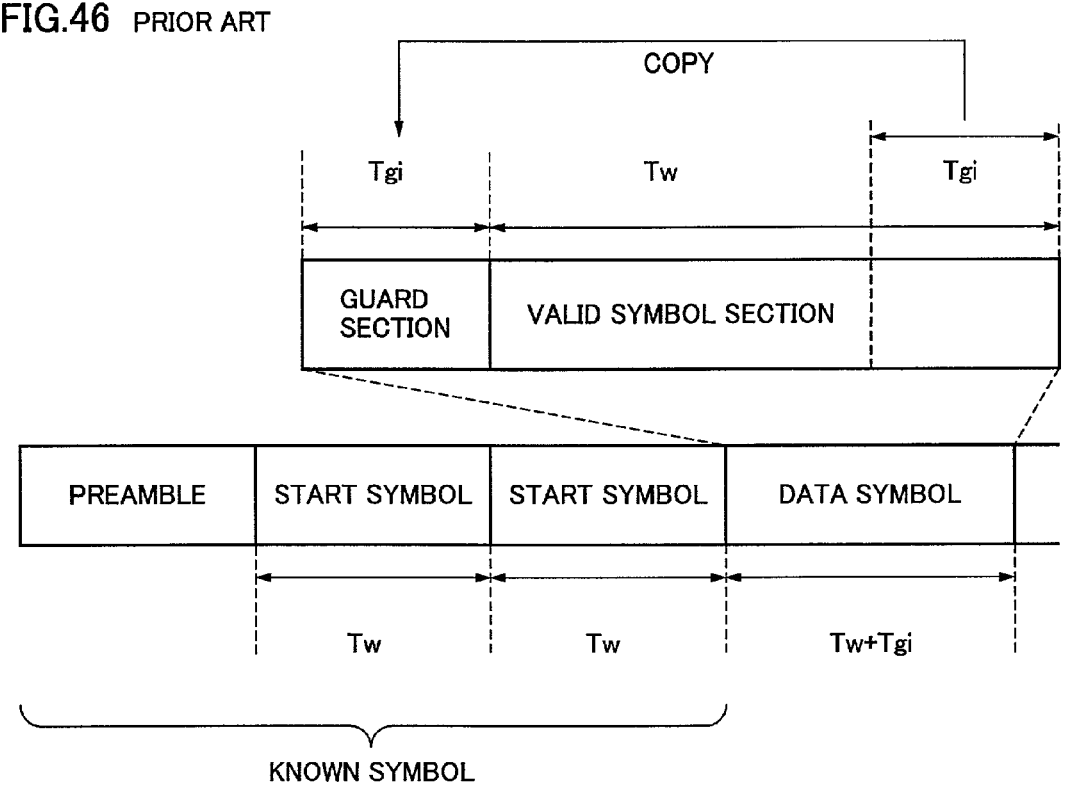
FIG. 46 is a diagram to describe a general packet structure of an OFDM signal.

In the generation assumption of the OFDM signal described in association with FIG. 45, the relationship of the number of subcarriers<the number of FFT samples is established. Inverse discrete Fourier transformer 3 (FIG. 45) assigns amplitude 0 for a subcarrier that is not assigned information data to generate an OFDM signal. In the discrete Fourier transformer 18 of the OFDM receiver according to the ninth embodiment shown in FIG. 42, an OFDM signal generated through the above-described generation assumption is input. As to the output of discrete Fourier transformer 18, the output corresponding to a subcarrier assigned the amplitude 0 will have an amplitude of 0 when no noise is applied. However, when noise is applied, the output of the subcarrier assigned the amplitude 0 will have an amplitude of the noise level. Therefore, the C/N of the reception signal can be detected based on the output of the subcarrier assigned the amplitude 0 and the output of the subcarrier assigned the information data. C/N detector 309 of the OFDM receiver according to the ninth embodiment of the present invention detects the C/N of the reception signal based on the above-described detection principle, and provides the detected C/N information to frequency offset estimator 300.

INDUSTRIAL APPLICABILITY

The present invention is applicable to a signal receiver and frequency offset compensation method. More specifically, the present invention is applicable to a signal receiver that receives a signal transmitted by the multicarrier transmission method such as an OFDM receiver, and a method of compensating for a frequency offset of a subcarrier, used in such signal transmission.

The invention claimed is:

1. A signal receiver receiving and demodulating a reception signal formed of a data symbol section where symbols are assigned in parallel to a plurality of subcarriers and modulated and a start symbol added ahead of said data symbol section, said signal receiver comprising:
 a first memory adapted to store N(N is an integer of 2 or more) types of reference signals, each corresponding only to an arbitrary portion in said start symbol,
 cross correlators adapted to calculate a cross correlation value between said reception signal and each of said N types of reference signals,
 a peak position detector adapted to detect a peak position of each of the N cross correlation values calculated by said cross correlators,
 a frequency offset estimation circuit adapted to estimate a frequency offset estimate value of a subcarrier of said reception signal for output, based on a cross correlation value at each of the N peak positions detected by said peak position detector, and
 a frequency offset compensator adapted to compensate for a frequency offset of a subcarrier of said reception signal based on the frequency offset estimate value estimated by said frequency offset estimation circuit.

2. A signal receiver receiving and demodulating a reception signal formed of a data symbol section where symbols are assigned in parallel to a plurality of subcarriers and modulated and a start symbol added ahead of said data symbol section, said signal receiver comprising:
 a first memory adapted to store N(N is an integer of 2 or more) types of reference signals, each corresponding to an arbitrary portion in said start symbol,
 cross correlators adapted to calculate a cross correlation value between said reception signal and each of said N types of reference signals,
 a peak position detector adapted to detect a peak position of each of the N cross correlation values calculated by said cross correlators,
 a frequency offset estimation circuit adapted to estimate a frequency offset estimate value of a subcarrier of said reception signal for output, based on a cross correlation value at each of the N peak positions detected by said peak position detector, and
 a frequency offset compensator adapted to compensate for a frequency offset of a subcarrier of said reception signal based on the frequency offset estimate value estimated by said frequency offset estimation circuit,
 wherein
  said frequency offset estimation circuit comprises a phase rotation angle calculator adapted to calculate a phase difference of cross correlation values at each of said N peak positions,
 a second memory adapted to store reference data based on a phase rotation angle between cross correlation values corresponding to said N types of reference signals under a state where a particular frequency offset is present, and a divider adapted to divide the phase difference of cross correlation values calculated by said rotation angle calculator by said reference data to calculate said frequency offset estimate value.

3. The signal receiver according to claim 1, wherein said frequency offset compensation circuit compensates for a frequency offset by rotating the phase of a subcarrier of said reception signal based on said estimated frequency offset estimate value.

4. The signal receiver according to claim 1, further comprising
a detector adapted to detect said reception signal, including a local oscillator,
wherein said frequency offset compensation circuit comprises a variable-controller adapted to variable-control an oscillation frequency of said local oscillator based on said estimated frequency offset value.

5. A signal receiver receiving and demodulating a reception signal formed of a data symbol section where symbols are assigned in parallel to a plurality of subcarriers and modulated and a start symbol added ahead of said data symbol section, said signal receiver comprising:
a first memory adapted to store N(N is an integer of 3 or more) types of reference signals, each corresponding only to an arbitrary portion in said start symbol,
cross correlators adapted to calculate a cross correlation value between said reception signal and each of said N types of reference signals,
a peak position detector adapted to detect a peak position of each of the N cross correlation values calculated by said cross correlators,
a frequency offset estimation circuit adapted to estimate and average a plurality of frequency offset estimate values of a subcarrier of said reception signal for output, based on a cross correlation value at each of the N peak positions detected by said peak position detector, and
a frequency offset compensator adapted to compensate for a frequency offset of a subcarrier of said reception signal, based on the frequency offset estimate value estimated and averaged by said frequency offset estimation circuit.

6. A signal receiver receiving and demodulating a reception signal formed of a data symbol section where symbols are assigned in parallel to a plurality of subcarriers and modulated and a start symbol added ahead of said data symbol section, said signal receiver comprising:
a first memory adapted to store N(N is an integer of 3 or more) types of reference signals, each corresponding to an arbitrary portion in said start symbol,
cross correlators adapted to calculate a cross correlation value between said reception signal and each of said N types of reference signals,
a peak position detector adapted to detect a peak position of each of the N cross correlation values calculated by said cross correlators,
a frequency offset estimation circuit adapted to estimate and average a plurality of frequency offset estimate values of a subcarrier of said reception signal for output, based on a cross correlation value at each of the N peak positions detected by said peak position detector, and
a frequency offset compensator adapted to compensate for a frequency offset of a subcarrier of said reception signal, based on the frequency offset estimate value estimated and averaged by said frequency offset estimation circuit, wherein
said frequency offset estimation circuit comprises a plurality of phase rotation angle calculators adapted to calculate phase differences of a plurality of predetermined combinations of cross correlation values at respective ones of said N peak positions,
a second memory adapted to store a plurality of reference data based on a plurality of phase rotation angles between cross correlation values corresponding to said plurality of predetermined combinations of said N types of reference signals under a state where a particular frequency offset is present,
a plurality of dividers adapted to divide a plurality of phase differences of cross correlation values calculated by said plurality of rotation angle calculators by respective corresponding ones of said plurality of reference data to calculate a plurality of frequency offset estimate values, and
an averager adapted to average a plurality of frequency offset estimate values from said plurality of dividers for output.

7. The signal receiver according to claim 5, wherein said frequency offset compensation circuit compensates for a frequency offset by rotating the phase of a subcarrier of said reception signal based on said estimated and averaged frequency offset estimate value.

8. The signal receiver according to claim 5, further comprising
a detector adapted to detect said reception signal, including a local oscillator,
wherein said frequency offset compensation circuit comprises a variable-controller adapted to variable-control an oscillation frequency of said local oscillator based on said estimated and averaged frequency offset estimate value.

9. A signal receiver receiving and demodulating a reception signal formed of a data symbol section where symbols are assigned in parallel to a plurality of subcarriers and modulated and a start symbol added ahead of said data symbol section, said signal receiver comprising:
a first memory adapted to store N(N is an integer of 2 or more) types of reference signals, each corresponding to an arbitrary portion in said start symbol,
cross correlators adapted to calculate a cross correlation value between an applied first signal and each of said N types of reference signals,
a peak position detector adapted to detect a peak position of each of the N cross correlation values calculated by said cross correlators,
a frequency offset estimation circuit adapted to estimate a frequency offset estimate value of a subcarrier of said first signal applied to said cross correlators for output, based on a cross correlation value at each of the N peak positions detected by said peak position detector, and accumulating the frequency offset estimate values,
a phase rotator adapted to rotate a phase of a subcarrier of an applied second signal based on the frequency offset estimate value estimated by said frequency offset estimation circuit,
a second memory adapted to store said second signal whose phase is rotated by said phase rotator,
a controller adapted to execute once a first control operation of applying said reception signal to said cross correlators as said first signal and to said phase rotator as said second signal to accumulate frequency offset estimate values of a subcarrier of said reception signal, and rotating the phase of the subcarrier of said reception signal for storage in said second memory, and repeating (N−1) times a second control operation of applying the signal stored in said second memory to said cross correlators as said first signal and to said phase rotator as said second signal to accumulate frequency offset estimate values of a subcarrier of the signal stored in said second memory, and rotating the phase of the subcarrier of the signal stored in said second memory for storage in said second memory, and a frequency offset compensation circuit adapted to compensate for a frequency offset of the subcarrier of said reception signal based on an added value of N frequency offset estimate values accumulated by said first and second control operations.

10. The signal receiver according to claim 9, wherein said frequency offset compensation circuit compensates for a frequency offset by rotating the phase of the subcarrier of said reception signal based on the added value of said frequency offset estimate values.

11. The signal receiver according to claim 9, further comprising a detector adapted to detect said reception signal, including a local oscillator, wherein said frequency offset compensation circuit comprises a variable-controller adapted to variable-control an oscillation frequency of said local oscillator based on the added value of said frequency offset estimate values.

12. A signal receiver receiving and demodulating a reception signal formed of a data symbol section where symbols are assigned in parallel to a plurality of subcarriers and modulated and a start symbol added ahead of said data symbol section, said signal receiver comprising:

a first memory adapted to store N(N is an integer of 2 or more) types of reference signals, each corresponding to an arbitrary portion in said start symbol, and a plurality of reference data based on a phase rotation angle between cross correlation values corresponding to a plurality of sets of said reference signals, each set formed of two or more types of said reference signals, under a state where a particular frequency offset is present, cross correlators adapted to calculate a cross correlation value between an applied first signal and respective reference signals of each said set, peak position detector adapted to detect a peak position of each cross correlation value calculated by said cross correlators, a second memory adapted to extract and store a portion of said reception signal, a frequency offset estimation circuit adapted to estimate a frequency offset estimate value of said first signal applied to said cross correlators for output, based on a cross correlation value at each peak position detected by said peak position detector and reference data corresponding to said reference signal of said each set, an adder adapted to accumulate the frequency offset estimate values output from said frequency offset estimation circuit, a phase rotator adapted to rotate a phase of said reception signal stored in said second memory, based on the frequency offset estimate value estimated by said frequency offset estimation circuit, a controller adapted to execute a first control operation of applying said reception signal to said cross correlators as said first signal to calculate a cross correlation value with respective reference signals of a set corresponding to the smallest reference data of said plurality of reference data, and estimating a frequency offset estimate value of said reception signal by said frequency offset estimation circuit based on the calculated cross correlation value and said smallest reference data, and for repeating a second control operation of applying said reception signal whose phase is rotated based on said estimated frequency offset estimate value and stored in said second memory to said cross correlators as said first signal to calculate a cross correlation value with the set of reference signals corresponding to the smallest unused reference data from said plurality of reference data, and estimating a frequency offset estimate value of the signal stored in said second memory by said frequency offset estimation circuit, based on the calculated cross correlation value and said smallest unused reference data, and a frequency offset compensator adapted to compensate for a frequency offset of the subcarrier of said reception signal based on an added value of frequency offset estimates accumulated by said adder and calculated by said first and second control operations.

13. The signal receiver according to claim 12, wherein said signal extracted from said reception signal and stored in said second memory is said start symbol.

14. The signal receiver according to claim 12, wherein said frequency offset compensation circuit compensates for a frequency offset by rotating the phase of a subcarrier of said reception signal based on the added result of said frequency offset values.

15. The signal receiver according to claim 12, further comprising a detector adapted to detect said reception signal, including a local oscillator, wherein said frequency offset compensation circuit comprises a variable-contoller adapted to variable-control an oscillation frequency of said local oscillator based on the added value of said frequency offset estimate values.

16. A signal receiver receiving and demodulating a reception signal formed of a data symbol section where symbols are assigned in parallel to a plurality of subcarriers and modulated and a start symbol added ahead of said data symbol section, said signal receiver comprising:

a carrier-to-noise ratio (C/N) detector adapted to detect a C/N of said reception signal, a memory adapted to store a data table identifying an optimum reference signal corresponding to the C/N of said reception signal, reference signal outputs adapted to provide N(N is an integer of 2 or more) types of optimum reference signals, each corresponding to an arbitrary portion in said start symbol, based on said data table according to said detected C/N, a cross correlator adapted to calculate a cross correlation value between said reception signal and each of said N types of reference signals, a peak position detector adapted to detect a peak position of each of the N cross correlation values calculated by said cross correlator, a frequency offset estimation circuit adapted to estimate a frequency offset estimate value of a subcarrier of said reception signal for output, based on a cross correlation value at each of the N peak positions detected by said peak position detection means, and a frequency offset compensator adapted to compensate for a frequency offset of the subcarrier of said reception signal, based on a frequency offset estimate value estimated by said frequency offset estimation circuit.

17. The signal receiver according to claim 16, wherein said frequency offset compensator compensates for a frequency offset by rotating the phase of the subcarrier of said reception signal based on said estimated frequency offset estimate value.

18. The signal receiver according to claim 16, further comprising a detector adapted to detect said reception signal, including a local oscillator,
wherein said frequency offset compensator comprises a variable-controller adapted to variable-control an oscillation frequency of said local oscillator based on said estimated frequency offset estimate value.

19. A method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of said data symbol section, said method comprising the steps of:
calculating a cross correlation value between said reception signal and each of N(N is an integer of 2 or more) types of reference signals, each corresponding only to an arbitrary portion in said start symbol,
detecting a peak position of each of said N calculated cross correlation values,
estimating a frequency offset estimate value of a subcarrier of said reception signal for output, based on a cross correlation value at each of said N detected peak positions, and
compensating for a frequency offset of the subcarrier of said reception signal based on said estimated frequency offset estimate value.

20. A method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of said data symbol section, said method comprising the steps of:
calculating a cross correlation value between said reception signal and each of N(N is an integer of 3 or more) types of reference signals, each corresponding only to an arbitrary portion in said start symbol,
detecting a peak position of each of said N calculated cross correlation values,
estimating and averaging a plurality of frequency offset estimate values of the subcarrier of said reception signal for output, based on the cross correlation value at each of said N detected peak positions, and
compensating for a frequency offset of the subcarrier of said reception signal, based on said estimated and averaged frequency offset estimate value.

21. A method of compensating for a frequency offset of a subcarrier of a reception signal in a signal receiver apparatus receiving and demodulating the reception signal formed of a data symbol section where symbols are assigned in parallel to a plurality of subcarriers and modulated and a start symbol added ahead of said data symbol section, said method comprising:
a first control step, said first control step including the steps of calculating a cross correlation value between said reception signal and each of N(N is an integer of 2 or more) types of reference signals, each corresponding to an arbitrary portion in said start symbol,
detecting a peak position of each of said N calculated cross correlation values,
estimating a frequency offset estimate value of the subcarrier of said reception signal, based on the cross correlation value at each of said N detected peak positions for output, as well as accumulating the estimated frequency offset estimate values,
rotating the phase of the subcarrier of said reception signal based on said estimated frequency offset estimate value, and
storing said phase-rotated reception signal,
said method further comprising a second control step, said second control step including the steps of
calculating a cross correlation value between said stored phase-rotated reception signal and each of said N types of reference signals,
detecting a peak position of each of said calculated cross correlation values,
estimating a frequency offset estimate value of the subcarrier of said stored phase-rotated reception signal for output, based on the cross correlation value at each of said N detected peak positions, as well as accumulating the estimated frequency offset estimate value,
rotating the phase of the subcarrier of said stored phase-rotated reception signal based on said estimated frequency offset estimate value, and
storing said phase-rotated reception signal,
said method comprising the steps of: repeating said second control step (N−1) times after said first control step, and
compensating for a frequency offset by rotating the phase of the subcarrier of said reception signal based on an added value of the N frequency offset estimate values accumulated by said first and second control steps.

22. A method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of said data symbol section, said method comprising:
a step of storing N(N is an integer of 2 or more) types of reference signals, each corresponding to an arbitrary portion of said start symbol, and a plurality of reference data based on phase rotation angles between cross correlation values corresponding to a plurality of sets of said reference signals, each set formed of two or more types of said reference signals, under a state where a particular frequency offset is present, and
a first control step, said first control step including the steps of
calculating a cross correlation value between said reception signal and respective reference signals of a set corresponding to the smallest reference data from said plurality of reference data,
detecting a peak position of each of said calculated cross correlation values,
estimating a frequency offset estimate value of the subcarrier of said reception signal, based on the cross correlation value at each of said detected peak positions and said smallest reference data for output, as well as accumulating the estimated frequency offset estimate values,
extracting and storing a portion of said reception signal,
rotating the phase of said stored reception signal based on said estimated frequency offset estimate value, and said method further comprising a second control step, said second control step including the steps of calculating a cross correlation value between said stored reception signal whose phase is rotated based on said estimated frequency offset estimate value, and respective reference signals of a set corresponding to the smallest unused reference data of said plurality of reference data, detecting a peak position of each of aid calculated cross correlation values, estimating a frequency offset estimate value of said phase-rotated stored reception signal for output, based on the cross correlation value at each of said detected peak positions and said smallest unused reference data, as well as accumulating the estimated frequency offset estimate values, repeating said second control step after said first control step, and compensating for a frequency offset by rotating the phase of the subcarrier of said reception signal based on an added value of the frequency offset estimate values accumulated by said first and second control steps.

23. A method of compensating for a frequency offset of a subcarrier of a reception signal in a signal receiver receiving and demodulating the reception signal formed of a data symbol section where symbols are assigned in parallel to a plurality of subcarriers and modulated and a start symbol added ahead of said data symbol section, said method comprising the steps of:

detecting a C/N of said reception signal, storing a data table identifying an optimum reference signal corresponding to the C/N of said reception signal, providing N(N is an integer of 2 or more) types of optimum reference signals, each corresponding to an arbitrary portion in said start symbol, based on said data table, according to said detected C/N, calculating a cross correlation value between said reception signal and each of said N types of reference signals, detecting a peak position of each of said N calculated cross correlation values, estimating a frequency offset estimate value of the subcarrier of said reception signal for output, based on the cross correlation value at each of said N detected peak positions, and compensating for a frequency offset of the subcarrier of said reception signal based on said estimated frequency offset estimate value.

* * * * *